US012291590B2

(12) United States Patent
Rannard et al.

(10) Patent No.: US 12,291,590 B2
(45) Date of Patent: May 6, 2025

(54) BRANCHED POLYMERS

(71) Applicant: The University of Liverpool, Liverpool (GB)

(72) Inventors: Steven Rannard, Merseyside (GB); Pierre Chambon, Liverpool (GB); Savannah Cassin, Liverpool (GB)

(73) Assignee: THE UNIVERSITY OF LIVERPOOL, Liverpool (GB)

( * ) Notice: Subject to any disclaimer, the term of this patent is extended or adjusted under 35 U.S.C. 154(b) by 919 days.

(21) Appl. No.: 17/289,907

(22) PCT Filed: Oct. 31, 2019

(86) PCT No.: PCT/GB2019/053106
§ 371 (c)(1),
(2) Date: Apr. 29, 2021

(87) PCT Pub. No.: WO2020/089649
PCT Pub. Date: May 7, 2020

(65) Prior Publication Data
US 2022/0002460 A1    Jan. 6, 2022

(30) Foreign Application Priority Data
Oct. 31, 2018    (GB) ..................................... 1817837

(51) Int. Cl.
| C08F 222/10 | (2006.01) |
| C08F 2/38 | (2006.01) |
| C08F 212/36 | (2006.01) |
| C08K 5/03 | (2006.01) |
| C08K 5/375 | (2006.01) |
| C08L 47/00 | (2006.01) |

(52) U.S. Cl.
CPC ............ C08F 222/102 (2020.02); C08F 2/38 (2013.01); C08F 212/36 (2013.01); C08K 5/03 (2013.01); C08K 5/375 (2013.01); C08L 47/00 (2013.01); C08L 2201/06 (2013.01)

(58) Field of Classification Search
CPC ........ C08F 222/10; C08F 2/38; C08F 212/36; C08K 5/03; C08K 5/375; C08L 47/00
See application file for complete search history.

(56) References Cited

U.S. PATENT DOCUMENTS

| 5,767,211 | A | * | 6/1998 | Guan ......................... C08F 2/38 526/171 |
| 6,313,251 | B1 | | 11/2001 | Toh et al. |
| 6,353,066 | B1 | | 3/2002 | Sosa |
| 9,138,383 | B1 | | 9/2015 | Stansbury |
| 2004/0247273 | A1 | | 12/2004 | Fabian et al. |
| 2006/0287431 | A1 | | 12/2006 | Siol |
| 2010/0010133 | A1 | | 1/2010 | Zook et al. |
| 2010/0130641 | A1 | | 5/2010 | Findlay et al. |
| 2011/0269904 | A1 | | 11/2011 | Bismarck et al. |
| 2015/0266986 | A1 | | 9/2015 | Wang et al. |
| 2018/0021261 | A1 | | 1/2018 | Rannard et al. |
| 2018/0051170 | A1 | | 2/2018 | Chikara |
| 2020/0190237 | A1 | | 6/2020 | Rannard et al. |

FOREIGN PATENT DOCUMENTS

| CN | 101538345 A | 9/2009 |
| JP | 2007506822 A | 3/2007 |
| JP | 2009-190331 A | 8/2009 |
| JP | 2012517493 A | 8/2012 |
| JP | 2015147923 A | 8/2015 |
| KR | 10-2009-0111816 A | 10/2009 |
| WO | 2008/071662 A1 | 6/2008 |
| WO | 2010/089575 A1 | 8/2010 |
| WO | 2012/036554 A1 | 3/2012 |
| WO | 2013/005050 A1 | 1/2013 |
| WO | 2016/147984 A1 | 9/2016 |
| WO | 2018197884 A1 | 11/2018 |
| WO | 2018197885 A1 | 11/2018 |
| WO | 2020089649 A1 | 5/2020 |

OTHER PUBLICATIONS

O'Brien, et al: "Facile, versatile and cost effective route to branched vinyl polymers", Polymer, 41 (2000), pp. 6027-6031.

Isaure, et al: "Facile synthesis of branched water-soluble poly(dimethylacrylamide)s in conventional and parallel reactors using free radical polymerisation", Reactive & Functional Polymers, 66 (2006), pp. 65-79.

Besenius, et al: "Synthesis and characterization of water-soluble densely branched glycopolymers", Reactive & Functional Polymers, 68 (2008), pp. 1524-1533.

Wu, et al: "Synthesis Backbone-Dual-Responsive of Hyperbranched Poly(bis(N,N-ethyl acrylamide)s by Raft", Macromolecular Research, 2014, vol. 22, No. 11, pp. 1196-1202, DOI: 10.1007/s13233-014-2166-y.

McEwan, et al: "Combining catalytic chain transfer polymerisation (CCTP) and thio-Michael addition: enabling the synthesis of peripherally functionalised branched polymers", Polymer Chemistry, 2011, 2, pp. 1992-1999.

Isaure, et al: "Synthesis of Branched Poly(methyl methacrylate)s: Effect of the Branching Comonomer Structure", Macromolecules, 2004, 37, pp. 2096-2105.

(Continued)

Primary Examiner — Robert D Harlan
(74) Attorney, Agent, or Firm — FOX ROTHSCHILD LLP

(57) ABSTRACT

Responsive or degradable branched polymers may be prepared by the free radical polymerisation of a multivinyl monomer in the presence of a chain transfer agent, using a source of radicals, wherein the extent of propagation is controlled relative to the extent of chain transfer to prevent gelation of the polymer. The multivinyl monomer may comprise a cleavable group, for example an ester, or a multiplicity of such groups, between two vinyl groups. Said monomer may be a macromonomer containing multiple cleavage sites.

32 Claims, 22 Drawing Sheets

(56) References Cited

OTHER PUBLICATIONS

Besenius et al., "Synthesis and characterization of water-soluble densely branched glycopolymers," Reactive & Functional Polymers (2008); 68:1524-1533.

Graham et al., "One-Pot Synthesis of Methacrylic Acid-Ethyleneoxide Branched Block and Graft Copolymers", Journal of Materials Chemistry, 2007, vol. 17, pp. 545-552.

Isaure et al., "Facile synthesis of branched water-soluble poly(dimethylacrylamide)s in conventional and parallel reactors using free radical polymerisation," Reactive & Functional Polymers (2006); 66:65-79.

Isaure et al., "Synthesis of Branched Poly(methyl methacrylate)s: Effect of the Branching Comonomer Structure," Macromolecules (2004); 37:2096-2105.

McEwan et al., "Combining catalytic chain transfer polymerisation (CCTP) and thio-Michael addition: enabling the synthesis of peripherally functionalized branched polymers," Polym. Chem., (2011); 2:1992-1999.

O'Brien et al., "Facile, versatile and cost effective route to branched vinyl polymers," Polymer (2000); 41:6027-6031.

Wu et al., "Synthesis Backbone-Dual-Responsive of Hyperbranched Poly(bis(N,N-ethyl acrylamide))s by Raft," Macromolecular Research (2014); 22(11):1196-1202.

* cited by examiner

BRANCHED POLYMERS

The present invention relates to branched polymers and methods of preparing them. In particular the present invention relates to polymers prepared by free radical reactions involving vinyl-containing monomers, which are degradable or responsive and/or derived from natural, renewable and/or sustainable sources.

BACKGROUND TO THE INVENTION

Many different types of branched polymers, and many different ways of preparing branched polymers, are known.

Some branched polymers are cross-linked or gelled, whereas others are soluble and non-gelled. The present invention is generally concerned with polymers which fall within the latter group.

The properties and potential applications of branched polymers are governed by several characteristics including the architecture of the polymers, the type of monomers from which they are made, the type of polymerisation, the level of branching, the functional groups on the polymers, the use of other reagents, and the conditions under which polymerisation is carried out. These characteristics can in turn affect the hydrophobicity of the polymers or parts of them, viscosity, solubility, and the form and behaviour of the polymers on a nanoparticulate level, in bulk and in solution.

Various methods have been used to achieve controlled levels of branching within vinyl polymers in order to avoid extensive cross-linking and gelation. For example, the "Strathclyde route", as described in N. O'Brien, A. McKee, D. C. Sherrington, A. T. Slark, A. Titterton, *Polymer* 2000, 41, 6027-6031 involves the controlled radical polymerisation of predominantly monofunctional vinyl monomer in the presence of lower levels of difunctional (di)vinyl monomer and chain transfer agent. In other methods, the use of controlled or living polymerisation removes the need for chain transfer agent. In general, gelation can be avoided if a vinyl polymer made from predominantly a monofunctional monomer is branched by virtue of a difunctional vinyl monomer so that there is on average one branch or fewer per vinyl polymer chain, as disclosed, for example, in WO 2009/122220, WO 2014/199174 and WO 2014 199175.

A further example of a soluble branched polymer is disclosed in T. Sato, H. Ihara, T. Hirano, M. Seno, *Polymer* 2004, 45, 7491-7498. This uses high concentrations of initiator and copolymerises a divinyl monomer (ethylene glycol dimethacrylate—EGDMA) with a monovinyl monomer (N-methylmethacrylamide).

Another way of controlling branching is described in T. Zhao, Y. Zheng, J. Poly, W. Wang, *Nature Communications* 2013, 10.1038/ncomm2887, and Y. Zheng, H. Cao, B. Newland, Y. Dong, A. Pandit, W. Wang; *J. Am. Chem. Soc.* 2011, 133, 13130-13137. This uses deactivation-enhanced atom transfer radical polymerisation (DE-ATRP). Oligomers made from divinyl monomers react with each other whilst they still have small chain lengths, thereby avoiding intramolecular cyclisation which can occur with longer active chains. Whilst this allows the formation of hyperbranched polymers, there are several disadvantages associated with this method. A metallic catalytic system and large amounts of an initiator are required. Much of the vinyl functionality remains in the final product. The polymerisation must be terminated at low vinyl conversion to prevent gelation. Stringent purification of the final material is required.

T. Sato, Y. Arima, M. Seno, T. Hirano; *Macromolecules* 2005, 38, 1627-1632 discloses the homopolymerisation of a divinyl monomer using a large amount of initiator. Whilst this yields soluble hyperbranched polymers, the functionality of the polymer depends to a significant extent on the initiator, a large amount of which is incorporated. Furthermore, double bonds remain in the product. The polymerisation must be terminated at low vinyl conversion to prevent gelation.

As a result of further experimentation and investigations using various polymerisation methods and conditions, we have now discovered a new method of polymerisation which is surprisingly effective, which results in a new type of polymer architecture and which addresses several of the issues associated with known polymerisation methods.

From a first aspect the present invention provides a method of preparing a branched polymer comprising the free radical polymerisation of a multivinyl monomer in the presence of a chain transfer agent, using a source of radicals, wherein the extent of propagation is controlled relative to the extent of chain transfer to prevent gelation of the polymer, and wherein the branched polymer is responsive or degradable.

The term multivinyl monomer denotes monomers which have more than one free radical polymerisable vinyl group. One particular class of such monomers are those which have two such vinyl groups, i.e. divinyl monomers.

Therefore, from a further aspect the present invention provides a method of preparing a branched polymer comprising the free radical polymerisation of a divinyl monomer in the presence of a chain transfer agent, using a source of radicals, wherein the extent of propagation is controlled relative to the extent of chain transfer to prevent gelation of the polymer, and wherein the branched polymer is responsive or degradable.

The term "degradable" denotes that the material may inherently degrade or biodegrade over time, or may degrade in response to a trigger and/or chemical action. The degradation may comprise cleavage of one or more covalent bond in the polymer product.

The types of moiety within the polymer which may be degraded include esters, amides, ethers and amines and those containing related groups such as carboxylic acids, carboxylic anhydrides, acetals and other heteroatom-containing functional groups. The groups may be conjugated; for example ester or acid functionality may be conjugated with carbon-carbon double bonds. The responsive or degradable nature may be due to functionality (e.g. amine or acidic functionality) within the polymer which may be protonated or deprotonated.

The degradable or biodegradable moiety or moieties may be intermediate between two vinyl groups in the multivinyl monomer or divinyl monomer. Consequently, where the multivinyl monomer or divinyl monomer acts as a brancher, degradation or biodegradation leads to cleavage of the branch or linking segment of the polymer, thereby facilitating the break-up of the polymer.

The polymer may be degradable by virtue of containing —C—O—C(=O)— linkages, e.g. may contain ester linkages.

The polymer may comprise carboxylic acid groups or groups derived from carboxylic acid groups.

One class of monomers which may be used to make the polymers of the present invention are monomers which comprise more than one carboxyl functionality as well as vinyl functionality, optionally monomers which comprise more than one carboxyl functionality as well as vinyl functionality which is α,β-unsaturated. A sub-class comprises monomers which comprise the following functionality as part of their structure:

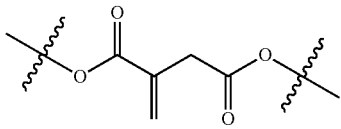 [SMILES: *OC(=O)CC(=C)C(=O)O*]

In other words this group of monomers is based on itaconic acid or itaconic anhydride which have the following structures:

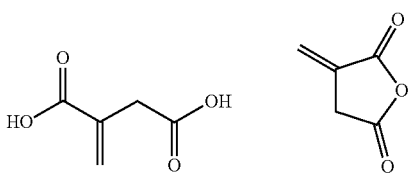

This group of monomers is effective and useful in the context of the present invention. The two carboxylic acid functionalities of itaconic acid and the α,β-unsaturated double bond functionality lend themselves well to the dual purposes of facilitating vinyl polymerisation whilst allowing functionality which is compatible with degradation.

Furthermore itaconic acid and related feedstocks are bioderived and sustainable and allow a very cost-effective way of preparing useful branched polymers in large quantities.

Thus it can be seen that monomers used in the present invention can contain the itaconic acid structure, optionally wherein the proton of each of the carboxylic acid groups of itaconic acid is replaced with another group, for example an alkyl group (thereby forming an ester).

A multivinyl monomer derived from itaconic acid may comprise multiple itaconic acid units. A divinyl monomer derived from itaconic acid may comprise two itaconic acid units. For example, the reaction of butanediol with two equivalents of itaconic acid anhydride yields a bisitaconate of the following structure:

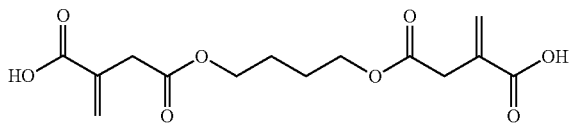 [SMILES: C=C(CC(=O)OCCCCOC(=O)CC(=C)C(=O)O)C(=O)O]

The skilled person will understand that isomers of this structure are possible.

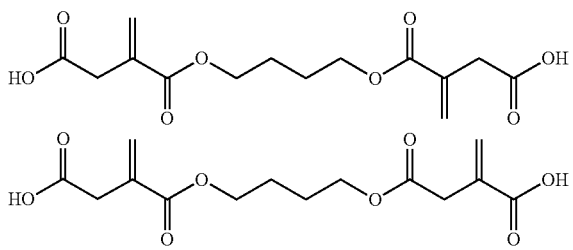

Thus, it can be seen that the above compound, a bisitaconate, contains two vinyl polymerisable double bonds, and two cleavable ester linkages between them. Similarly, other bisitaconates function in the same way, and can comprise any other suitable linking moiety (in place of the butyl chain) linking esters which are derived from one of the acid functionalities of each of two itaconic acid structures. For example the linker between the two esters may, instead of being butyl, be other alkyl, e.g. C2 to C10 alkyl or C2 to C5 alkyl, or other groups.

The acid functionalities on either side of the bisitaconate structures, and in other components derived from itaconic acid, also contribute to the beneficial properties and response of the products.

The presence of an acid functionality is advantageous in part because this can aid solubility and can affect behaviour in aqueous systems. The acid functionality can influence and facilitate mechanisms whereby degradation can occur, including degradation in other parts of the product. The response of the product can be affected by the presence of acid groups.

The term "responsive" denotes that the product provides a response in a particular environment or to the presence of a particular chemistry or substance. Thus, for example, acid functionality affects the nature of the product as outlined above.

Functionality based on itaconic acid is one possible way of achieving degradability.

Other ways include having other kinds of ester linkages or other degradable linkages within the divinyl or multivinyl monomers. For example, the linker between the two double bonds of a divinyl monomer may comprise ester linkages formed from ring opening polymerisation of lactones e.g. caprolactone. This provides further routes to preparing branched polymers which use sustainable or bio-derived feedstocks.

The number of cleavable sites (e.g. ester linkages) between the vinyl polymerizable double bonds may be 1 or more, 2 or more, 3 or more, or 4 or more. The number may optionally be between 1 and 10, or between 1 and 5, or between 1 and 3, or between 2 and 10, or between 2 and 5, or between 3 and 10, or between 3 and 5.

We have found that the invention is particularly effective when implemented using a divinyl or multivinyl monomer which has multiple cleavable sites (e.g. ester linkages) between the vinyl polymerizable double bonds. The number of cleavable sites (e.g. esters) per monomer on average may optionally be 5 or more, or 6 or more, or 7 or more, or 10 or more, or 15 or more, or 20 or more, or 30 or more, or 40 or more, or 50 or more, for example between 5 and 100 or between 5 and 60 or between 5 and 30 or between 10 and 50 or between 10 and 30 or between 20 and 80 or between 20 and 70. Macromonomers having such extensive cleavability are exemplified below and schematic representations are shown in FIGS. 18 and 19, resulting in polymers as shown in for example FIG. 20.

Divinyl monomers comprising multiple cleavable groups may be prepared starting from diol initiators. The OH groups of the diol can be used to ring-open cyclic compounds such as for example lactones, to thereby grow ester-containing linkages (for example) out from the central diol, with OH groups on the end. After the diol initiator has been subjected to sufficient reaction to grow ester-containing linkages from one or both of the alcohol groups of the diol, the OH groups at the ends of the chain may then be converted to vinyl ends.

In other words, ring opening polymerisation to result in ester linkages within monomers may be initiated by alcohol initiators, for example diol initiators to prepare difunctional molecules; said difunctional molecules may then be subjected to further reaction to convert the ends to vinyl ends thereby yielding divinyl macromonomers. Similarly, triol etc. initiators may be used to prepare trifunctional etc. molecules which may then be subjected to further reaction to convert the ends to vinyl ends thereby yielding trivinyl etc. macromonomers.

A macromonomer may for example be prepared as indicated in the reaction scheme below

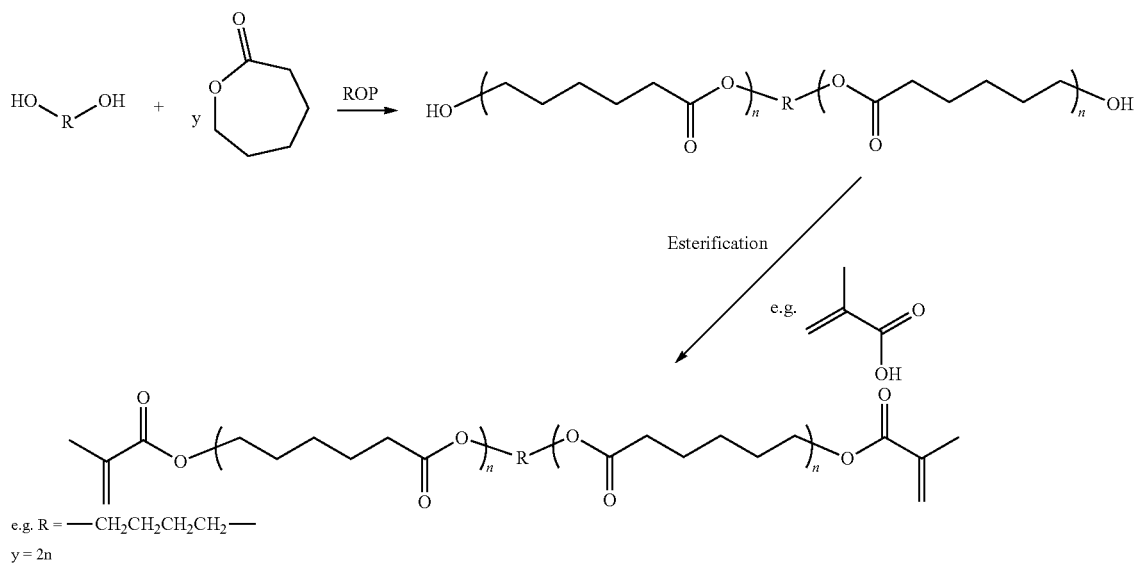

The ring opening polymerisation (ROP) may for example be acid-catalysed ROP, according to the activated monomer method which can use an acid catalyst such as for example methanesulfonic acid. An alternative method uses metal-catalysed ROP, for example uses tin(II) 2-ethylhexanoate catalyst. Esterification can optionally be carried out using activated acid such as methacryloyl chloride.

Other ways of degrading polymers include cleaving at acetal or ketal centres including for example the use of acid- or base-cleavable moieties.

In contrast to some prior art methods, cross-linking and insolubility are avoided not by using a combination of a predominant amount of monovinyl monomer and a lesser amount of divinyl monomer, but instead by controlling the way in which a divinyl monomer, or other multivinyl monomer, reacts.

The polymer contains a multiplicity of vinyl polymer chain segments, and controlling the amount or rate of chain transfer relative to the amount or rate of propagation affects the average length of those vinyl polymer chains.

Therefore, from a further aspect the present invention provides a method of preparing a branched polymer, wherein the branched polymer is responsive or degradable, comprising the free radical polymerisation of a divinyl monomer in the presence of a chain transfer agent, using a source of radicals, wherein propagation is controlled relative to chain transfer to achieve a polymer having a multiplicity of vinyl polymer chain segments wherein the average number of divinyl monomer residues per vinyl polymer chain is between 1 and 3.

From a further aspect the present invention provides a method of preparing a branched polymer, wherein the branched polymer is responsive or degradable comprising the free radical polymerisation of a multivinyl monomer in the presence of a chain transfer agent, using a source of radicals, wherein propagation is controlled relative to chain transfer to achieve a polymer having a multiplicity of vinyl polymer chain segments wherein the average number of multivinyl monomer residues per vinyl polymer chain is between 1 and 3.

From a further aspect the present invention provides a method of preparing a branched polymer, wherein the branched polymer is responsive or degradable comprising the free radical polymerisation of a trivinyl monomer in the presence of a chain transfer agent, using a source of radicals, wherein propagation is controlled relative to chain transfer to achieve a polymer having a multiplicity of vinyl polymer chain segments wherein the average number of trivinyl monomer residues per vinyl polymer chain is between 1 and 2.

From a further aspect the present invention provides a method of preparing a branched polymer, wherein the branched polymer is responsive or degradable comprising the free radical polymerisation of a tetravinyl monomer in the presence of a chain transfer agent, using a source of radicals, wherein propagation is controlled relative to chain transfer to achieve a polymer having a multiplicity of vinyl polymer chain segments wherein the average number of tetravinyl monomer residues per vinyl polymer chain is between 1 and 1.7.

The polymers of the present invention are branched in the sense that they contain vinyl polymer chains with branches (which may be termed bridges) between said vinyl polymer chains. Optionally the polymers of the present invention do not contain just bifurcation points (where, for example, one chain forks into two or more chains), but at least some of the vinyl polymer chains may extend either side of the branch (or bridge).

Any suitable source of radicals can be used for the free radical polymerisation. For example, this could be an initiator such as AIBN. A thermal or photochemical or other process can be used to provide free radicals.

In contrast to some prior art methods, a large amount of initiator is not required; only a small amount of a source of radicals is required in order to initiate the reaction.

The skilled person is able to control the chain transfer reaction relative to the propagation reaction by known techniques. This may be done by using a sufficiently large amount of a chain transfer agent (CTA). The chain transfer agent caps the vinyl polymer chains and thereby limits their length. It also controls the chain end chemistry. Various chain transfer agents are suitable and of low cost, and impart versatility to the method and resultant product.

The primary chains are kept very short so that gel formation is avoided, whilst at the same time a high level of branching is achieved.

An important advantage of the present invention is that industrial free radical polymerisation is used. This is completely scalable, very straightforward and extremely cost effective. In contrast, some prior art methods are based on controlled or living polymerisation and/or require the use of initiator systems or more complex purification procedures.

Optionally the only reagents used in the method of the present invention are one or more multivinyl monomer (for example a divinyl monomer), a chain transfer agent, a source of radicals, and optionally a solvent. Thus, in contrast to some prior art methods, the present invention allows the homopolymerisation of multivinyl monomers.

Monovinyl monomers are not required in the method of the present invention.

Optionally, however, monovinyl monomers may be used, i.e. optionally a copolymerisation may be carried out. For example, the method may comprise the incorporation of not only a divinyl monomer but also an amount, optionally a lesser amount, of monovinyl monomer. The molar amount of divinyl monomer relative to monovinyl monomer may be greater than 50%, greater than 75%, greater than 90% or greater than 95%, for example. Optionally, the ratio of divinyl monomer residues to monovinyl monomer residues may be greater than or equal to 1:1, or greater than or equal to 3:1, greater than or equal to 10:1 or greater than or equal to 20:1.

Alternatively, in some scenarios, more monovinyl monomer may be used. Optionally, the method may comprise the incorporation of not only one or more divinyl monomer but also monovinyl monomer, wherein for example 20% or more, 30% or more, 40% or more, 50% or more, 60% or more, 70% or more, 80% or more, 90% or more, or 95% or more, of the vinyl monomers used are divinyl monomers. Optionally, the method may comprise the incorporation of not only one or more divinyl monomer but also monovinyl monomer, wherein for example 20% or more, 30% or more, 40% or more, 50% or more, 60% or more, 70% or more, 80% or more, 90% or more, or 95% or more, of the vinyl monomers residues in the product are divinyl monomer residues.

The possible incorporation of monovinyl monomers is applicable not just with divinyl monomers but also with other types of multivinyl monomers. Accordingly, the method may comprise the incorporation of not only one or more multivinyl monomer but also monovinyl monomer, wherein for example 10% or more, 20% or more, 30% or more, 40% or more, 50% or more, 60% or more, 70% or more, 80% or more, 90% or more, or 95% or more, of the vinyl monomers used are multivinyl monomers. Optionally, the method may comprise the incorporation of not only one or more multivinyl monomer but also monovinyl monomer, wherein for example 10% or more, 20% or more, 30% or more, 40% or more, 50% or more, 60% or more, 70% or more, 80% or more, 90% or more, or 95% or more, of the vinyl monomers residues in the product are multivinyl monomer residues.

The presence of particular groups in the monofunctional monomer may be used to impart responsive and/or degradable or biodegradable characteristics to the polymer. Because monofunctional monomer cannot act as a brancher, the degradable or biodegradable moiety or moieties are positioned such that their cleavage does not directly remove branches between polymer chains but instead causes pendant groups to be removed. However, the presence of certain groups on pendant chains can affect responsivity and can (sometimes indirectly) facilitate or influence degradation.

For example, the presence of carboxylic acid groups can affect the response to and in water and can affect the behaviour of the product including the degradation of parts of the product including parts which are separate from the residue carrying the carboxylic acid functionality.

The types of degradable, biodegradable and responsive groups which may be used in monovinyl monomers are the same as those described above in relation to multivinyl and divinyl monomers. Thus the groups include esters, amides, ethers and amines and related groups. The monomers may contain —C—O—C(=O)— linkages, e.g. may contain ester linkages. The polymer may comprise carboxylic acid groups or groups derived from carboxylic acid groups. The monomers may comprise more than one carboxyl functionality as well as vinyl functionality, optionally monomers which comprise more than one carboxyl functionality as well as vinyl functionality which is α,β-unsaturated. A sub-class comprises monomers which comprise itaconic functionality as part of their structure, as described above. Thus, for example, a monovinyl monomer may comprise a compound derived from itaconic acid by for example esterification, for example esterification of both acid groups. Such a monovinyl monomer may for example be of the class:

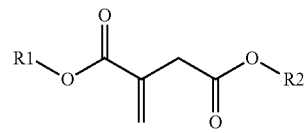

Where R1 and R2 may be any suitable group, for example alkyl groups which may optionally be substituted. In one embodiment R1 and R2 are both butyl.

Divinyl Monomer

One type of multivinyl monomer which may be used in the present invention is a divinyl monomer.

The divinyl monomer is responsive, degradable or biodegradable, or derived from renewable or sustainable sources.

The divinyl monomer contains two double bonds each of which is suitable for free radical polymerisation. It may contain one or more other group which for example may be selected from, but not limited to: aliphatic chains; esters; amides; esters; urethanes; silicones; amines; aromatic groups; oligomers or polymers; or a combination of one or more of these; and/or which may optionally be substituted. For example there may be PEG groups or PDMS groups between the double bonds, or a benzene ring (e.g. as in the monomer divinyl benzene) or other aromatic groups.

Each vinyl group in the divinyl monomer may for example be an acrylate, methacrylate, acrylamide, methacrylamide, vinyl ester, vinyl aliphatic, or vinyl aromatic (e.g. styrene) group.

Due to the large amount of chain transfer agent in the reaction, the vinyl polymer chains in the final product are generally quite short and the chemistry of the longest chains in the polymer may be governed by the other chemical species in the monomer. Thus, for example, monomers which contain, in addition to two vinyl groups, ester linkages (e.g. dimethacrylates, such as EGDMA) polymerise to form polyester structures, wherein the longest repeating units comprise esters. Similarly, monomers which contain, in addition to two vinyl groups, amide linkages (e.g. bisacrylamides) polymerise to form polyamide structures, wherein the longest repeating units comprise amides.

Thus the present invention opens up new ways of making polyesters, polyamides or other polymers, allowing the formation of different types of architecture to those previously considered possible.

The divinyl monomer may be stimuli-responsive, e.g. may be pH, thermally, or biologically responsive. The response may be degradation. The linkage between the two double bonds may for example be acid- or base-cleavable, for example may contain an acetal group. This allows the preparation of a commercial product which is a stimuli-responsive branched polymer. Alternatively the method of the present invention may comprise a further step of cleaving divinyl monomer to remove bridges in the polymer, such that the commercial product is one in which the linkages between vinyl polymer chains have been removed or reduced.

Optionally a mixture of divinyl monomers may be used. Thus two or more different divinyl monomers may be copolymerised.

Other Types of Multivinyl Monomer

Multivinyl monomers other than divinyl monomers may be used, for example, trivinyl monomers, tetravinyl monomers and/or monomers with more vinyl groups. Trivinyl monomers, in particular, are useful, as they can be sourced or prepared without significant difficulty, and allow further options for producing different types of branched polymers. The discussion, disclosures and teachings herein in relation to divinyl monomers also apply where appropriate, mutatis mutandis, to other multivinyl monomers.

Chain Transfer Agent (CTA)

Any suitable chain transfer agent may be used.

These include thiols, including optionally substituted aliphatic thiols, such as dodecane thiol (DDT). Another suitable chain transfer agent is alpha-methylstyrene dimer. Another is 2-isopropoxyethanol. Other compounds having functionality which is known to allow the transfer of radical chains may be used. These can be bespoke to bring about desired functionality to the polymers.

The chain-end chemistry can be tailored by the choice of CTA. Thus, hydrophobic/hydrophilic behaviour and other properties can be influenced. Alkyl thiols can have quite different properties to alcohol-containing groups, acid-containing groups, or amine-containing groups, for example.

Optionally, a mixture of CTAs may be used. Thus, two or more different CTAs may be incorporated into the product.

Relative Amounts of Chain Transfer Agent and Divinyl Monomer

The relative amounts of chain transfer agent and divinyl monomer can be modified easily and optimised by routine procedures to obtain non-gelled polymers without undue burden to the skilled person. The analysis of the products can be carried out by routine procedures, for example the relative amounts of chain transfer agent and divinyl monomer can be determined by NMR analysis.

Regarding the reagents used, optionally at least 1 equivalent, or between 1 and 10 equivalents, or between 1.2 and 10 equivalents, or between 1.3 and 10 equivalents, or between 1.3 and 5 equivalents, or between 1 and 5 equivalents, or between 1 and 3 equivalents, or between 1 and 2 equivalents, or between 1.2 and 3 equivalents, or between 1.2 and 2 equivalents, of chain transfer agent may be used relative to divinyl monomer. The presence of a large amount of chain transfer agent means that on average the primary vinyl polymer chains react, and are capped by, chain transfer agent, whilst they are short. This procedure amounts to telomerisation, i.e. the formation of short chains with small numbers of repeat units.

In the final product, there may be n+1 chain transfer agent moieties per n divinyl monomer moieties (thus tending to a 1:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (n+1):n are possible. Optionally, on average between 0.5 and 2 chain transfer agent moieties are present per divinyl monomer moiety, optionally between 0.7 and 1.5, optionally between 0.75 and 1.3, or between 0.8 and 1.2, or between 0.9 and 1.1, or between 1 and 1.05, or approximately 1.

Without wishing to be bound by theory, the (n+1):n relationship of this idealized scenario can be rationalized as follows. There may be one chain transfer agent per vinyl polymer chain (e.g. if the chain transfer agent is a thiol ("RSH") then an RS· radical is incorporated at one end of the chain and a H· radical at the other). The simplest theoretical product contains a single divinyl monomer wherein each of the two double bonds is capped by a chain transfer agent (such that each of the two double bonds can be considered a vinyl polymer chain having a length of only one vinyl group). Thus, in this simplest theoretical product there is one more chain transfer agent than divinyl monomer (2 vs. 1). For each additional propagation (i.e. for each further divinyl monomer which is incorporated) there needs to be one further chain transfer agent incorporated if there is to be a product of finite size and if there is to be no intramolecular crosslinking: this is because one double bond of the further divinyl monomer can be incorporated into one existing chain which does not need further chain transfer agent, whereas the other double bond of the further divinyl monomer requires a further chain transfer agent to cap it.

Therefore, according to this theoretical assessment, some examples of the ratio of chain transfer agent residues to divinyl monomer residues in the product are as follows:

| Number of DVMs in the polymer (n) | Equivalents of CTA per DVM in the polymer product [(n + 1)/n] |
| --- | --- |
| 1 | (1 + 1)/1 = 2 |
| 2 | (2 + 1)/2 = 1.5 |
| 3 | (3 + 1)/3 = 1.33 |
| 5 | (5 + 1)/5 = 1.2 |
| 10 | (10 + 1)/10 = 1.1 |
| 20 | (20 + 1)/20 = 1.05 |
| 50 | (50 + 1)/50 = 1.02 |
| 100 | (100 + 1)/100 = 1.01 |

It can be seen that the ratio of CTA:DVM tends towards 1 as the molecular weight increases.

Relative Amounts of Chain Transfer Agent and Trivinyl Monomer

Where the multivinyl monomer used is a trivinyl monomer, the following may optionally apply. Regarding the reagents used, optionally at least 2 equivalents, or between 2 and 20 equivalents, or between 2.4 and 20 equivalents, or between 2.6 and 20 equivalents, or between 2.6 and 10 equivalents, or between 2 and 10 equivalents, or between 2 and 6 equivalents, or between 2 and 4 equivalents, or between 2.4 and 6 equivalents, or between 2.4 and 4 equivalents, of chain transfer agent may be used relative to trivinyl monomer.

In the final product, there may be 2n+1 chain transfer agent moieties per n trivinyl monomer moieties (thus tending to a 2:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (2n+1):n are possible. Optionally, on average between 1 and 4 chain transfer agent moieties are present per trivinyl monomer moiety, optionally between 1.4 and 3, optionally between 1.5 and 2.6, or between 1.6 and 2.4, or between 1.8 and 2.2, or between 2 and 2.1, or approximately 2.

Without wishing to be bound by theory, the (2n+1):n relationship of this idealized scenario can be rationalized as follows. There may be one chain transfer agent per vinyl polymer chain (e.g. if the chain transfer agent is a thiol ("RSH") then an RS· radical is incorporated at one end of the chain and a H· radical at the other). The simplest theoretical product contains a single trivinyl monomer wherein each of the three double bonds is capped by a chain transfer agent (such that each of the three double bonds can be considered a vinyl polymer chain having a length of only one vinyl group). Thus, in this simplest theoretical product there are two more chain transfer agents than trivinyl monomer (3 vs. 1). For each additional propagation (i.e. for each further trivinyl monomer which is incorporated) there needs to be two further chain transfer agents incorporated if there is to be a product of finite size and if there is to be no intramolecular crosslinking: this is because one double bond of the further trivinyl monomer can be incorporated into one existing chain which does not need further chain transfer agent, whereas the other two double bonds of the further trivinyl monomer each require a further chain transfer agent to cap them.

Therefore, according to this theoretical assessment, some examples of the ratio of chain transfer agent residues to trivinyl monomer residues in the product are as follows:

| Number of TVMs in the polymer (n) | Equivalents of CTA per TVM in the polymer product [(2n + 1)/n] |
| --- | --- |
| 1 | (2 + 1)/1 = 3 |
| 2 | (4 + 1)/2 = 2.5 |
| 3 | (6 + 1)/3 = 2.33 |
| 5 | (10 + 1)/5 = 2.2 |
| 10 | (20 + 1)/10 = 2.1 |
| 20 | (40 + 1)/20 = 2.05 |
| 50 | (100 + 1)/50 = 2.02 |
| 100 | (200 + 1)/100 = 2.01 |

It can be seen that the ratio of CTA: trivinyl monomer tends towards 2 as the molecular weight increases.

Relative Amounts of Chain Transfer Agent and Tetravinyl Monomer

Where the multivinyl monomer used is a tetravinyl monomer, the following may optionally apply.

Regarding the reagents used, optionally at least 3 equivalents, or between 3 and 30 equivalents, or between 3.6 and 30 equivalents, or between 3.9 and 30 equivalents, or between 3.9 and 15 equivalents, or between 3 and 15 equivalents, or between 3 and 9 equivalents, or between 3 and 6 equivalents, or between 3.6 and 9 equivalents, or between 3.6 and 6 equivalents, of chain transfer agent may be used relative to tetravinyl monomer.

In the final product, there may be 3n+1 chain transfer agent moieties per n tetravinyl monomer moieties (thus tending to a 3:1 ratio as the molecular weight increases): this is based on a scenario where a theoretically ideal macromolecule of finite size is formed. Other scenarios are however possible, for example intramolecular loop reactions may occur or initiator may be incorporated: in practice, therefore, ratios other than (3n+1):n are possible. Optionally, on average between 1.5 and 6 chain transfer agent moieties are present per tetravinyl monomer moiety, optionally between 2.1 and 4.5, optionally between 2.25 and 3.9, or between 2.4 and 3.6, or between 2.7 and 3.3, or between 3 and 3.15, or approximately 3.

Without wishing to be bound by theory, the (3n+1):n relationship of this idealized scenario can be rationalized as follows. There may be one chain transfer agent per vinyl polymer chain (e.g. if the chain transfer agent is a thiol ("RSH") then an RS· radical is incorporated at one end of the chain and a H· radical at the other). The simplest theoretical product contains a single tetravinyl monomer wherein each of the four double bonds is capped by a chain transfer agent (such that each of the four double bonds can be considered a vinyl polymer chain having a length of only one vinyl group). Thus, in this simplest theoretical product there are three more chain transfer agents than tetravinyl monomer (4 vs. 1). For each additional propagation (i.e. for each further tetravinyl monomer which is incorporated) there need to be three further chain transfer agents incorporated if there is to be a product of finite size and if there is to be no intramolecular crosslinking: this is because one double bond of the further tetravinyl monomer can be incorporated into one existing chain which does not need further chain transfer agent, whereas the other three double bonds of the further tetravinyl monomer each require a further chain transfer agent to cap them.

Therefore, according to this theoretical assessment, some examples of the ratio of chain transfer agent residues to tetravinyl monomer residues in the product are as follows:

| Number of tetravinyl monomers in the polymer (n) | Equivalents of CTA per tetravinyl monomer in the polymer product [(3n + 1)/n] |
| --- | --- |
| 1 | (3 + 1)/1 = 4 |
| 2 | (6 + 1)/2 = 3.5 |
| 3 | (9 + 1)/3 = 3.33 |
| 5 | (15 + 1)/5 = 3.2 |
| 10 | (30 + 1)/10 = 3.1 |
| 20 | (60 + 1)/20 = 3.05 |
| 50 | (150 + 1)/50 = 3.02 |
| 100 | (300 + 1)/100 = 3.01 |

It can be seen that the ratio of CTA: tetravinyl monomer tends towards 3 as the molecular weight increases.

Relative Amounts of Chain Transfer Agent and Multivinyl Monomer

Numerical relationships and theoretical assessments have been presented above for each of divinyl monomers, trivinyl monomers and tetravinyl monomers.

In summary, without wishing to be bound by theory, in certain idealised scenarios the number of CTA residues per n MVM residues in the final product may be as follows:

| | Number of CTA residues per n MVM residues in final product | as n tends to infinity, the ratio tends towards |
|---|---|---|
| Divinyl monomer | n + 1 | 1:1 |
| Trivinyl monomer | 2n + 1 | 2:1 |
| Tetravinyl monomer | 3n + 1 | 3:1 |

Thus it can be seen that, as the valency of the monomer increases, more and more CTA is required to be present in the final product to cap the chains, unless some other mechanism (e.g. intramolecular reaction) does that.

In general the following may optionally apply across the various types of multivinyl monomers discussed herein. Regarding the reagents used, optionally at least 1 equivalent, or between 1 and 30 equivalents, or between 1.2 and 30 equivalents, or between 1.3 and 30 equivalents, or between 1.3 and 15 equivalents, or between 1 and 15 equivalents, or between 1 and 9 equivalents, or between 1 and 6 equivalents, or between 1.2 and 9 equivalents, or between 1.2 and 6 equivalents, of chain transfer agent may be used relative to multivinyl monomer. In the final product, optionally, on average between 0.5 and 6 chain transfer agent moieties are present per multivinyl monomer moiety, optionally between 0.7 and 4.5, optionally between 0.75 and 3.9, or between 0.8 and 3.6, or between 0.9 and 3.3, or between 1 and 3.15, or between approximately 1 and approximately 3.

Extent of Vinyl Polymerization

We believe that one important feature of the method of the present invention is that the average length of the vinyl polymer chains within the overall polymer is short. A typical polymeric molecule prepared in accordance with the present invention will contain many vinyl polymer chains (each of which is on average quite short) linked together by the moiety which in the multivinyl monomer is between the double bonds.

This is achieved by adjusting the conditions, including the amount of chain transfer agent, so that the rate of chain transfer competes with the rate of vinyl polymerization to the desired extent. The identities of the multivinyl monomer and the chain transfer agent, as well as other factors, affect this balance, but the progress of the reaction can be easily monitored and the properties of the resultant polymer easily determined, by known, routine, techniques. Therefore there is no undue burden to the skilled person in carrying out a method in accordance with the present invention, or in determining which methods fall within the scope of the present invention. The resulting chain length in this context is the kinetic chain length.

Extent of Vinyl Polymerisation when Using Divinyl Monomers

The number of propagation steps (i.e. how many divinyl monomers are added) before each chain transfer (i.e. termination of the growing vinyl polymer chain) needs to be high enough to generate a branched polymer but low enough to prevent gelation. It appears that an average vinyl polymer chain length of between 1 and 3, between 1 and 2.5, between 1 and 2.2, between 1 and 2, between 1.3 and 2, between 1.5 and 2, between 1.7 and 2, between 1.8 and 2, between 1.9 and 2, or between 1.95 and 2, or of approximately 2, divinyl monomer residues, is suitable.

Whilst the average may optionally be between 1 and 3, a small number of vinyl polymer chains may contain significantly more divinyl monomer residues, for example as many as 10, 15, 18, 20 or more.

Optionally 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer.

Without wishing to be bound by theory, the average vinyl polymer chain length, or kinetic chain length, in a scenario which assumes that there is no intramolecular reaction, can be calculated as follows. If, as discussed above there are n+1 chain transfer agent moieties per n divinyl monomer moieties, and one chain transfer agent per vinyl polymer chain, then, because there are 2n double bonds per n divinyl monomers, the number of double bond residues per chain will on average be $2n/(n+1)$ which will tend towards 2 as the molecular weight increases.

Therefore, according to this theoretical assessment, some examples of average vinyl chain length are as follows:

| Number of DVMs in the polymer (n) | Average number of DVM residues per vinyl polymer chain [2n/(n + 1)] |
|---|---|
| 1 | (2 × 1)/(1 + 1) = 1 |
| 2 | (2 × 2)/(2 + 1) = 1.33 |
| 3 | (2 × 3)/(3 + 1) = 1.5 |
| 5 | (2 × 5)/(5 + 1) = 1.67 |
| 10 | (2 × 10)/(10 + 1) = 1.82 |
| 20 | (2 × 20)/(20 + 1) = 1.90 |
| 50 | (2 × 50)/(50 + 1) = 1.96 |
| 100 | (2 × 100)/(100 + 1) = 1.98 |

It can be seen that the range, for the average kinetic chain length under certain theoretical conditions, is between 1 and 2. In practice the value may fall outside this range: other reactions, for example intramolecular polymerisation, may occur.

The skilled person will understand that the process makes a range of products which, depending on the conditions, can include low molecular weight products (the smallest being the product containing just one DVM, i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Empirically, the appropriate extent of polymerization has been determined by 1) taking a representative monofunctional monomer that resembles the multifunctional monomer chemically, 2) taking the CTA of interest, 3) conducting a range of linear polymerizations at varying CTA/monomer ratios, 4) analysing the products and 5) determining the average chain length.

Amongst the DVMs which we have used are DVMs which contain cleavable groups between the two vinyl groups. These not only enable interesting and commercially useful products to be prepared but also allow the extent of vinyl polymerisation to be investigated.

As exemplified below, we have carried out polymerisations with degradable DVMs then subjected the products to conditions which have cleaved the DVMs. This breaks the bridges within the branched vinyl polymer to result in a series of linear vinyl chains. Analysis of these shows the distribution of vinyl polymer chain lengths which are formed by the process of the present invention. Interestingly, reaction of analogous monovinyl monomers gives very similar chain length distributions. This supports the theoretical analysis outlined above, shows that the process can be tailored, and implies that polymerisation can proceed effectively regardless of whether DVM is homopolymerised or DVM is polymerised with some monovinyl monomer present.

Optionally, the product may contain a large amount of divinyl monomer residues wherein one of the double bond residues is capped with a chain transfer agent (as opposed to being part of a chain), i.e. has a nominal chain length of 1. The other double bond residues of those divinyl monomer residues may be part of a longer chain. This may be the most common form of the vinyl residue in the product. Optionally the most common vinyl "chain" is that which contains only one divinyl monomer residue. Optionally the two most common vinyl chains are (i) the vinyl "chain" which contains only one divinyl monomer residue and (ii) a vinyl chain which contains an integer selected from between 2 and 8, e.g. between 2 and 7, e.g. between 2 and 6, e.g. between 3 and 8, e.g. between 3 and 7, e.g. between 3 and 6, e.g. between 3 and 5, e.g. 4 or 5, e.g. 5, divinyl monomer residues. Optionally the most common vinyl "chain" is that which contains only one divinyl monomer residue, and the second most common vinyl chain contains an integer selected from between 2 and 8, e.g. between 2 and 7, e.g. between 2 and 6, e.g. between 3 and 8, e.g. between 3 and 7, e.g. between 3 and 6, e.g. between 3 and 5, e.g. 4 or 5, e.g. 5, divinyl monomer residues. Optionally the distribution of chain lengths may be bimodal, e.g. the maxima may be at chain length 1 and at a second chain length which may optionally be between 3 and 8, e.g. between 3 and 7, e.g. between 3 and 6, e.g. between 3 and 5, e.g. 4 or 5, e.g. 5.

Extent of Vinyl Polymerisation when Using Trivinyl Monomers

The number of propagation steps (i.e. how many trivinyl monomers are added) before each chain transfer (i.e. termination of the growing vinyl polymer chain) needs to be high enough to generate a branched polymer but low enough to prevent gelation. It appears that an average vinyl polymer chain length of between 1 and 2, between 1 and 1.8, between 1 and 1.7, between 1 and 1.5, between 1.1 and 1.5, between 1.2 and 1.5, between 1.25 and 1.5, between 1.3 and 1.5, between 1.4 and 1.5, or between 1.45 and 1.5, or of approximately 1.5, trivinyl monomer residues, is suitable.

Whilst the average may optionally be between 1 and 2, a small number of vinyl polymer chains may contain significantly more trivinyl monomer (TVM) residues, for example as many as 5, 10, 15, 18, 20 or more.

Optionally 90% of the vinyl polymer chains contain fewer than 8 TVM residues, or 90% have a length of 5 or fewer, or 90% have a length of 4 or fewer, or 95% have a length of 10 or fewer, or 95% have a length of 8 or fewer, or 95% have a length of 5 or fewer, or 75% have a length of 8 or fewer, or 75% have a length of 6 or fewer, or 75% have a length of 4 or fewer, or 75% have a length of 3 or fewer, or 75% have a length of 2 or fewer.

Without wishing to be bound by theory, the average vinyl polymer chain length, or kinetic chain length, in a scenario which assumes that there is no intramolecular reaction, can be calculated as follows. If, as discussed above there are $2n+1$ chain transfer agent moieties per $n$ trivinyl monomer moieties, and one chain transfer agent per vinyl polymer chain, then, because there are $3n$ double bonds per $n$ trivinyl monomers, the number of double bond residues per chain will on average be $3n/(2n+1)$ which will tend towards 1.5 as the molecular weight increases.

Therefore, according to this theoretical assessment, some examples of average vinyl chain length are as follows:

| Number of TVMs in the polymer (n) | Average number of TVM residues per vinyl polymer chain [3n/(2n + 1)] |
|---|---|
| 1 | (3 × 1)/(2 + 1) = 1 |
| 2 | (3 × 2)/(4 + 1) = 1.2 |
| 3 | (3 × 3)/(6 + 1) = 1.29 |
| 5 | (3 × 5)/(10 + 1) = 1.36 |
| 10 | (3 × 10)/(20 + 1) = 1.43 |
| 20 | (3 × 20)/(40 + 1) = 1.46 |
| 50 | (3 × 50)/(100 + 1) = 1.49 |
| 100 | (3 × 100)/(200 + 1) = 1.49 |

It can be seen that the range, for the average kinetic chain length under certain theoretical conditions, is between 1 and 1.5. In practice the value may fall outside this range: other reactions, for example intramolecular polymerisation, may occur.

The skilled person will understand that the process makes a range of products which, depending on the conditions, can include low molecular weight products (the smallest being the product containing just one TVM, i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Optionally, the product may contain a large amount of trivinyl monomer residues wherein two of the double bond residues are capped with a chain transfer agent (as opposed to being part of a chain), i.e. have a nominal chain length of 1. The other double bond residues of those trivinyl monomer residues may be part of a longer chain. This may be the most common form of the vinyl residue in the product. Optionally the most common vinyl "chain" is that which contains only one trivinyl monomer residue. Optionally the two most common vinyl chains are (i) the vinyl "chain" which contains only one trivinyl monomer residue and (ii) a vinyl chain which contains an integer selected from between 2 and 7, e.g. between 2 and 6, e.g. between 2 and 5, e.g. between 3 and 7, e.g. between 3 and 6, e.g. between 3 and 5, e.g. 3 or 4, e.g. 3 or e.g. 4, trivinyl monomer residues. Optionally the most common vinyl "chain" is that which contains only one trivinyl monomer residue, and the second most common vinyl chain contains an integer selected from between 2 and 7, e.g. between 2 and 6, e.g. between 2 and 5, e.g. between 3 and 7, e.g. between 3 and 6, e.g. between 3 and 5, e.g. 3 or 4, e.g. 3 or e.g. 4, trivinyl monomer residues. Optionally the distribution of chain lengths may be bimodal, e.g. the maxima may be at chain length 1 and at a second chain length which may optionally be between 3 and 7, e.g. between 3 and 6, e.g. between 3 and 5, e.g. 3 or 4, e.g. 3 or e.g. 4.

Extent of Vinyl Polymerisation when Using Tetravinyl Monomers

The number of propagation steps (i.e. how many tetravinyl monomers are added) before each chain transfer (i.e. termination of the growing vinyl polymer chain) needs to be high enough to generate a branched polymer but low enough to prevent gelation. It appears that an average vinyl polymer chain length of between 1 and 1.7, between 1 and 1.5, between 1 and 1.4, between 1 and 1.33, between 1.1 and 1.33, between 1.2 and 1.33, between 1.25 and 1.33, or between 1.3 and 1.33, or of approximately 1.33, tetravinyl monomer residues, is suitable.

Whilst the average may optionally be between 1 and 1.7, a small number of vinyl polymer chains may contain significantly more tetravinyl monomer residues, for example as many as 3, 5, 10, 15, 18, 20 or more.

Optionally 90% of the vinyl polymer chains contain fewer than 6 tetravinyl monomer residues, or 90% have a length of 4 or fewer, or 90% have a length of 3 or fewer, or 90% have a length of 2 or fewer, or 95% have a length of 8 or fewer, or 95% have a length of 6 or fewer, or 95% have a length of 4 or fewer, or 95% have a length of 3 or fewer, or 75% have a length of 5 or fewer, or 75% have a length of 4 or fewer, or 75% have a length of 3 or fewer, or 75% have a length of 2 or fewer.

Without wishing to be bound by theory, the average vinyl polymer chain length, or kinetic chain length, in a scenario which assumes that there is no intramolecular reaction, can be calculated as follows. If, as discussed above there are $3n+1$ chain transfer agent moieties per n tetravinyl monomer moieties, and one chain transfer agent per vinyl polymer chain, then, because there are $4n$ double bonds per n tetravinyl monomers, the number of double bond residues per chain will on average be $4n/(3n+1)$ which will tend towards 1.33 as the molecular weight increases.

Therefore, according to this theoretical assessment, some examples of average vinyl chain length are as follows:

| Number of tetravinyl monomers in the polymer (n) | Average number of tetravinyl monomer residues per vinyl polymer chain $[4n/(3n + 1)]$ |
| --- | --- |
| 1 | $(4 \times 1)/(3 + 1) = 1$ |
| 2 | $(4 \times 2)/(6 + 1) = 1.14$ |
| 3 | $(4 \times 3)/(9 + 1) = 1.20$ |
| 5 | $(4 \times 5)/(15 + 1) = 1.25$ |
| 10 | $(4 \times 10)/(30 + 1) = 1.29$ |
| 20 | $(4 \times 20)/(60 + 1) = 1.31$ |
| 50 | $(4 \times 50)/(150 + 1) = 1.32$ |
| 100 | $(4 \times 100)/(300 + 1) = 1.33$ |

It can be seen that the range, for the average kinetic chain length under certain theoretical conditions, is between 1 and 1.33. In practice the value may fall outside this range: other reactions, for example intramolecular polymerisation, may occur.

The skilled person will understand that the process makes a range of products which, depending on the conditions, can include low molecular weight products (the smallest being the product containing just one tetravinyl monomer residue i.e. wherein the vinyl chain length is 1) up to high molecular weight products. Whether the product mixture is purified, and how it is purified, will of course affect the composition of the product and accordingly the length of vinyl polymer chains present. Thus, in some scenarios, where lower molecular weight products are removed, the average vinyl polymer chain length in the resultant purified product may be higher.

Optionally, the product may contain a large amount of tetravinyl monomer residues wherein three of the double bond residues are capped with a chain transfer agent (as opposed to being part of a chain), i.e. have a nominal chain length of 1. The other double bond residues of those tetravinyl monomer residues may be part of a longer chain. This may be the most common form of the vinyl residue in the product. Optionally the most common vinyl "chain" is that which contains only one tetravinyl monomer residue. Optionally the two most common vinyl chains are (i) the vinyl "chain" which contains only one tetravinyl monomer residue and (ii) a vinyl chain which contains an integer selected from between 2 and 6, e.g. between 2 and 5, e.g. between 2 and 4, e.g. between 3 and 6, e.g. between 3 and 5, e.g. 3 or 4, e.g. 3 or e.g. 4, tetravinyl monomer residues. Optionally the most common vinyl "chain" is that which contains only one tetravinyl monomer residue, and the second most common vinyl chain contains an integer selected from between 2 and 6, e.g. between 2 and 5, e.g. between 2 and 4, e.g. between 3 and 6, e.g. between 3 and 5, e.g. 3 or 4, e.g. 3 or e.g. 4, tetravinyl monomer residues. Optionally the distribution of chain lengths may be bimodal, e.g. the maxima may be at chain length 1 and at a second chain length which may optionally be between 3 and 6, e.g. between 3 and 5, e.g. 3 or 4, e.g. 3 or e.g. 4.

Extent of Vinyl Polymerisation when Using Multivinyl Monomers in General

Numerical relationships and theoretical assessments have been presented above for each of divinyl monomers, trivinyl monomers and tetravinyl monomers.

In summary, without wishing to be bound by theory, in certain idealised scenarios the average number of multivinyl monomer residues per vinyl polymer chain may be as follows, where the product contains n multivinyl monomer residues:

| | Average number of multivinyl monomer residues per vinyl polymer chain in final product | as n tends to infinity, the average number of MVM residues per vinyl polymer chain tends towards |
| --- | --- | --- |
| Divinyl monomer | $2n/(n + 1)$ | 2 |
| Trivinyl monomer | $3n/(2n + 1)$ | 1.5 |
| Tetravinyl monomer | $4n/(3n + 1)$ | 1.33 |

Thus it can be seen that, as the valency of the monomers increases, the average vinyl chain length is required to decrease.

In general the following may optionally apply across the various types of multivinyl monomers discussed herein.

The average vinyl polymer chain length may contain the following number of multivinyl monomer residues: between 1 and 3, between 1 and 2.5, between 1 and 2.2, between 1 and 2, between 1.1 and 2, between 1.2 and 2, between 1.3 and 2, between 1.33 and 2, between 1.5 and 2, between 1.8 and 2, between 1.9 and 2, between 1.95 and 2, between 1.2 and 1.5, between 1.3 and 1.5, between 1.4 and 1.5, between 1.45 and 1.5, between 1.1 and 1.4, between 1.2 and 1.4, between 1.2 and 1.33, or between 1.3 and 1.33.

Whilst the average may optionally be between 1 and 3, a small number of vinyl polymer chains may contain significantly more multivinyl monomer residues, for example as many as 3, 5, 8, 10, 15, 18, 20 or more.

Optionally 90% of the vinyl polymer chains contain fewer than 10 multivinyl monomer residues, or 90% have a length of 7 or fewer, or 90% have a length of 5 or fewer, or 90% have a length of 4 or fewer, or 90% have a length of 3 or fewer, or 90% have a length of 2 or fewer, or 95% have a length of 15 or fewer, or 95% have a length of 10 or fewer, or 95% have a length of 7 or fewer, or 95% have a length of 5 or fewer, or 95% have a length of 4 or fewer, or 95% have a length of 3 or fewer, or 75% have a length of 10 or fewer, or 75% have a length of 7 or fewer, or 75% have a length of 5 or fewer, or 75% have a length of 4 or fewer, or 75% have a length of 3 or fewer, or 75% have a length of 2 or fewer.

Optionally, the product may contain a large amount of multivinyl monomer residues wherein all but one of the double bond residues in the multivinyl monomer residue is capped with a chain transfer agent (as opposed to being part of a chain), i.e. has a nominal chain length of 1. The remaining double bond residue of the multivinyl monomer residues may be part of a longer chain. This may be the most common form of the vinyl residue in the product. Optionally the most common vinyl "chain" is that which contains only one multivinyl monomer residue. Optionally the two most common vinyl chains are (i) the vinyl "chain" which contains only one multivinyl monomer residue and (ii) a vinyl chain which contains an integer selected from between 2 and 8, e.g. between 2 and 7, e.g. between 2 and 6, e.g. between 2 and 5, e.g. between 3 and 8, e.g. between 3 and 7, e.g. between 3 and 6, e.g. between 3 and 5, e.g. 3, e.g. 4 or e.g. 5 multivinyl monomer residues. Optionally the most common vinyl "chain" is that which contains only one multivinyl monomer residue, and the second most common vinyl chain contains an integer selected from between 2 and 8, e.g. between 2 and 7, e.g. between 2 and 6, e.g. between 2 and 5, e.g. between 3 and 8, e.g. between 3 and 7, e.g. between 3 and 6, e.g. between 3 and 5, e.g. 3, e.g. 4 or e.g. 5, multivinyl monomer residues. Optionally the distribution of chain lengths may be bimodal, e.g. the maxima may be at chain length 1 and at a second chain length which may optionally be between 3 and 8, e.g. between 3 and 7, e.g. between 3 and 6, e.g. between 3 and 5, e.g. 3, 4 or 5.

Source of Radicals

The source of radicals may be an initiator such as azoisobutyronitrile (AIBN). Optionally the amount used relative to divinyl monomer may be 0.001 to 1, 0.01 to 0.1, 0.01 to 0.05, 0.02 to 0.04 or approximately 0.03 equivalents. In view of the presence of two double bonds per monomer this equates to 0.0005 to 0.5, 0.005 to 0.05, 0.005 to 0.025, 0.01 to 0.02 or approximately 0.015 equivalents relative to double bond.

It has been found that the reactions proceed effectively when only small amounts of initiator are used. Reducing the amount of initiator means that the reactions may proceed more slowly but still at speeds which are industrially acceptable. Lower amounts of initiator are beneficial in terms of cost, residual effect in the product, and controlling the exotherm to enhance safety and facilitate manageable reactions even when scaled up.

Other possible sources of radicals include peroxides, organo-boranes, persulphates or UV-initiated systems.

Reaction Conditions

The reaction may be carried out under conventional industrial free radical polymerisation conditions. Optionally a solvent such as for example toluene may be used.

As the reaction conditions become more dilute (e.g. as shown in the Examples below where the solids content is reduced from 50 wt % to 10 wt %), the amount of CTA in the product can decrease. Without wishing to be bound by theory, this may be because at greater dilution intramolecular reaction is more likely, meaning that, effectively, reaction of the molecule with itself takes the place of reaction of the molecule with a CTA molecule. Accordingly, this can alter the numerical relationships discussed above, because these assume a theoretical situation in which there is no intramolecular reaction.

This provides a further way of controlling the chemistry and tailoring the type of product and its properties. For example, whereas in some scenarios it may be desirable to have a large amount of CTA residue in the product, in other scenarios it is desirable not to, for example to reduce the amount of thiol residues. Furthermore, carrying out the same reaction at different dilutions can lead to different physical properties such that for example some products are solids and others are liquids. Ways of manipulating the glass-transition temperature and/or melting temperature can be useful for various applications.

Conversion

In accordance with the present invention, polymerization may proceed to the extent that the polymer product contains very little, substantially no, or no, residual vinyl functionality.

Optionally, no more than 20 mol %, no more than 10 mol %, no more than 5 mol %, no more than 2 mol %, or no more than 1 mol %, of the radically polymerizable double bonds of the multivinyl monomer, e.g. of the divinyl monomer, remain in the polymer. As shown below, NMR analysis has indicated that products of the present invention can be obtained with no measurable residual vinyl signals. This is clearly advantageous in controlling the chemistry and consequent properties of the product.

In contrast, some prior art using ATRP or RAFT methods discloses stopping polymerizations at lower conversion levels such that there may for example be more than 30% of the double bonds remaining. This is done in the prior art in order to prevent gelation.

By using a large amount of CTA, and/or controlling other aspects of the reaction, the present invention not only avoids gelation but also allows substantially complete conversion.

The method of the present invention is also advantageous in allowing complete reaction in a short space of time. We have observed that, on a laboratory scale, reaction is substantially complete after about 2.5 hours: after that point there is no significant increase in molecular weight distribution (as measured by size exclusion chromatography). Even on an industrial scale it is expected that the process would be completed within 8 hours i.e. within a single working shift. Under dilute conditions the process may take longer but still reach acceptable conversion after a reasonable period of time.

Whilst, from the first aspect above, reference has been made to preventing gelation, from other aspects it is instead possible to define the invention in terms of the other features described above, solely or in combination, e.g. the amount of chain transfer agent, extent of conversion, and/or amount of initiator. For example, the present invention provides a method of preparing a branched polymer comprising the free radical polymerisation of a divinyl monomer in the presence of a chain transfer agent, using a source of radicals, wherein 1 to 10 molar equivalents of chain transfer agent are used relative to divinyl monomer, and/or wherein the polymer product contains on average 0.9 to 1.1 chain transfer agent moieties per divinyl monomer moiety, and/or wherein the average vinyl polymer chain length is between 1.8 and 2 divinyl monomer residues, and/or wherein conversion of divinyl monomer to polymer is 80% or more, and/or wherein 0.001 to 1 molar equivalents of radical source are used relative to divinyl monomer. In other examples, the present invention provides a method of preparing a branched polymer comprising the free radical polymerisation of a multivinyl monomer in the presence of a chain transfer agent, using a source of radicals, wherein 1 to 6 molar equivalents of chain transfer agent are used relative to multivinyl monomer, and/or wherein the polymer product contains on average 1 to 3 chain transfer agent moieties per multivinyl monomer moiety, and/or wherein the average vinyl polymer chain length is between 1.33 and 2 multivinyl monomer residues, and/or wherein conversion of multivinyl monomer to polymer is 80% or more, and/or wherein 0.001 to 1 molar equivalents of radical source are used relative to multivinyl monomer.

Polymer Products

The present invention relates not only to a new method of polymerisation but to corresponding polymerisation products. The process imparts particular distinguishing characteristics (particularly in terms of architecture, branching and solubility).

Therefore, from a further aspect the present invention provides a polymer obtainable by the process of the present invention.

From a yet further aspect the present invention provides a polymer obtained by the process of the present invention.

Nevertheless it is also possible to define the polymers of the present invention in terms of their structure rather than in terms of the process used to make them.

Accordingly, from a further aspect the present invention provides a responsive or degradable branched polymer product comprising divinyl monomer residues and chain transfer residues, wherein the molar ratio of chain transfer residues to divinyl monomer residues is between 0.5 and 2. The ratio is optionally between 0.7 and 1.5, optionally between 0.75 and 1.3, optionally between 0.8 and 1.2, optionally between 0.9 and 1.1, optionally between 1 and 1.05, optionally approximately 1.

Some of the vinyl polymer chains may contain as many as 18, or 15, divinyl monomer residues. Only a small proportion are this long, however: the average, for high molecular weight materials, may be around 2.

Optionally 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer).

Thus the present invention provides a branched responsive or degradable polymer product comprising divinyl monomer residues and chain transfer residues, wherein 90% of the vinyl polymer chains contain fewer than 10 DVM residues, or 90% have a length of 7 or fewer, or 90% have a length of 5 or fewer, or 95% have a length of 15 or fewer, or 95% have a length of 10 or fewer, or 95% have a length of 7 or fewer, or 75% have a length of 10 or fewer, or 75% have a length of 7 or fewer, or 75% have a length of 5 or fewer, or 75% have a length of 4 or fewer, or 75% have a length of 3 or fewer).

During the reaction, it is possible that neither of the two carbon atoms of a vinyl group forms a bond to another vinyl group (instead they could form a bond to a CTA residue or hydrogen, or, in some cases, other moiety such as initiator residue or solvent residue), or it is possible that one of the two carbon atoms of a vinyl group forms a bond to another vinyl group, or it is possible that both carbon atoms of a vinyl group form bonds to other vinyl groups. Therefore, in the product, each vinyl residue may be directly linked to 0, 1 or 2 other vinyl residues as closest neighbours. We have found that where the mean of this number is within particular ranges, then effective branched polymers are obtained. Therefore, from a further aspect the present invention provides a branched polymer product comprising divinyl monomer residues and chain transfer residues, wherein each vinyl residue is directly vinyl polymerised to on average 0.5 to 1.5 other divinyl monomer residue. Optionally this may be 0.8 to 1.2, 0.8 to 1.1, 0.9 to 1, or approximately 1, on average.

Thus the polymers of the present invention are characterised by having a large amount of chain transfer agent incorporation, and also by having short distinct vinyl polymer chains. Whereas, conventionally, a vinyl polymer chain will normally comprise a long saturated backbone, in the present invention—even though the polymers are built up using vinyl polymerisation—most of the double bonds only react with one other double bond, or react with no other double bonds, rather than react with two other double bonds. This means that the linkages between the two double bonds in the monomer, which linkages conventionally bring about branching between polymer chains in the prior art, instead form the backbone of the longest polymer chains in the present invention. This is conceptually different from the prior art and represents a step change in how branched polymerisation may be achieved.

As discussed above, a further way of defining the present invention is in terms of the limited length of vinyl chain segments within the polymer.

Therefore, from a further aspect the present invention provides a responsive or degradable branched polymer product comprising divinyl monomer residues and chain transfer residues, wherein the branched polymer product comprises a multiplicity of vinyl polymer chain segments having an average length of between 1 and 3 divinyl monomer residues.

The average length may be between 1 and 2.5, between 1 and 2.2, between 1 and 2, between 1.3 and 2, between 1.5 and 2, between 1.7 and 2, between 1.8 and 2, between 1.9 and 2, between 1.95 and 2, or approximately 2.

The skilled person will understand how the number of double bond residues affects the carbon chain length of the resultant vinyl polymer segment. For example, where a polymer chain segment comprises 2 double bond residues, this equates to a saturated carbon chain segment of 4 carbon atoms.

The incorporation of monovinyl monomers as well as divinyl monomers may affect the average vinyl chain length but does not affect the average number of divinyl monomer residues per chain. It can be a way of increasing the vinyl chains without increasing branching.

The product can also be defined in terms of the amount of residual vinyl functionality.

Thus, from a further aspect the present invention provides a responsive or degradable branched polymer product comprising divinyl monomer residues and chain transfer residues wherein the divinyl monomer residues comprise less than 20 mol % double bond functionality.

In other words, in such polymer products, at least 80% of the double bonds of the divinyl monomers have reacted to form saturated carbon-carbon chains.

The residues may comprise less than 10 mol %, or less than 5 mol %, or less than 2 mol %, or less than 1 mol %, or substantially no, double bond functionality.

Another way of defining the product is in terms of its Mark Houwink alpha value. Optionally, this may be below 0.5.

The above description of polymer products relates in particular to those containing divinyl monomer residues. Analogously, the present invention provides polymer products containing other multivinyl monomer residues including for example trivinyl monomer residues and tetravinyl monomer residues. Disclosures herein relating to the polymerisation methods are applicable also to the resultant products.

Thus, the present invention provides a responsive or degradable branched polymer product comprising multivinyl monomer residues and chain transfer residues, wherein the molar ratio, on average, of chain transfer residues to multivinyl monomer residues may optionally be:

for multivinyl monomers generally:
between 0.5 and 6, between 0.7 and 4.5, between 0.75 and 3.9, between 0.8 and 3.6, between 0.9 and 3.3, between 1 and 3.15, or between approximately 1 and approximately 3;

for trivinyl monomers:
between 1 and 4, between 1.4 and 3, between 1.5 and 2.6, between 1.6 and 2.4, between 1.8 and 2.2, between 2 and 2.1, or approximately 2;

for tetravinyl monomers:
between 1.5 and 6, between 2.1 and 4.5, between 2.25 and 3.9, between 2.4 and 3.6, between 2.7 and 3.3, between 3 and 3.15, or approximately 3.

Furthermore the present invention provides a responsive or degradable branched polymer product comprising multivinyl monomer residues and chain transfer residues, wherein optionally:

for multivinyl monomers generally:
90% of the vinyl polymer chains contain fewer than 10 multivinyl monomer residues, or 90% have a length of 7 or fewer, or 90% have a length of 5 or fewer, or 90% have a length of 4 or fewer, or 90% have a length of 3 or fewer, or 90% have a length of 2 or fewer, or 95% have a length of 15 or fewer, or 95% have a length of 10 or fewer, or 95% have a length of 7 or fewer, or 95% have a length of 5 or fewer, or 95% have a length of 4 or fewer, or 95% have a length of 3 or fewer, or 75% have a length of 10 or fewer, or 75% have a length of 7 or fewer, or 75% have a length of 5 or fewer, or 75% have a length of 4 or fewer, or 75% have a length of 3 or fewer, or 75% have a length of 2 or fewer;

for trivinyl monomers:
90% of the vinyl polymer chains contain fewer than 8 TVM residues, or 90% have a length of 5 or fewer, or 90% have a length of 4 or fewer, or 95% have a length of 10 or fewer, or 95% have a length of 8 or fewer, or 95% have a length of 5 or fewer, or 75% have a length of 8 or fewer, or 75% have a length of 6 or fewer, or 75% have a length of 4 or fewer, or 75% have a length of 3 or fewer, or 75% have a length of 2 or fewer;

for tetravinyl monomers:
90% of the vinyl polymer chains contain fewer than 6 tetravinyl monomer residues, or 90% have a length of 4 or fewer, or 90% have a length of 3 or fewer, or 90% have a length of 2 or fewer, or 95% have a length of 8 or fewer, or 95% have a length of 6 or fewer, or 95% have a length of 4 or fewer, or 95% have a length of 3 or fewer, or 75% have a length of 5 or fewer, or 75% have a length of 4 or fewer, or 75% have a length of 3 or fewer, or 75% have a length of 2 or fewer The present invention also provides a responsive or degradable branched polymer product comprising multivinyl monomer residues and chain transfer residues, wherein optionally each vinyl bond is directly vinyl polymerised to on average:

for multivinyl monomers generally:
0.1 to 1.5, 0.2 to 1.2, 0.825 to 1.1, or approximately 0.3 to 1, other multivinyl monomer residue;

for trivinyl monomers:
0.2 to 1.3, 0.25 to 1.2, 0.3 to 1, 0.4 to 0.7, or approximately 0.5, other trivinyl monomer residue;

for tetravinyl monomers:
0.1 to 1, 0.2 to 0.8, 0.25 to 0.5, or approximately 0.3, other tetravinyl monomer residue.

Furthermore the present invention provides a responsive or degradable branched polymer product comprising multivinyl monomer residues and chain transfer residues, wherein the branched polymer product comprises a multiplicity of vinyl polymer chain segments having an average length of:

for multivinyl monomers generally:
between 1 and 3, between 1 and 2.5, between 1 and 2.2, between 1 and 2, between 1.1 and 2, between 1.2 and 2, between 1.3 and 2, between 1.33 and 2, between 1.5 and 2, between 1.8 and 2, between 1.9 and 2, between 1.95 and 2, between 1.2 and 1.5, between 1.3 and 1.5, between 1.4 and 1.5, between 1.45 and 1.5, between 1.1 and 1.4, between 1.2 and 1.4, between 1.2 and 1.33, or between 1.3 and 1.33 multivinyl monomer residues;

for trivinyl monomers:
between 1 and 2, between 1 and 1.8, between 1 and 1.7, between 1 and 1.5, between 1.1 and 1.5, between 1.2 and 1.5, between 1.25 and 1.5, between 1.3 and 1.5, between 1.4 and 1.5, or between 1.45 and 1.5, or of approximately 1.5, trivinyl monomer residues;

for tetravinyl monomers:
between 1 and 1.7, between 1 and 1.5, between 1 and 1.4, between 1 and 1.33, between 1.1 and 1.33, between 1.2 and 1.33, between 1.25 and 1.33, or between 1.3 and 1.33, or of approximately 1.33, tetravinyl monomer residues.

The incorporation of monovinyl monomers as well as multivinyl monomers may affect the average vinyl chain length but does not affect the average number of multivinyl monomer residues per chain. It can be a way of increasing the vinyl chains without increasing branching.

From a further aspect the present invention provides a responsive or degradable branched polymer product comprising multivinyl monomer residues and chain transfer residues wherein the multivinyl monomer residues comprise less than 20 mol % double bond functionality. The residues may comprise less than 10 mol %, or less than 5 mol %, or less than 2 mol %, or less than 1 mol %, or substantially no, double bond functionality.

DESCRIPTION OF THE DRAWINGS

The present invention will now be described in further non-limiting detail and with reference to the drawings in which.

DETAILED DESCRIPTION OF EXAMPLE EMBODIMENTS

Whereas the present invention relates to the preparation of branched polymers which are responsive or degradable, some of the examples herein relate to the formation of branched polymers which are not responsive or degradable. These have been included because they show structures and use components which can be used in combination with the responsive or degradable components of the present invention.

Figure 1:
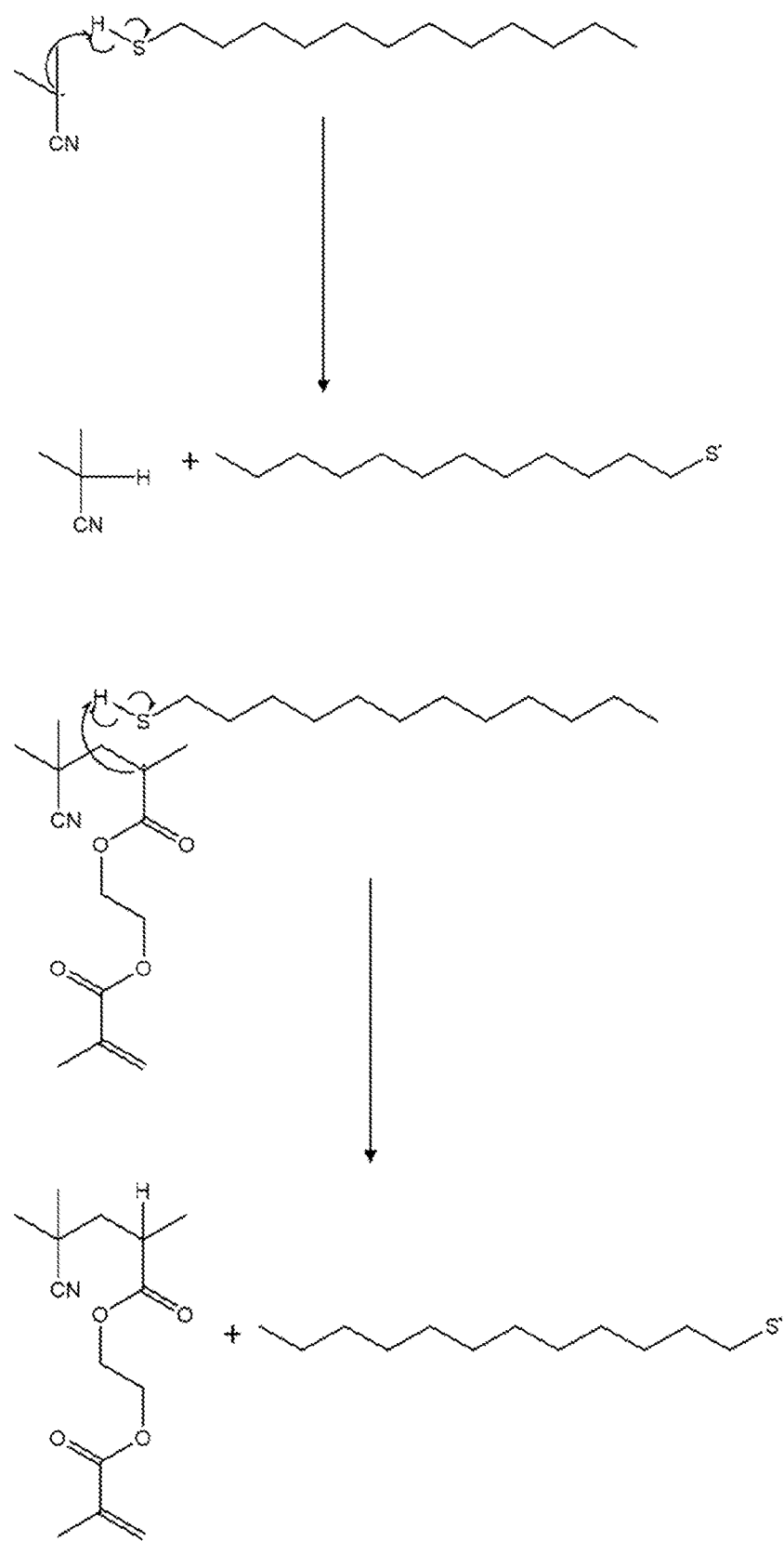
FIGS. 1 and 2 show free radical mechanisms involved in one embodiment of the present invention.
Figure 2:
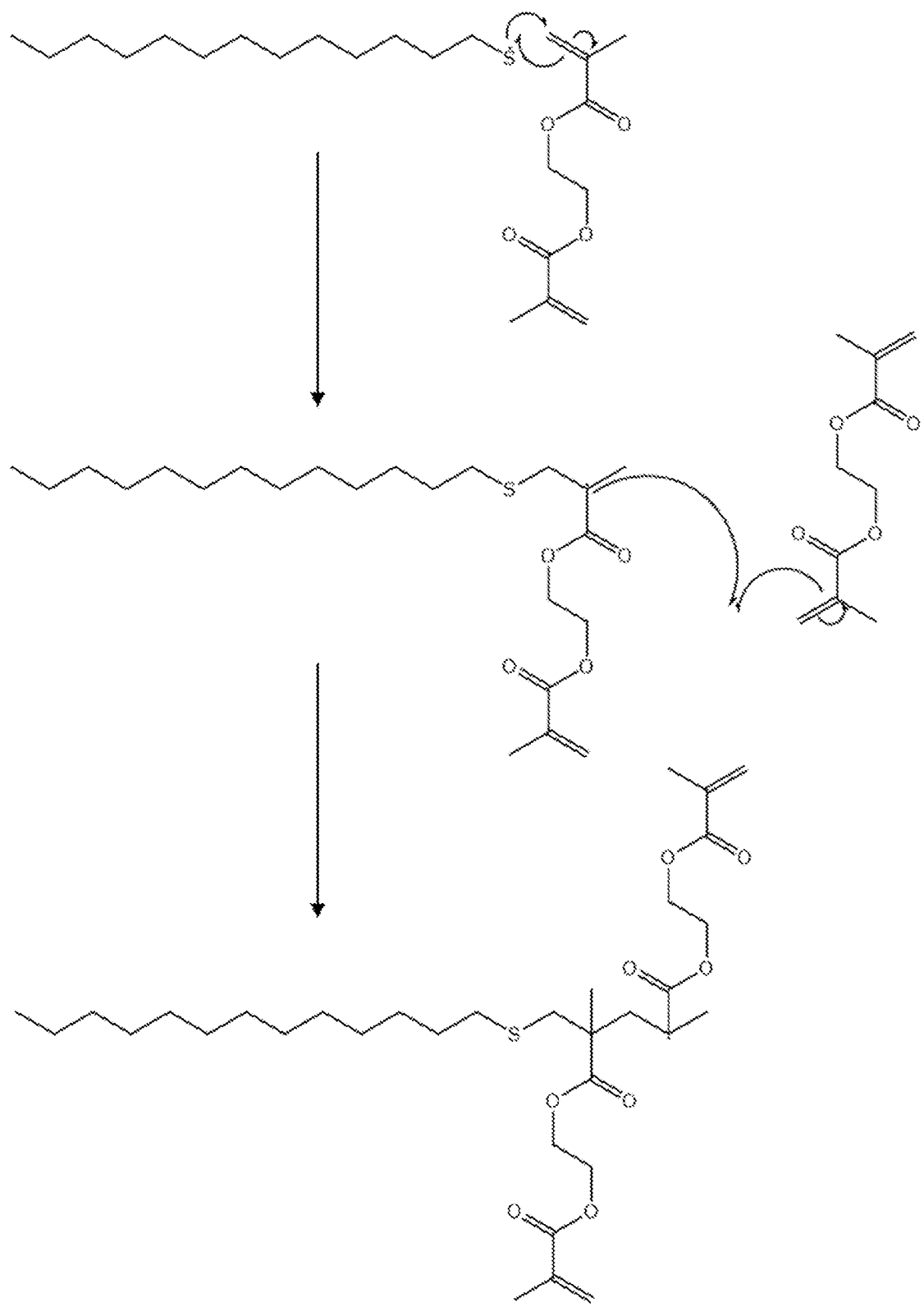

With reference to FIG. 1, radical activity is transferred to a chain transfer agent such as dodecanethiol, by reaction with a radical derived from an initiator such as AIBN, or by reaction with a radical derived from a divinyl monomer (e.g. from EGDMA) which has previously reacted with a source of radicals. This results in a chain transfer agent radical [$CH_3(CH_2)_{11}S \cdot$ in FIG. 1] which (FIG. 2) reacts with divinyl monomer in the present invention and results in propagation of the chain.

Figure 3:
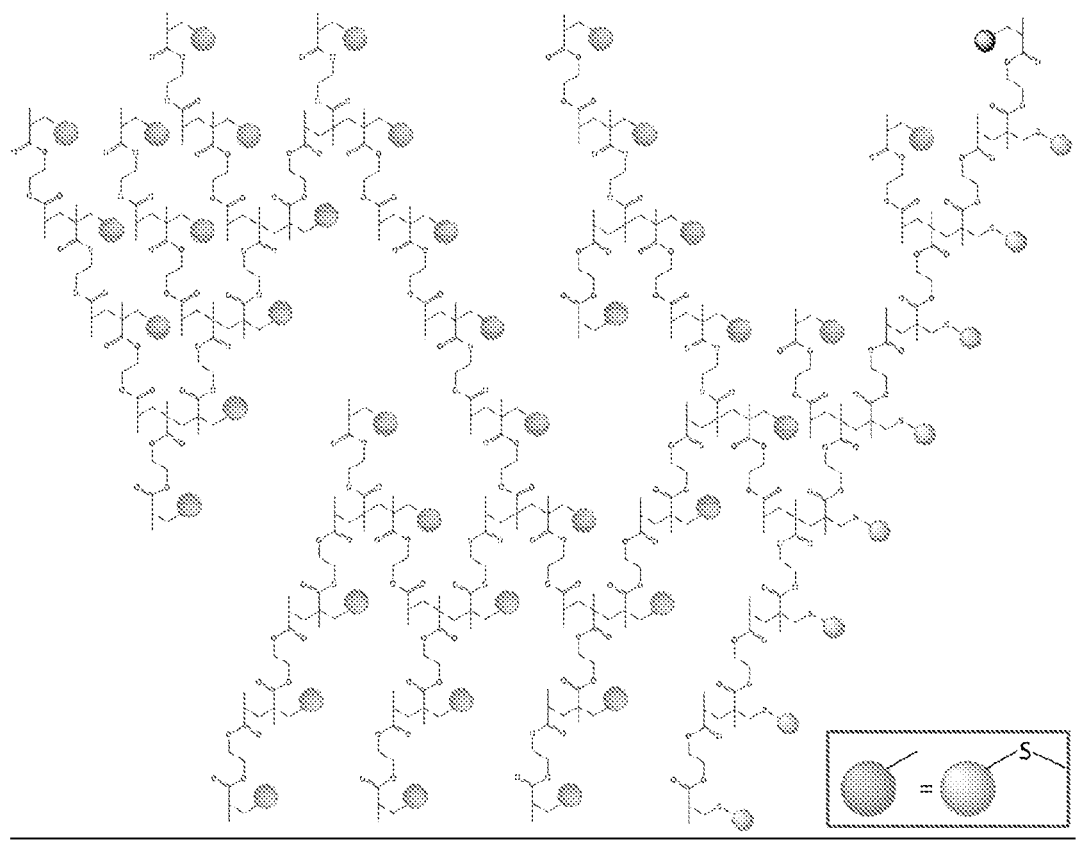
FIGS. 3 and 4 show schematic representations of a branched polymer.
Figure 4:
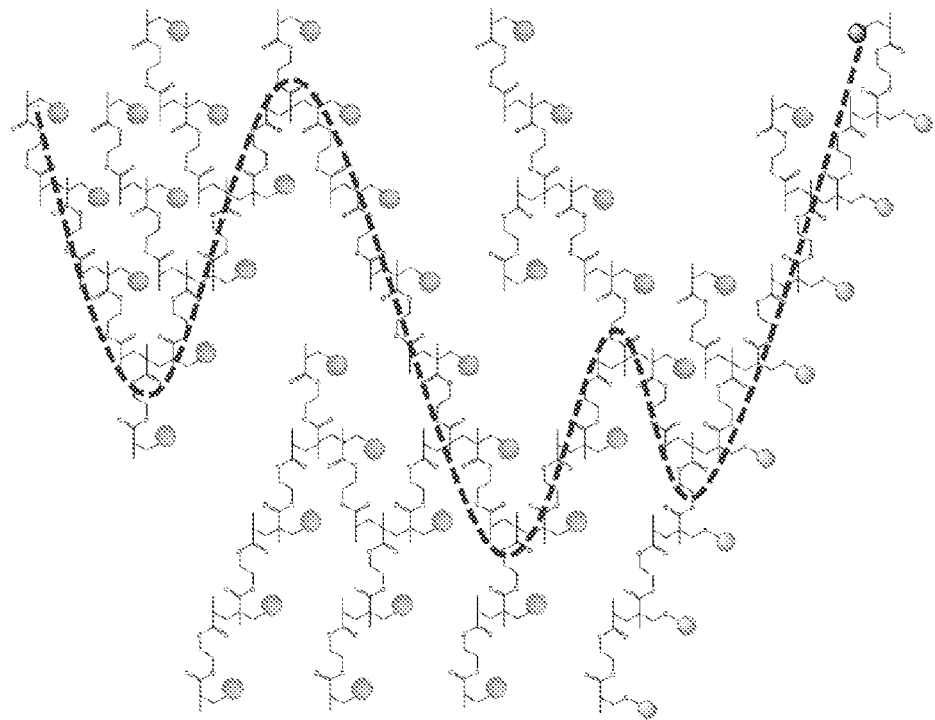

A schematic representation of the resultant branched polymer is shown in FIGS. 3 and 4. Where DDT is used as the chain transfer agent the circle represents a moiety which comprises a dodecyl chain. Although the polymer is built up by vinyl polymerisation, nevertheless the chemistry of the longest chains in the product is determined by the other functional groups present in the divinyl monomer, and accordingly in some cases the longest chains may be polyesters.

Figure 5:
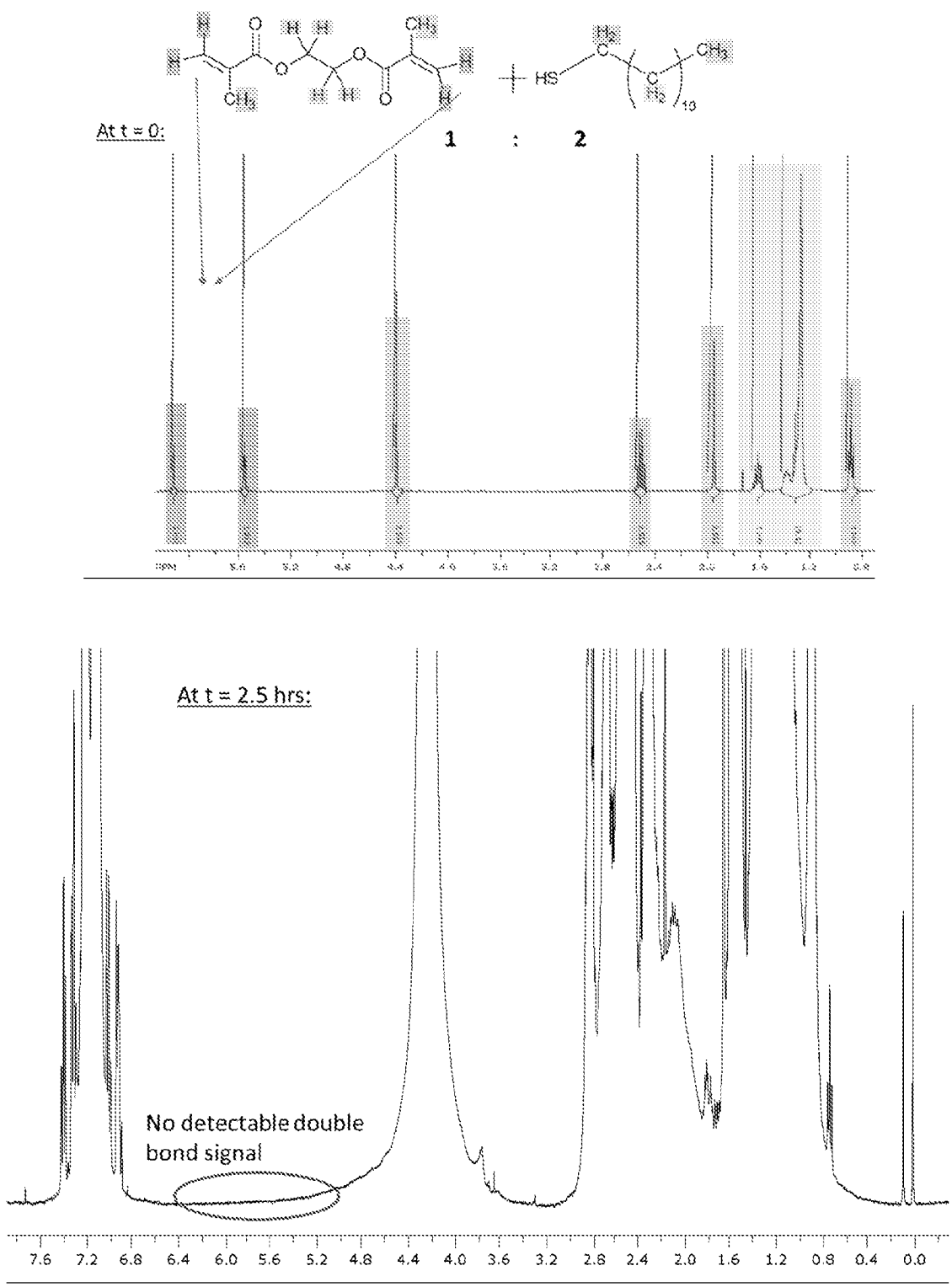
FIG. 5 shows NMR spectra at different stages during the polymerization process.
Figure 6:
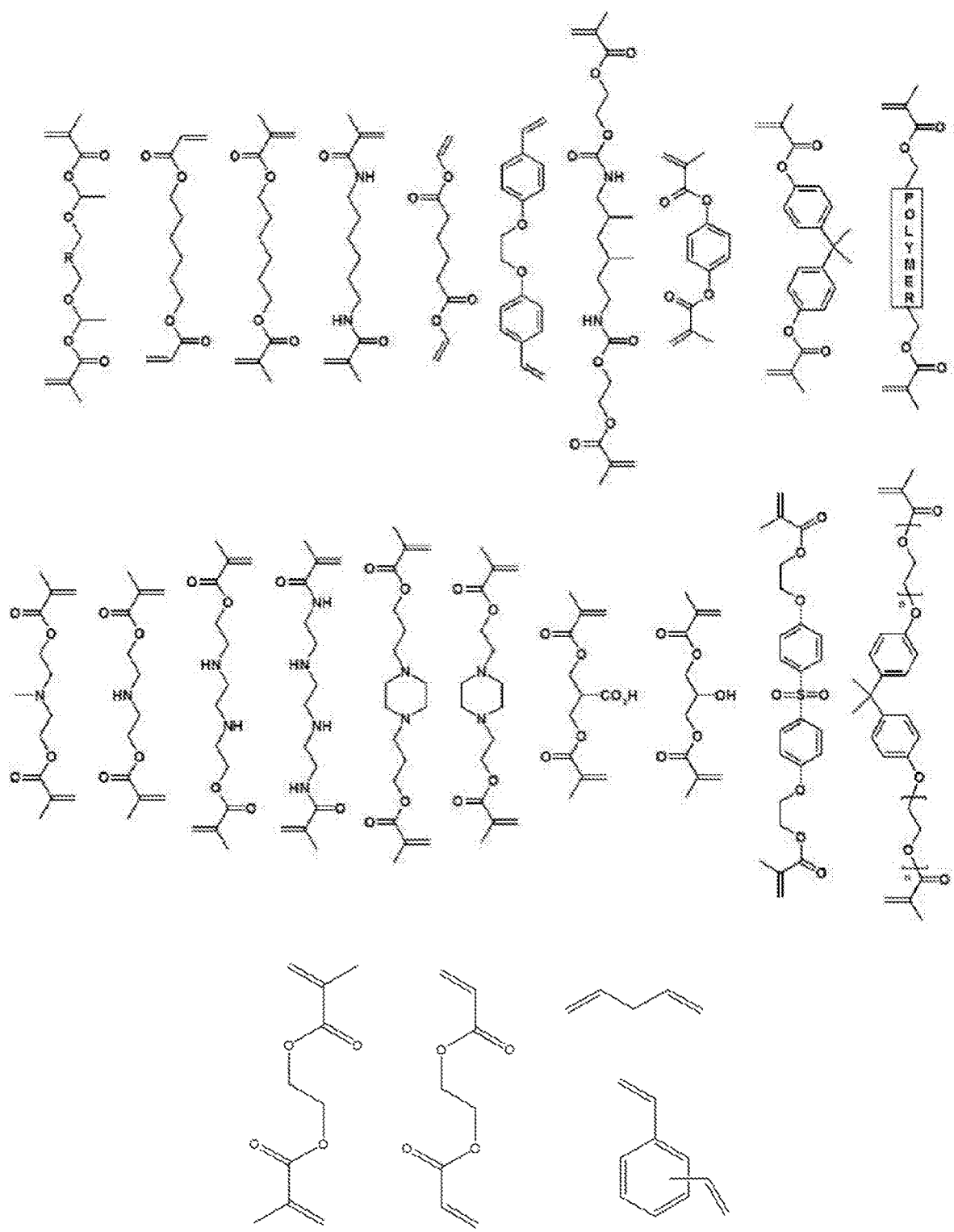
FIG. 6 shows examples of some compounds which may be used as divinyl monomers, some of which are responsive or degradable.
Figure 7:
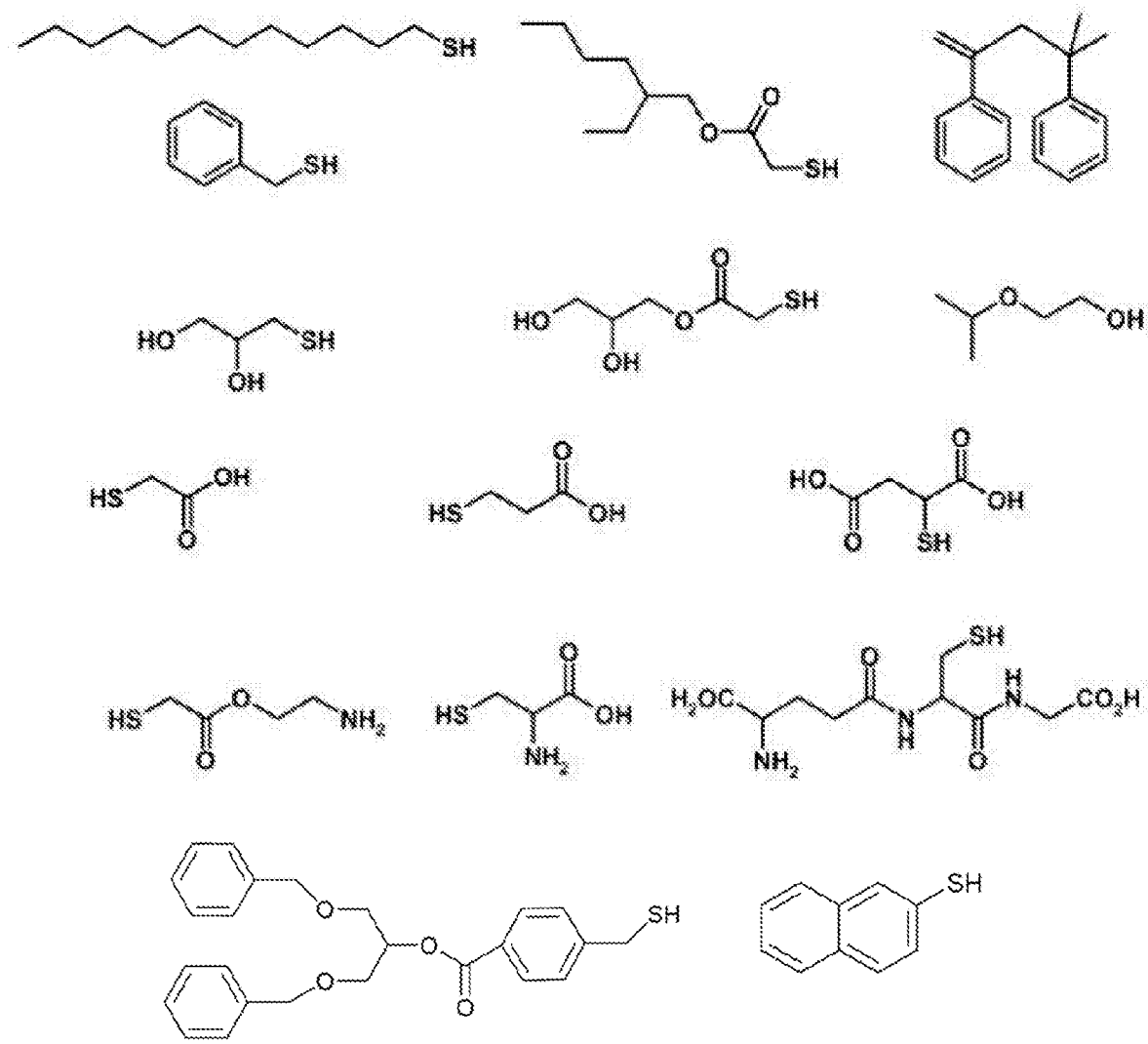
FIG. 7 shows examples of some compounds which may be used as chain transfer agents.

One advantage of the present invention is that the vinyl functionality of the monomers can react completely. Experimental proof of this has been obtained by NMR analysis: in FIG. 5, the top NMR spectrum, in respect of a sample at the start of the reaction, shoes $^1H$ NMR due to the presence of double bond hydrogens. After reaction, the NMR trace (bottom) shows no detectable double bond signals.

Figure 8:
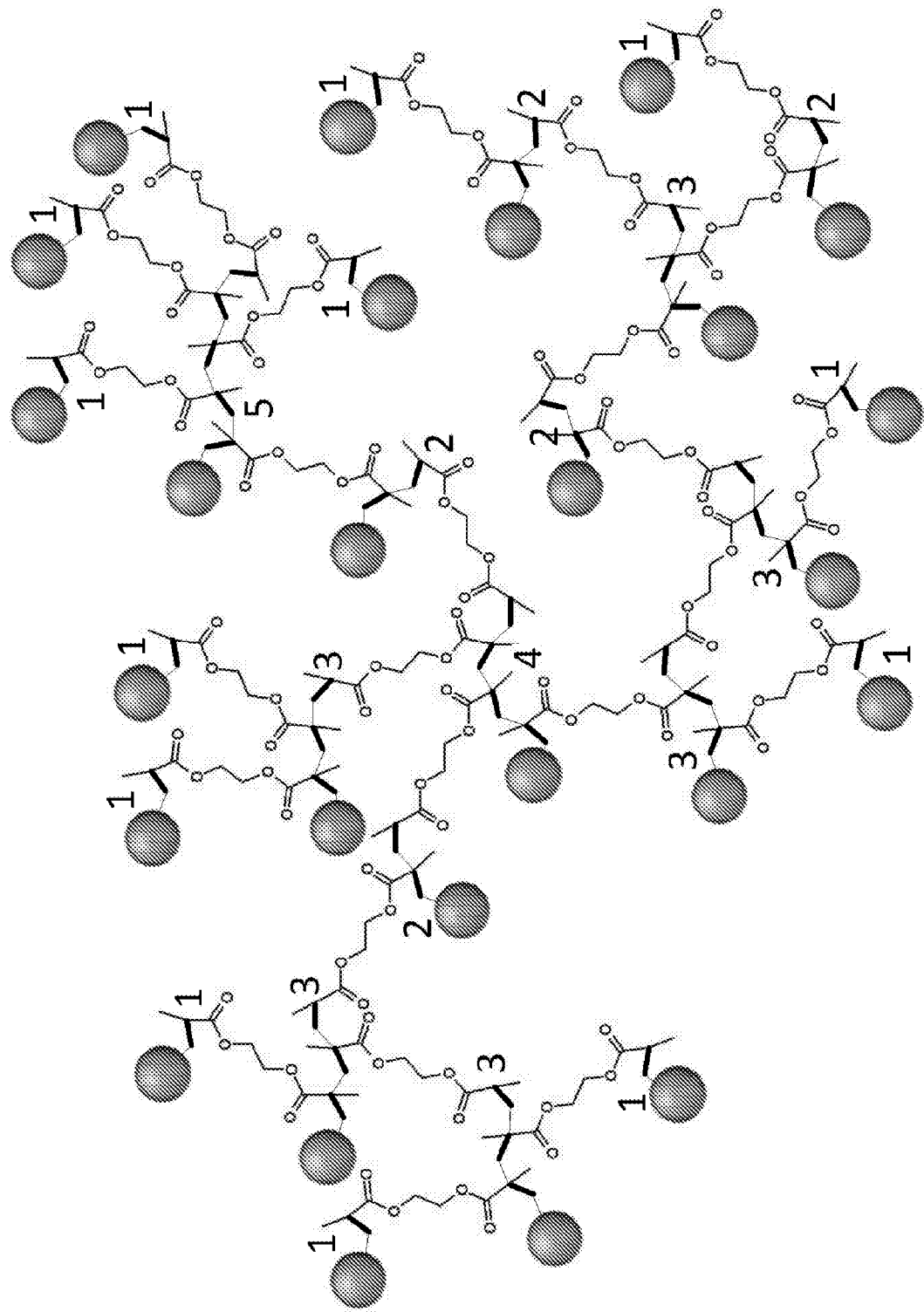
FIG. 8 shows a further schematic representation of a branched polymer, highlighting the vinyl polymer chain lengths within the product.

FIG. 8 shows a branched polymer made from the divinyl monomer EGDMA and chain transfer agent DDT (shown as spheres). Thick lines indicate the C—C bonds which were double bonds in the monomer. The numerals indicate the vinyl polymer chain lengths. It can be seen that there are 13 chains of length 1, five chains of length 2, six chains of length 3, one chain of length 4 and one chain of length 5.

The product shown in FIG. 8 is consistent with the discussion above which refers to some standard systems having (n+1) chain transfer agent residues per n divinyl monomer residues, and average vinyl polymer chain lengths of 2n/(n+1). The ratio of chain transfer residues to divinyl monomer residues is 26:25 i.e. (n+1):n, such that the number of chain transfer residues per divinyl monomer residue is 26/25=1.04. The average polymer chain length is [(1×13)+(2×5)+(3×6)+(4×1)+(5×1)]/(13+5+6+1+1)=50/26=1.923 i.e. 2n/(n+1). All vinyl groups have reacted, i.e. the conversion is 100%. Each vinyl residue is directly vinyl polymerised to on average 48/50=0.96 other divinyl monomer residues.

Example 1—EGDMA as Divinyl Monomer and DDT as Chain Transfer Agent

Thus, in one embodiment, the divinyl monomer is EGDMA, the chain transfer agent is DDT, and a small amount of AIBN is used to provide a source of radicals. The reaction may be carried out in toluene, or other solvents.

Different ratios of chain transfer agent to divinyl monomer were investigated. A summary of the results is shown in the following table.

EGDMA—Monomer
DDT—CTA
AIBN—Thermal initiator
Toluene—Solvent (wt. 50%)
Standard Conditions:
Oil bath at 70° C.
Reaction time—24 hrs
Mass of AIBN was based on 1.5% mol of double bonds in monomer

| EGDMA (mol eq.) | DDT (mol eq.) | Gel formation | EGDMA:DDT in final polymer product[a] | Vinyl conversion[a] | Mw (kg/mol)[b] | Mn (kg/mol)[b] | Đ | a[d] | Number of "repeat units" per object based on Mw |
|---|---|---|---|---|---|---|---|---|---|
| 1 | 0.5 | Yes | — | — | — | — | — | — | — |
| 1 | 1 | Yes | — | — | — | — | — | — | — |
| 1 | 2 | No | 1:1 | >99% | 26.6 | 8.8 | 3.02 | 0.28 | 66 |
| 1 | 2 | No | 1:1 | >99% | 19.4 | 5.35 | 3.6 | 0.234 | 48 |
| 1 | 1.33 | No | 1:0.95 | >99% | 144.0 | 12.7 | 11.4 | 0.3 | 360 |
| 1[c] | 1.33[c] | No[c] | 1:1.05[c] | >99%[c] | 157.4 | 4.4 | 35.6 | 0.287 | 393 |
| 1[e] | 1.33[e] | No[e] | 1:1[e] | >99%[e] | 228.55[e] | 2.83[e] | 80.84[e] | 0.339[e] | 570[e] |
| 1 | 1.25 | No | 1:1 | >99% | 216.86 | 10.19 | 21.27 | 0.299 | 541 |
| 1 | 1.11 | No | 1:1.05 | >99% | 3,484.0 | 52.96 | 65.79 | 0.368 | 8,700 |

[a]determined by $^1H$ NMR (400 MHz) in $CDCl_3$.
[b]determined by triple detection GPC
[c]scale-up reaction (3 time the previous scale)
[d]Mark-Houwink parameter: [η] = $KM^a$
[e]Reaction carried out in ethyl acetate at 50 wt % solid content From these results it can be seen that, for these reagents, gelation can be avoided by the use of more equivalents of the chain transfer agent DDT than the brancher EGDMA, and that the final product contains about the same amount of chain transfer agent as brancher. It can also be seen that changing the amount of chain transfer agent can affect the degree of polymerisation. For example, if just enough chain transfer agent is used to avoid gelation, a high molecular weight product can be obtained. The skilled person is able to tailor the product accordingly.

Experimental (for approximately a 5 g scale reaction):

In a typical experiment, 55.9 mg of AIBN (0.3406 mmol, 1.5% vs. double bonds) were placed in a single neck 25 mL round bottomed flask. EGDMA (2.14 mL, 11.352 mmol, 0.75 eq), DDT (3.62 mL, 15.13 mmol, 1 eq) and Toluene (6.14 mL, 50 wt % vs. EGDMA and DDT) were added to the reactor and the mixture was purged by argon sparge for 15 minutes under stirring. The reactor was then placed in a preheated oil-bath at 70° C. for up to 24 hours. The resulting crude material was analysed by $^1$H NMR and showed no evidence of remaining double bonds after 2.5 hours. Further purification of the product was performed by evaporating the toluene on a rotary evaporator, dissolving the resulting mixture in THF and precipitating in methanol at room temperature (THF:methanol=1:10 v/v). The resulting white precipitate was isolated and dried under vacuum at 40° C. (yield ~85%).

Example 2—EGDMA as Divinyl Monomer and Benzyl Mercaptan as Chain Transfer Agent

| EGDMA (mol %) | Benzyl Mercaptan (mol %) | Gel formation | EGDMA: benzyl mercaptan in final polymer product[a] | Vinyl Conversion[a] | Mw (kg/mol)[b] | Mn (kg/mol)[b] | Đ | a[d] |
|---|---|---|---|---|---|---|---|---|
| 1 | 1 | Yes | — | — | — | — | — | — |
| 1 | 0.5 | Yes | — | — | — | — | — | — |
| 1[c] | 2[c] | No[c] | 1:1.1[c] | 100%[c] | 16.9[c] | 3.1[c] | 5.5[c] | 0.288[c] |
| 1 | 1.33 | Yes | — | — | — | — | — | — |
| 1 | 2 | No | 1:1.02 | 100% | — | — | — | — |

Details as Example 1, except:
[c]Reacted for 72 hours
Purification by precipitation was carried out using THF and ethanol at 0° C. to produce a white precipitate.

Example 3—EGDMA as Divinyl Monomer and 2-Naphthalenethiol as Chain Transfer Agent

| EGDMA (mol %) | 2-Naphthalenethiol (mol %) | Gel formation | Reaction Time (hrs) | Vinyl conversion | EGDMA: 2-naphthalenethiol in final polymer product |
|---|---|---|---|---|---|
| 2 | 1 | Yes | 1 | — | — |
| 1 | 1 | No | 24 | Unable to determine[a] | Unable to determine[a] |
| 1 | 1 | No | 48 | Unable to determine[a] | Unable to determine[a] |

Details as Example 1 except:
[a]Unable to analyse as it seems to be immiscible in chosen solvents: CDCl$_3$, toluene and CDCl$_3$, DMF and THF.

Example 4—EGDMA as Divinyl Monomer and a Dendron Thiol as Chain Transfer Agent

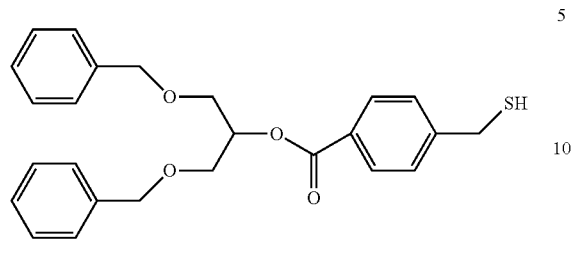

G1-DBOP thiol

| EGDMA (mol %) | G1-DBOP Thiol (mol %) | Gel formation | EGDMA:DBOP in final polymer product[a] | Vinyl conversion[a] | Mw (kg/mol)[b] | Mn (kg/mol)[b] | Đ | α[d] |
|---|---|---|---|---|---|---|---|---|
| 1 | 2.5 | No | 1:1 | 86% | 6.7 | 3.1 | 2.15 | 0.168 |

Details as Example 1.

Example 5—PEGDMA (Approximately 875 g Mol$^{-1}$) as Monomer

| PEG-dimeth-acrylate (mol %) | DDT (mol %) | Gel formation | PEGDMA:DDT in final polymer product[a] | Vinyl conversion[a] | Mw (kg/mol)[b] | Mn (kg/mol)[b] | Đ | a[c] | No. of repeat units per object based Mw |
|---|---|---|---|---|---|---|---|---|---|
| 1 | 2 | Yes | — | — | — | — | — | — | — |
| 1 | 1.33 | Yes | — | — | — | — | — | — | — |
| 1 | 4 | No | 1:1.2 | >99% | 22.6 | 6.4 | 3.55 | — | 21 |
| 1 | 4 | No | 1:1.1 | >99% | — | — | — | — | — |
| 1 | 3.33 | No | 1:1.1 | >99% | — | — | — | — | — |
| 1 | 2.89 | No | 1:1.1 | >99% | 54.7 | 4.7 | 11.6 | — | 51 |
| 1 | 2.5 | No | 1:1.1 | >99% | 2,200 | 61 | 36.5 | — | 2037 |

$M_{R.U.} \approx 1080$ g/mol

Details as Example 1 except:

[c]Mark-Houwink parameter: $[\eta] = KM^a$

Example 6—PEGDMA (Approximately 3350 g Mol$^{-1}$) as Divinyl Monomer and DDT as Chain Transfer Agent

| PEG-dimeth-acrylate (mol %) | DDT (mol %) | Gel formation | PEGDMA:DDT in final polymer product[a] | Vinyl conversion[a] | Mw (kg/mol)[b] | Mn (kg/mol)[b] | Đ | a[c] | No. of repeat units per object based on Mw |
|---|---|---|---|---|---|---|---|---|---|
| 1 | 1 | Yes | — | — | — | — | — | — | — |
| 1 | 4 | No | 1:1.3 | 100% | 93.6 | 8.8 | 10.6 | — | 26 |
| 1 | 2.5 | No | 1:1.3 | >99% | 103.8 | 7.7 | 13.4 | — | 29 |
| 1 | 2 | No | 1:1.1 | 100% | 106.7 | 9.5 | 11.2 | — | 30 |

Details as Example 5 except:

$M_{R.U.} \approx 3350$ g/mol

Examples 7 and 8—Polymerisations of EGDMA
with DDT, or PEGDMA (Mw 875) with DDT, at a
Higher Temperature

| EGDMA (mol %) | DDT (mol %) | Gel formation | EGDMA: DDT in final polymer product[a] | Vinyl conversion[a] | Mw (kg/mol)[b] | Mn (kg/mol)[b] | Đ | a[d] |
|---|---|---|---|---|---|---|---|---|
| 1 | 1 | Yes | — | — | — | — | — | — |
| 1 | 1.33 | No | 1:1 | >99% | — | — | — | — |

| PEG-dimethacrylate (mol %) | DDT (mol %) | Gel formation | PEGDMA: DDT in final polymer product[a] | Vinyl conversion[a] | Mw (kg/mol)[b] | Mn (kg/mol)[b] | Đ | a[d] |
|---|---|---|---|---|---|---|---|---|
| 1 | 2 | Yes | — | — | — | — | — | — |
| 1 | 2.5 | No | 1:1.1 | >99% | 1,600 | 28.9 | 55.3 | — |

Details as Examples 1 and 5 except:
Oil bath at 85° C. rather than 70° C.

Example 9: Divinyl Benzene as Divinyl Monomer and DDT as Chain Transfer Agent

Experimental.

In a typical experiment, 75.7 mg of AIBN (0.4608 mmol, 1.5% vs. double bonds) were placed in a single neck 25 mL round bottomed flask. DVB (2.19 mL, 15.36 mmol, 1 eq), DDT (3.68 mL, 15.36 mmol, 1 eq) and Toluene (5.91 mL, 50 wt % vs. DVB and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in methanol at room temperature (THF: methanol=1:10 v:v).

| DVB (eq.) | DDT (eq.) | Solid content | Gel Formation | DVB: CTA in final polymer product[a] | Vinyl conversion[a] | Mw (kg/mol)[b] | Mn (kg/mol)[b] | Đ[b] | α[c] |
|---|---|---|---|---|---|---|---|---|---|
| 1 | 1 | 50 wt % | No | 0.92:1.0 | 99% | 69.8 | 1.5 | 45.2 | 0.263 |
| 1 | 2 | 50 wt % | No | 0.57:1.0 | >99% | 1.02 | 0.8 | 1.24 | 0.643 |
| 1 | 1 | 70 wt % | Yes | — | — | — | — | — | — |
| 1 | 1 | 60 wt % | Yes | — | — | — | — | — | — |
| 1 | 1 | 55 wt % | No | 0.86:1 | 99% | 113.4 | 2 | 56.7 | 0.26 |

[a] determined by $^1$H NMR (400 MHz) in CDCl$_3$.
[b] determined by triple detection GPC
[c] Mark-Houwink parameter: [η] = KM$^a$ Example 10: Divinylbenzene as Divinyl Monomer and Benzyl Mercaptan as Chain Transfer Agent Experimental.

In a typical experiment, 18.9 mg of AIBN (0.1152 mmol, 1.5% vs. double bonds) were placed in a single neck 25 mL round bottomed flask. DVB (1.094 mL, 7.68 mmol, 0.5 eq), benzyl mercaptan (1.803 mL, 15.36 mmol, 1 eq) and Toluene (3.364 mL, 50 wt % vs. DVB and benzyl mercaptan) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in methanol at room temperature (THF:methanol=1:10 v:v).

| DVB (eq.) | Benzyl mercaptan (eq.) | Gel Formation | DVB:CTA in final polymer product[a] | Vinyl conversion[a] | Mw (kg/mol)[b] | Mn (kg/mol)[b] | Đ[b] | α[c] |
|---|---|---|---|---|---|---|---|---|
| 1 | 1 | Yes | — | — | — | — | — | — |
| 1 | 2 | No | — | 99% | 0.6 | 0.5 | 1.2 | 1.2 |
| 1 | 1.33 | No | — | 99% | 3.63 | 0.78 | 4.652 | 0.194 |
| 1 | 1.25 | No | — | 99% | 6.175 | 0.71 | 8.72 | 0.171 |
| 1 | 1.11 | No | — | 99% | 28.7 | 0.91 | 31.65 | 0.209 |

[a]determined by $^1$H NMR (400 MHz) in CDCl$_3$.
[b]determined by triple detection GPC
[c]Mark-Houwink parameter: $[\eta] = KM^\alpha$ Example 11: Bisacrylamide as Divinyl Monomer and Thioglycerol as Chain Transfer Agent Experimental In a typical experiment, 16.0 mg of AIBN (0.0973 mmol, 1.5% vs. double bonds) were placed in a single neck 10 mL round bottomed flask. Bisacrylamide (0.5 g, 3.243 mmol, 0.5 eq), thioglycerol (TG; 0.56 mL, 6.5 mmol, 1 eq) and ethanol (1.49 mL, 50 wt % vs. bisacrylamide and TG) were added to the reactor and the mixture was purged by argon sparge for 15 minutes under stirring. The reactor was then placed in a preheated oil-bath at 70° C. for up to 24 hours. The product was obtained by removing the ethanol on a rotary evaporator.

| Bisacrylamide (eq.) | 1-Thioglycerol (eq.) | Gel Formation | Bisacrylamide:CTA in final polymer product[a] | Vinyl conversion[a] | Mw (kg/mol)[b] | Mn (kg/mol)[b] | Đ[b] | α[c] |
|---|---|---|---|---|---|---|---|---|
| 1 | 2 | No | — | — | 1.6 | 1.3 | 1.23 | — |

[a]determined by $^1$H NMR (400 MHz) in CDCl$_3$.
[b]determined by triple detection GPC
[c]Mark-Houwink parameter: $[\eta] = KM^\alpha$

Example 12: PEGDMA (875 g/Mol) as Divinyl Monomer and Thioglycerol as Chain Transfer Agent Experimental.

In a typical experiment, 19.3 mg of 4, 4'-azobis(4-cyanovaleric acid) (ACVA; 0.0687 mmol, 1.5% vs. double bonds) were placed in a single neck 10 mL round bottomed flask. PEGDMA (2 g, 2.29 mmol, 1 eq), 1-thioglycerol (TG; 0.824 g, 7.62 mmol, 3.33 eq) and anhydrous ethanol (3.58 mL, 50 wt % vs. PEGDMA and TG) were added to the reactor and the mixture was purged by argon sparge for 15 minutes under stirring. The reactor was then placed in a preheated oil-bath at 70° C. for up to 24 hours. Further purification of the product was performed by concentrating on a rotary evaporator and precipitating in hexane at room temperature.

| PEGDMA (eq.) | TG (eq.) | Gel Formation | PEGDMA:TG in final polymer product[a] | Vinyl conversion[a] | Mw (kg/mol)[b] | Mn (kg/mol)[b] | Đ[b] | α[c] |
|---|---|---|---|---|---|---|---|---|
| 1 | 5 | No | 1:2.5 | >99% | 10.2 | 0.1 | 98.4 | / |
| 1 | 3.33 | No | 1:1.75 | >99% | 415.3 | 6.05 | 68.65 | / |
| 1 | 2.5 | Yes | — | — | — | — | — | — |

All reaction performed in ethanol at 50 wt %
[a] determined by $^1$H NMR (400 MHz) in CDCl$_3$.
[b] determined by triple detection GPC
[c] Mark-Houwink parameter: $[\eta] = KM^\alpha$

Example 13: PEGDMA (875 g/Mol) as Divinyl Monomer with Mixed Chain Transfer Agents (DDT and Thiolglycerol)

Experimental.

In a typical experiment, 11.3 mg of AIBN (0.0686 mmol, 1.5% vs. double bonds) were placed in a single neck 25 mL round bottomed flask. PEGDMA (2 g, 2.76 mmol, 1 eq), DDT (0.578 g, 2.86 mmol, 1.25 eq), 1-thioglycerol (TG; 0.309 g, 2.86 mmol, 1.25 eq) and toluene (8.34 mL, 50 wt % vs. PEGDMA, TG and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in chloroform and precipitating in petroleum ether at 0° C. (CHCl$_3$: petroleum ether=1:10 v:v).

| Brancher (eq.) | DDT (eq.) | TG (eq.) | Gel Formation | % of DDT in final polymer final product[a] | % of 1-Thioglycerol in final polymer product[a] | Vinyl conversion[a] | Mw (kg/mol)[b] | Mn (kg/mol)[b] | Đ[b] | α[c] |
|---|---|---|---|---|---|---|---|---|---|---|
| 1 | 1.25 | 1.25 | No | 26 | 74 | >99% | 76.12 | 3.2 | 23.6 | / |
| 1 | 1.25 | 1.25 | No | 24 | 76 | >99% | 9.3 | 0.51 | 18.19 | / |
| 1 | 1.875 | 0.625 | No | 51 | 49 | >99% | 28.25 | 2.45 | 11.55 | / |
| 1 | 1.5 | 1 | No | 32 | 68 | >99% | 131 | 3.82 | 34.4 | / |
| 1 | 1.25 | 1.25 | No | 30 | 70 | >99% | 1,040 | 11.8 | 88.3 | 0.462 |
| 1 | 1.5 | 1 | No | 37 | 63 | >99% | 395 | 2.73 | 144 | 0.392 |
| 1 | 1.875 | 0.625 | No | 55 | 45 | >99% | 348 | 7.46 | 46.6 | 0.381 |
| 1 | 1.75 | 0.75 | No | 50 | 50 | >99% | 964 | 19.3 | 50 | 0.473 |

[a] determined by $^1$H NMR (400 MHz) in CDCl$_3$.
[b] determined by triple detection GPC
[c] Mark-Houwink parameter: $[\eta] = KM^\alpha$ Example 14: Incorporation of a Monovinyl Monomer (Benzyl Methacrylate) into the System (EGDMA as Divinyl Monomer and DDT as Chain Transfer Agent)

Experimental

In a typical experiment, 49.7 mg of AIBN (0.303 mmol, 1.5% vs. EGDMA double bonds) were placed in a single neck 25 mL round bottomed flask. EGDMA (1.903 mL, 10.09 mmol, 0.75 eq), Benzyl methacrylate (BzMA; 0.456 mL, 2.691 mmol, 0.2 eq), DDT (3.222 mL, 13.453 mmol, 1 eq) and toluene (6 mL, 50 wt % vs. EGDMA, BzMA and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in methanol at room temperature (THF:methanol=1:10 v:v).

| EGDMA (eq.) | BzMA (eq.) | DDT (eq.) | Gel Formation | Brancher:MonoVM:CTA in purified product[a] | Vinyl conversion[a] | Mw (kg/mol)[b] | Mn (kg/mol)[b] | Đ[b] | α[c] |
|---|---|---|---|---|---|---|---|---|---|
| 1 | 0.267 | 1.33 | No | 1:0.2:1 | >99% | 94.1 | 10.6 | 8.9 | 0.275 |

[a]determined by $^1$H NMR (400 MHz) in CDCl$_3$.
[b]determined by triple detection GPC
[c]Mark-Houwink parameter: $[\eta] = KM^\alpha$ Example 15: BDME as Stimuli-Responsive (Acid-Cleavable) Divinyl Monomer and DDT as Chain Transfer Agent Experimental.

In a typical experiment, 26.7 mg of AIBN (0.163 mmol, 1.5% vs. double bonds) were placed in a single neck 10 mL round bottomed flask. BDME (1.71 g, 5.44 mmol, 1 eq), DDT (1.47 g, 7.29 mmol, 1.33 eq) and toluene (3.69 mL, 50 wt % vs. BDME and DDT) were added to the reactor and the mixture was purged by argon sparge for 15 minutes under stirring. The reactor was then placed in a preheated oil-bath at 70° C. for up to 24 hours. Further purification of the product was performed by evaporating the toluene on a rotary evaporator, dissolving the resulting mixture in THF and precipitating in ethanol at 0° C. (THF:ethanol=1:10 v:v).

| BDME (eq.) | DDT (eq.) | Gel Formation | BDME:DDT in final polymer product[a] | Vinyl conversion[a] | Mw (kg/mol)[b] | Mn (kg/mol)[b] | Đ[b] | α[c] |
|---|---|---|---|---|---|---|---|---|
| 1 | 1.33 | No | 0.99:1 | >99% | 20.5 | 7.4 | 2.76 | 0.341 |

Figure 9:
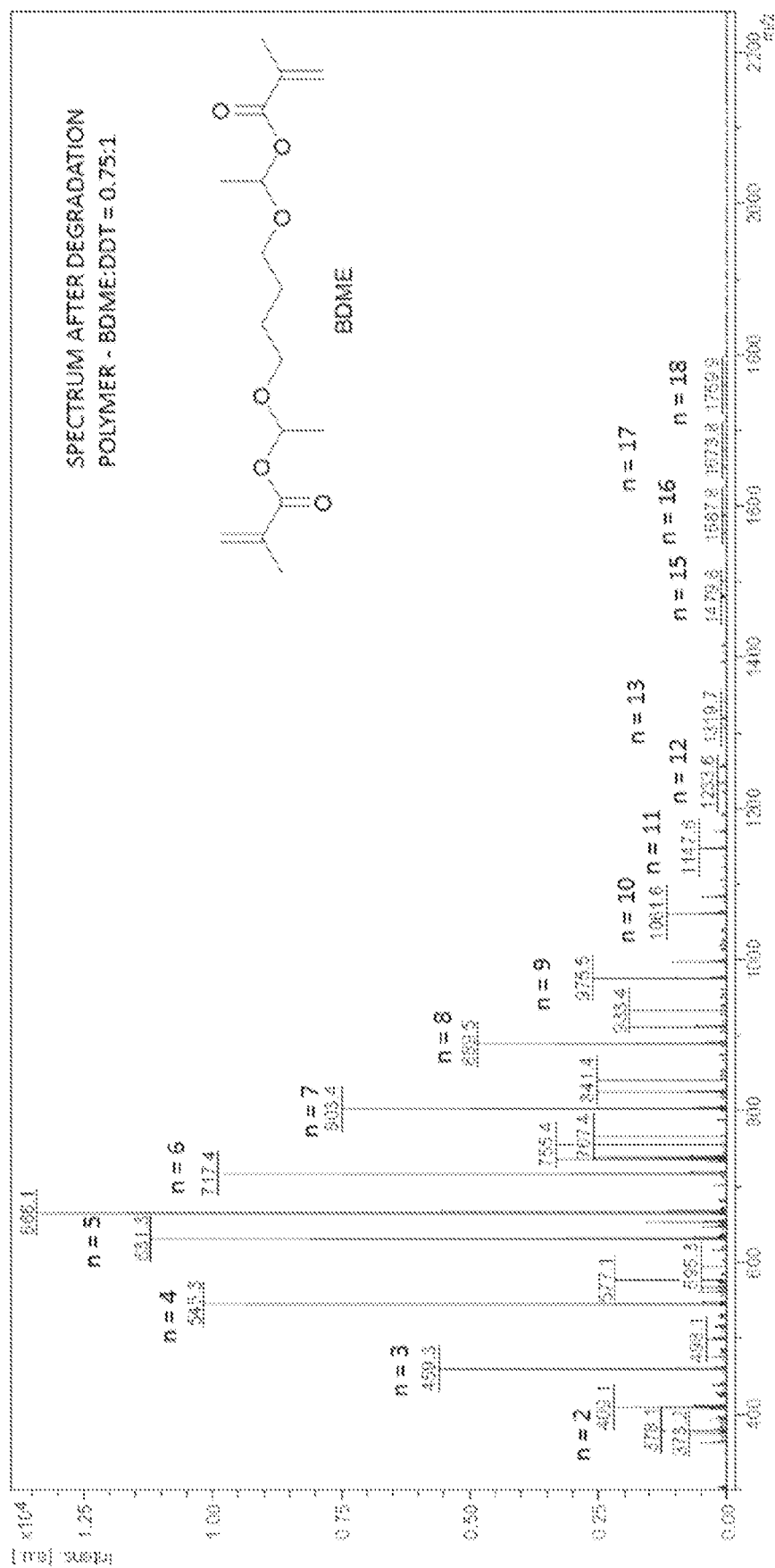
FIG. 9 shows a mass spectrum of components of a responsive or degradable polymer in accordance with an embodiment of the present invention.

[a]determined by $^1$H NMR (400 MHz) in CDCl$_3$.
[b]determined by triple detection GPC
[c]Mark-Houwink parameter: $[\eta] = KM^\alpha$ Example 16—Experiments, Using Degradable Monomers, to Help Elucidate the Polymerisation Mechanisms and Structures within the Products To establish the mechanistic basis of the polymerisation/telomerisation, two reactions were conducted under near-identical conditions. The first utilised an acid sensitive divinyl monomer—BDME—as in Example 15 above and shown in FIG. 9. The resulting polymer was then treated with acid to cleave all of the diacetal units within what could conventionally be termed a step-growth polymer backbone and yield a distribution of vinyl oligomers that are representative of the free radical telomerisation during the synthesis. The acid degradation was achieved as follows:

THF (9 mL) was added to 1 mL of the crude product (before purification) of the reaction described above. Then, trifluoroacetic acid (TFA; 10 µL, ~2 eq vs BDME) was added to the solution and stirred for 72 hours at room temperature. Basic alumina (~2 g) was added to the reaction mixture followed by filtration with a 200 nm syringe filter. The solvent was evaporated on a rotary evaporator and the resulting product was analysed by GPC and MALDI-TOF mass spectroscopy.

The GPC analysis showed very low molecular weight species that were difficult to study using the available analytical instrument. In order to generate accurate analytical data, the sample was subjected to MALDI-TOF mass spectrometry, yielding the mass spectrum shown in FIG. 9.

The species present are polymethacrylic acid oligomers and telomers with a single CTA at one end of the chain and are generated during the cleavage as follows:

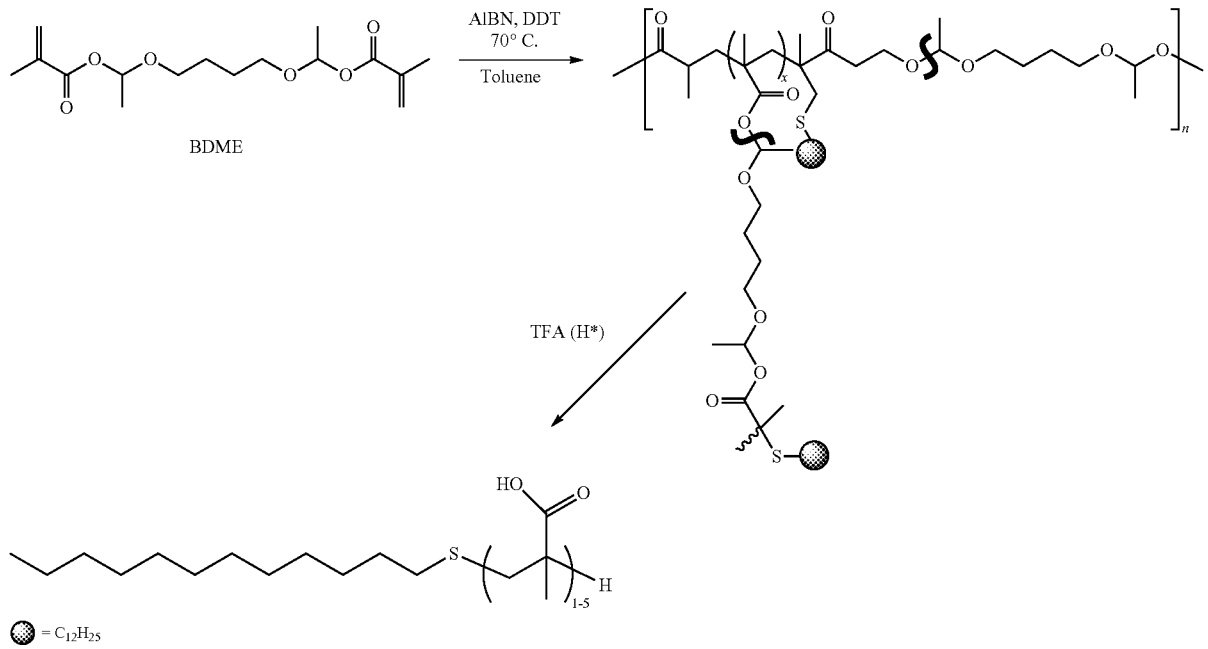

The MALDI-TOF spectrum (negative ion) clearly indicates that a distribution of telomers and oligomers are present with a chain length of up to 18 units. These correspond to polyacid monomer residues within the branched polyacetal structure. MALDI-TOF and other mass spectrometry techniques are well known to not fully represent the concentration of the different species present within the analysis sample and the purification of the sample will have disproportionately removed different species within the mixture. For example, the units relating to reaction of the CTA radical with a single vinyl group (n=1) are not readily observable. Additional signals are present due to oxidation of thio-ethers resulting from the presence of the CTA within the distribution of species. This is as expected by those skilled in the art.

The type of structures present in such systems would be impossible to replicate using step growth polymerisation methods. In this case, polycondensation of polyacid mixtures and ethylene glycol would likely lead to gelation at low conversions due to the components being so highly functional (e.g. 18-acid functional)

To compare with conventional free radical polymerisation conditions, a model reaction using a mono-vinyl monomer (methyl methacrylate—MMA) was conducted as follows, strongly replicating the BDME conditions but in the absence of divinyl monomer.

Methyl methacrylate (2.27 g, 22.7 mmol, 1 eq) was purged with nitrogen for 15 minutes. 1-Dodecanethiol (3.06 g, 15.13 mmol, 1.33 eq), AIBN (0.0559 g, 0.341 mmol) and toluene (6.16 mL) were added to the 25 mL round-bottomed flask and purged with nitrogen for 5 minutes. The reaction flask was heated in an oil bath at 70° C. and stirred for 24 hours and then cooled. The reaction mixture was concentrated by rotary evaporation and the resulting product was analysed by GPC and MALDI-TOF mass spectroscopy.

Figure 10:
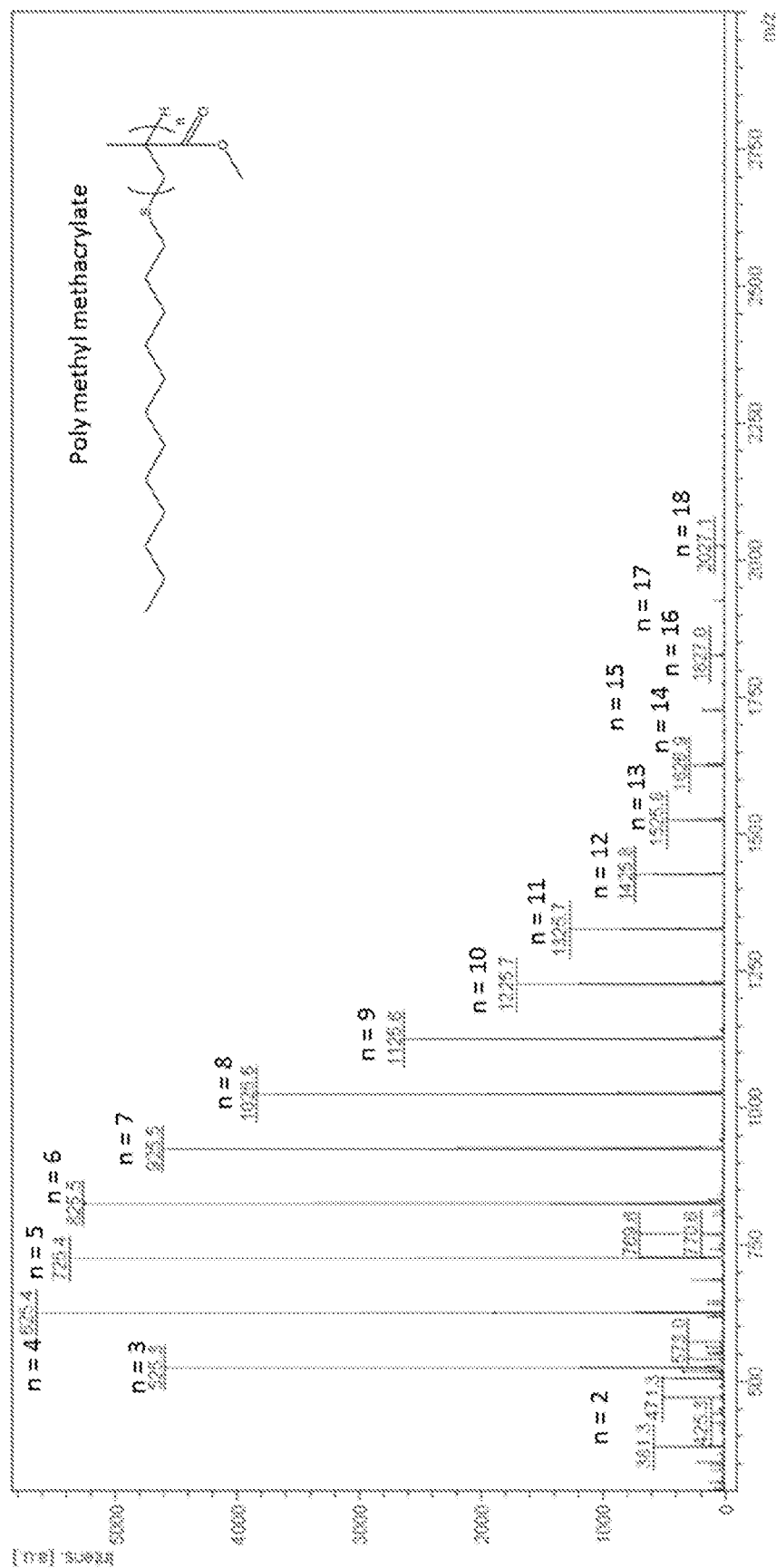
FIG. 10 shows a mass spectrum of polymer species comparative to those of FIG. 9.

The MALDI-TOF mass spectrum (positive ion—sodium adducts comprise the main distribution) of this product is seen in FIG. 10.

As can be readily seen, the telomerisation/oligomerisation of MMA under identical conditions generates a near identical distribution of identifiable species. Structures up to 18 monomer units are seen through the free radical polymerisation of MMA under these conditions and such species were seen in the homopolymerisation of the divinyl monomer BDME.

Example 17—Reactions Using Trivinyl Monomer TMPTMA

Experimental (for approximately a 5 g scale reaction):
In a typical experiment, 43.7 mg of AIBN (0.266 mmol, 1.5% vs. double bonds) were placed in a single neck 25 mL round bottomed flask. Trimethylolpropane trimethacrylate (TMPTMA) (1.887 mL, 5.91 mmol, 0.4 eq), DDT (3.539 mL, 14.78 mmol, 1 eq) and Toluene (5.769 mL, 50 wt % vs. TMPTMA and DDT) were added to the reactor and the mixture was purged by nitrogen sparge for 15 minutes under stirring. The reactor was then placed in a preheated oil-bath at 70° C. for up to 24 hours. The resulting crude material was analysed by $^1$H NMR and showed no evidence of remaining double bonds after 24 hours. Further purification of the product was performed by evaporating the toluene on a rotary evaporator, dissolving the resulting mixture in THF and precipitating in methanol (MeOH) at room temperature. The product was collected by removing the supernatant and was rinsed with fresh MeOH. Finally, the resulting polymer was dried under vacuum at 40° C. for 12 hours. After purification, the polymer was collected with a yield of 73 ($m_{polymer}/m_{DDT+TMPTMA}$). The purified product was further analysed by GPC and $^1$H NMR.

Trivinyl monomer was homopolymerized, and was also copolymerised with divinyl monomer and with monovinyl monomer. It was possible to incorporate various functionalities e.g. tertiary amine functionality and epoxy functionality, thereby facilitating further reaction possibilities.

DEAEMA: 2-(diethylamino)ethyl methacrylate

GlyMA: Glycidyl methacrylate

The ratios in the first column indicate the relative molar amounts of reagents used in the reaction.

Figure 11:
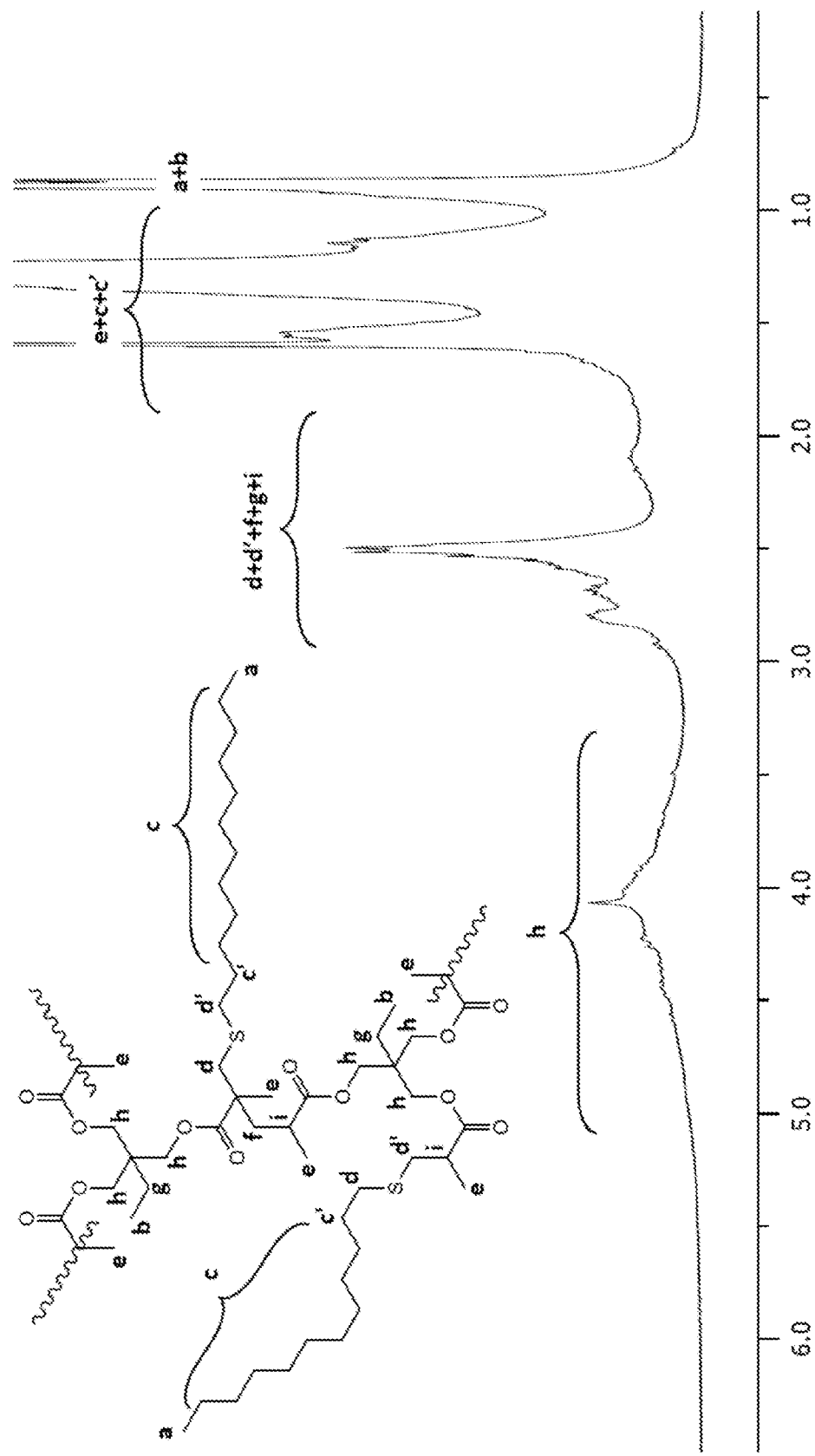
FIGS. 11 to 15 show NMR spectra of some branched polymer products prepared using trivinyl monomers amongst other reagents.
Figure 12:
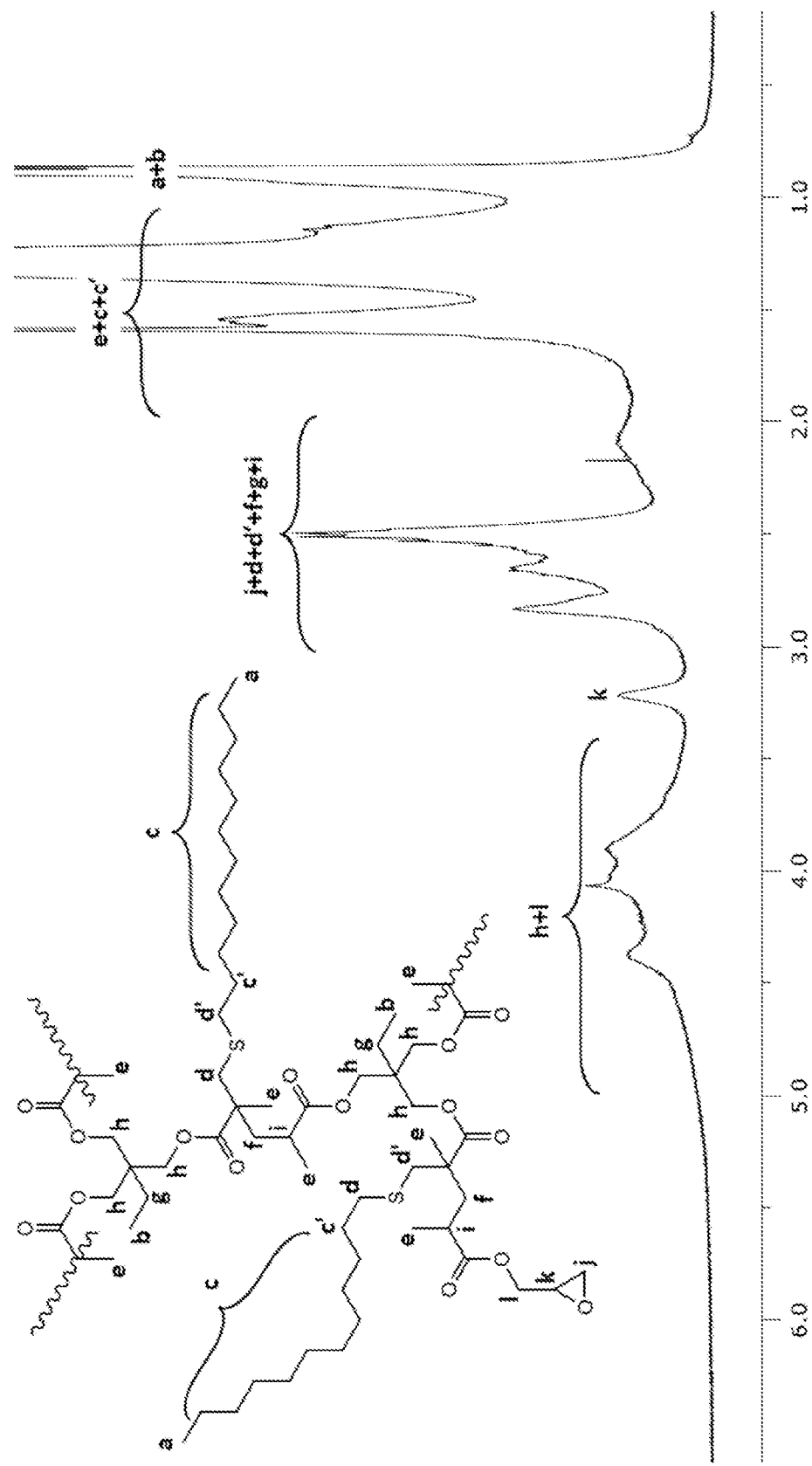
Figure 13:
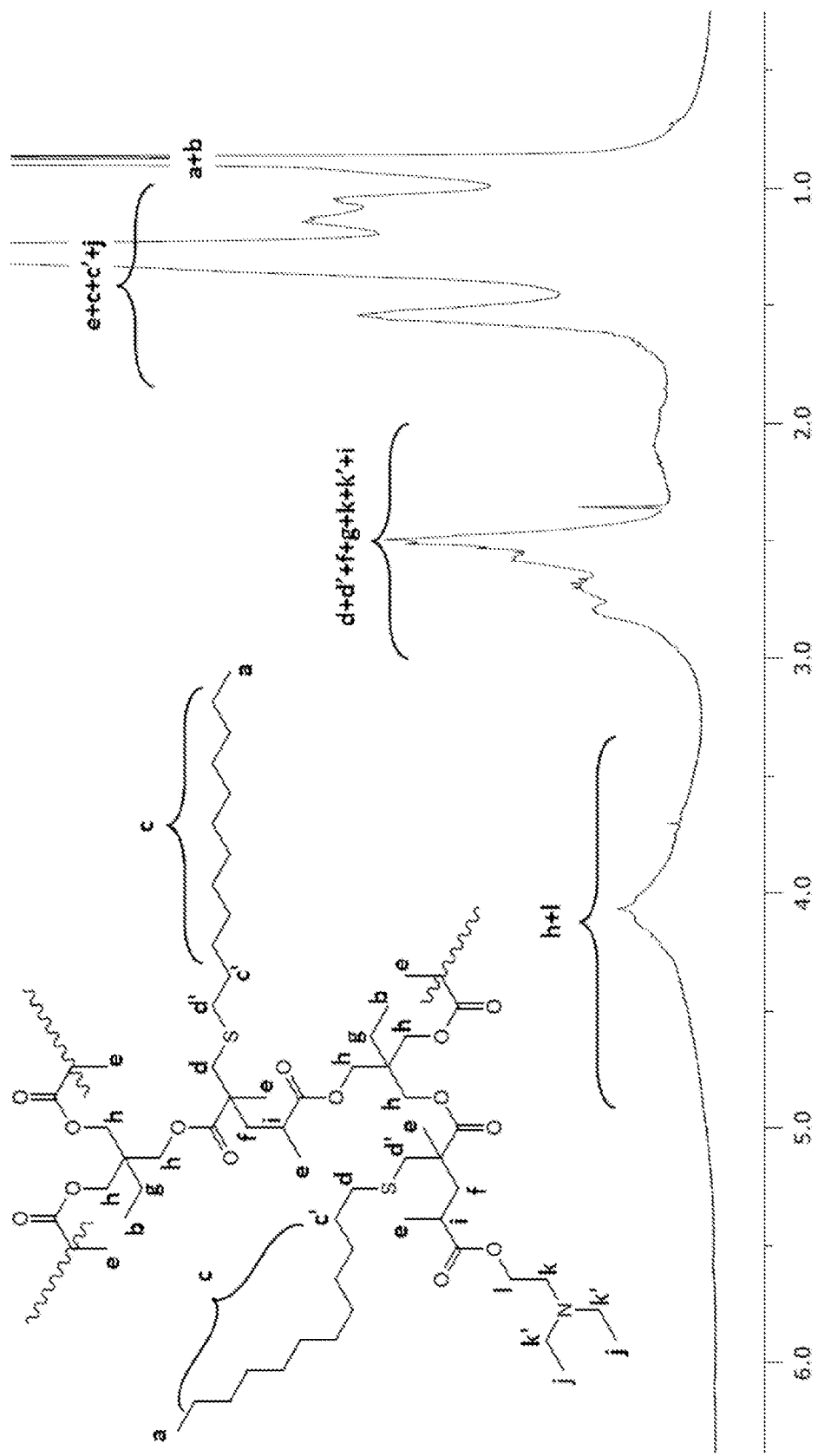
Figure 14:
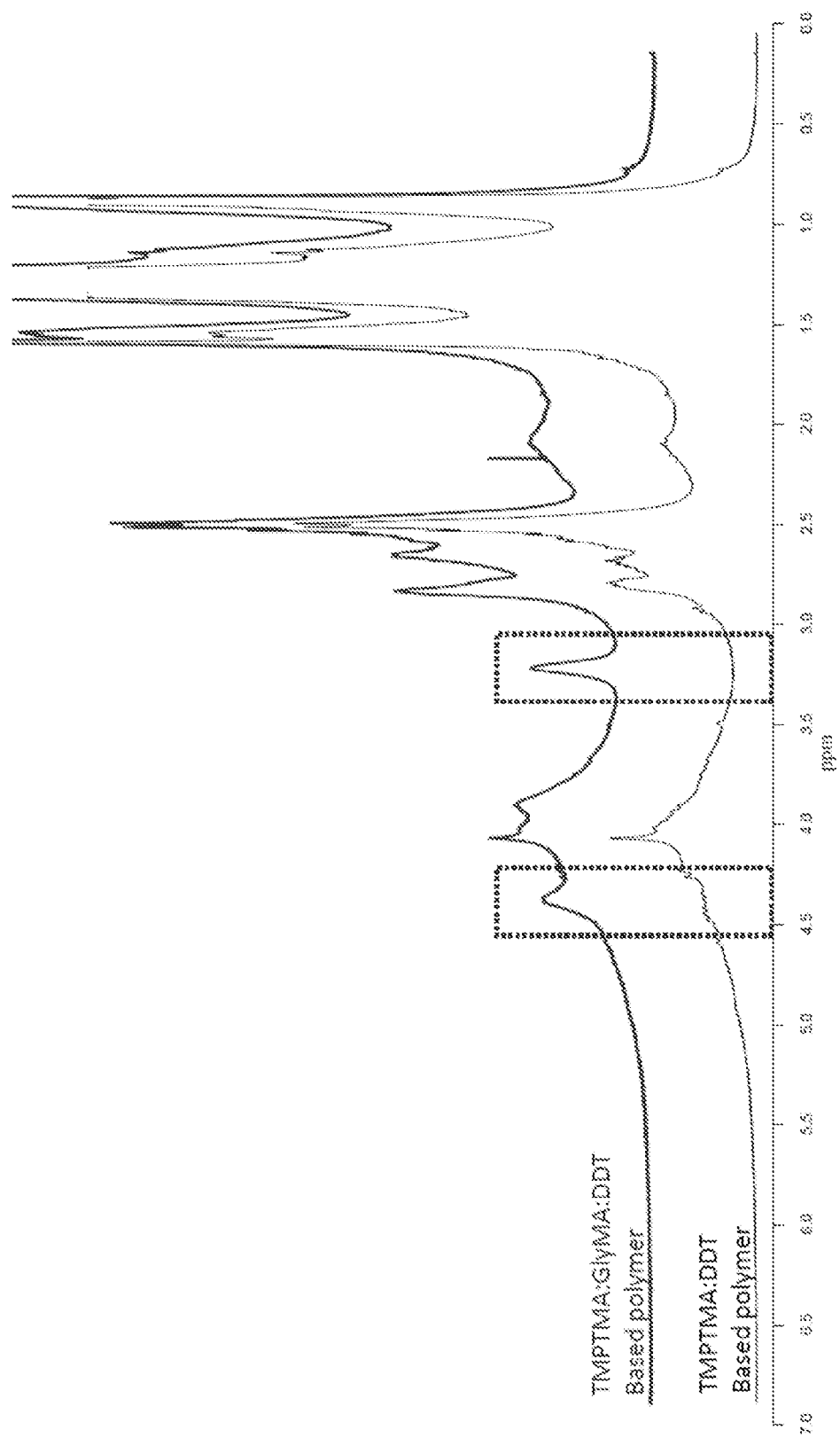
Figure 15:
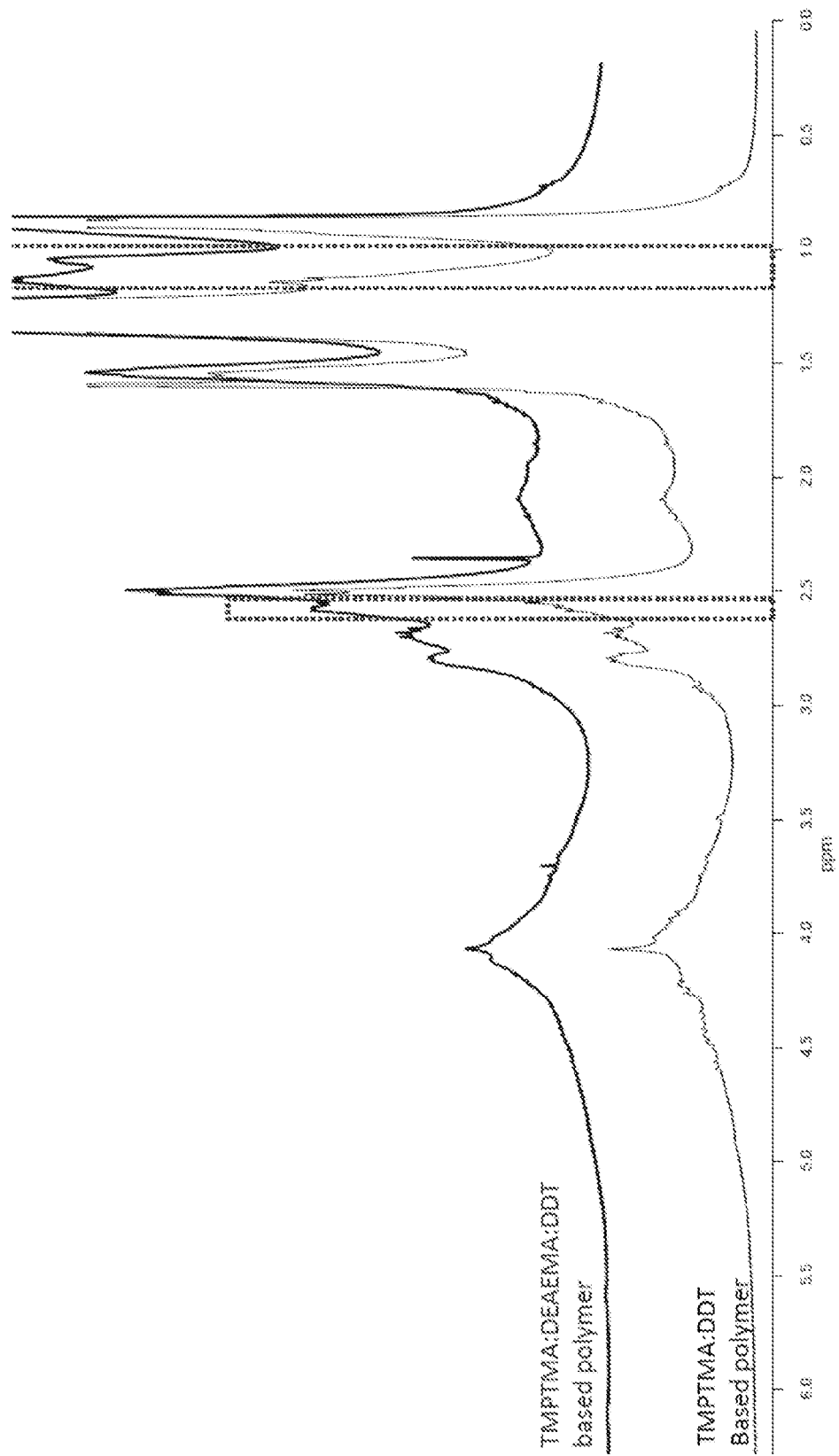

Proton NMR spectra of some of the products are shown in FIGS. 11 to 15:

FIG. 11—homopolymerisation of trivinyl monomer;

FIG. 12—polymerisation of trivinyl monomer with epoxy-functional monovinyl monomer;

FIG. 13—polymerisation of trivinyl monomer with tertiary amine-functional monovinyl monomer;

FIG. 14—comparison of spectra of FIGS. 11 and 12;

FIG. 15—comparison of spectra of FIGS. 11 and 13.

|  | NMR cony. | Mw (kg/mol) | Mn (kg/mol) | Đ | MH α |
|---|---|---|---|---|---|
| Trivinyl monomer [DDT]:[TMPTMA] | | | | | |
| 4:1 | >99% | 9.76 | 1.86 | 5.24 | 0.179 |
| 3:1 | >99% | 20.04 | 1.53 | 13.07 | 0.261 |
| 2.5:1 | >99% | 239.90 | 4.04 | 59.34 | 0.313 |
| 2:1 | >99% | 1,080 | 15.22 | 70.97 | 0.332 |
| Trivinyl + divinyl monomer [DDT]:[TMPTMA]:[EGDMA] | | | | | |
| 5:1:0.5 | >99% | 11.08 | 0.97 | 11.48 | 0.254 |
| 5:1:1 | >99% | 25.15 | 1.21 | 20.79 | 0.177 |
| 5:1:1.5 | >99% | 93.14 | 3.34 | 27.89 | 0.297 |
| 5:1:2 | >99% | 279.22 | 6.49 | 43.00 | 0.318 |
| Trivinyl + monovinyl monomer [DDT]:[TMPTMA]:[BzMA] | | | | | |
| 2.2:1:0.1 | >99% | 428.83 | 7.12 | 60.24 | 0.308 |
| 2.2:1:0.45 | >99% | 417.23 | 8.34 | 50.04 | 0.332 |
| Trivinyl + monovinyl monomer [DDT]:[TMPTMA]:[BzMA] | | | | | |
| 2:1:0.6 | >99% | 1,347 | 20.92 | 64.41 | 0.324 |
| 2:1:1 | >99% | 726.14 | 18.61 | 39.01 | 0.311 |
| Trivinyl + monovinyl monomer (tertiary amine functionality) [DDT]:[TMPTMA]:[DEAEMA] | | | | | |
| 2:1:0.15 | >99% | 682.43 | 17.35 | 39.32 | 0.305 |
| 2:1:0.6 | >99% | 560.65 | 62.91 | 8.91 | 0.322 |
| 2:1:0.8 | >99% | 228.63 | 31.37 | 7.29 | 0.319 |
| Trivinyl + monovinyl monomer (epoxy functionality) [DDT]:[TMPTMANGlyMA] | | | | | |
| 2:1:0.2 | >99% | 3,168 | 1,518 | 2.088 | 0.538 |
| 2:1:0.8 | >99% | 978.4 | 416.3 | 2.35 | 0.43 |
| 2:1:1 | >99% | 810.9 | 291.9 | 2.778 | 0.428 |

Example 18

The polymer products can have various properties depending on the functional groups within the monomers and other components. For example, degradable, biodegradable, compostable or responsive properties can be incorporated.

Figure 16:
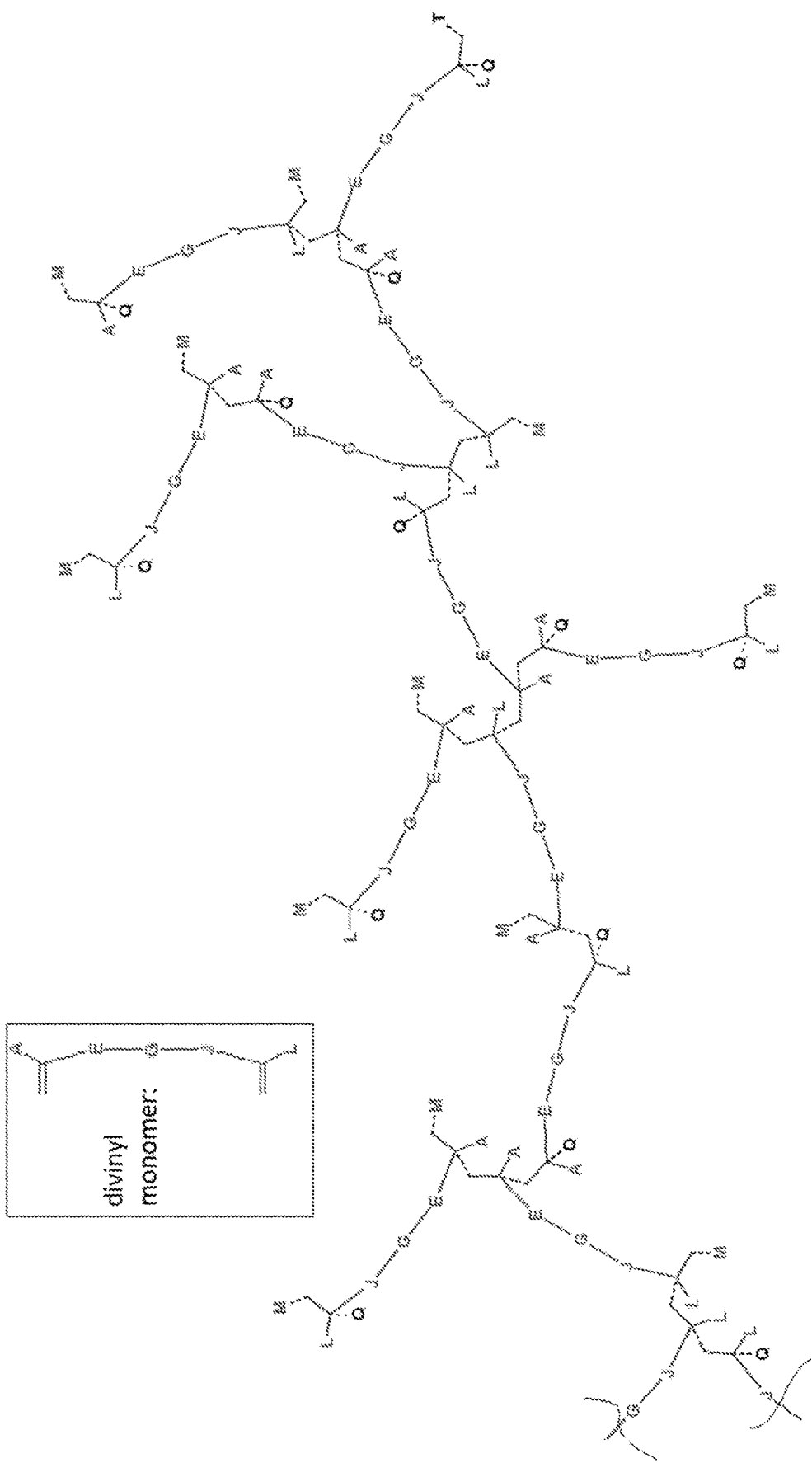
FIG. 16 shows a generic representation of components of a divinyl monomer and a fragment of a polymer of the present invention.

By way of example, FIG. 16 shows schematically a divinyl monomer and a fragment of a polymer made from it. In this divinyl monomer, A and L could be any substituent, E and J could be any linker (e.g. an ester), and G could be additional linking chemistry (of course there could just be one linking moiety). M denotes CTA, T initiator fragment and Q and X terminating groups from chain transfer. Degradable components could be introduced via for example E, J or G, or alternatively or additionally M or Q.

Accordingly, the products of the present invention may be biodegradable.

Example 19—Dilution Experiments

In contrast to the experimental procedures for some of the Examples described above which refer to a solids weight % of 50%, a series of experiments was carried out with a solids weight % of 10%, using EGDMA as DVM and DDT as CTA. Attempts were made to carry out the reaction using lower amounts of CTA per equivalents DVM. It was found that gels formed if 0.4 equivalents or fewer of CTA were used per 1 equivalent DVM. The gel point was found to be between 0.4 and 0.5. Non-gelled products were formed in the following cases:

| | | | | $^1$H NMR (CDCl$_3$) | | GPC (THF) | | | | |
|---|---|---|---|---|---|---|---|---|---|---|
| Entry | DDT (equiv.) | Gel Formation | % Yield | Vinyl Conversion (%) | EGDMA: DDT in final product | Mw (kg/mol) | Mn (kg/mol) | Đ | α | dn/dc |
| 1 | 0.45 | No | 75 | >99 | 0.95:1 | 6119 | 418.1 | 14.6 | 0.374 | 0.1099 |
| 2 | 0.5 | No | 82 | >99 | 1.65:1 | 1223 | 40.22 | 30.4 | 0.261 | 0.108 |
| 3 | 0.75 | No | 59 | >99 | 1.52:1 | 51.3 | 3.62 | 14.2 | 0.229 | 0.1182 |
| 4 | 1 | No | 53 | >99 | 1.3:1 | 14.02 | 2.34 | 5.99 | 0.206 | 0.1051 |
| 5 | 1.33 | No | 59 | >99 | 1:1 | 5.74 | 0.686 | 8.374 | 0.193 | 0.1103 |

DVM: EGDMA
Solvent: ethyl acetate
Solid wt % = 10%
AIBN %: 1.5%
DDT equivalents are per 1 equivalent EGDMA
Entries 1 and 2 were purified by precipitation into MeOH at 0 degrees C.
Entries 3 to 5 were purified by precipitation into MeOH at room temperature Of note is that non-gelled products were formed when as little as 0.45 equivalents of CTA were used per equivalent of DVM (reaction time: 24 hours).

The appearances and textures observed in the products were as follows:
Entry 1: white crunchy powder
Entry 2: white fine powder
Entry 3: white solid
Entry 4: clear, sticky, hard "liquid"
Entry 5: clear, sticky, soft "liquid"

Further experiments were carried out at solid weight % of 10, 25 and 50:

| | | | | | | $^1$H NMR (CDCl$_3$) | GPC (THF) | | | | |
|---|---|---|---|---|---|---|---|---|---|---|---|
| Entry | EGDMA (equiv.) | DDT (equiv.) | Solid wt. % | Reactn Time (hrs) | Yield (%) | Vinyl Conv. (%) | EGDMA: DDT in final product | Mw (kg/mol) | Mn (kg/mol) | Đ | α | dn/dc |
| 1 | 1 | 1.33 | 10 | 24 | 59 | >99 | 1:1 | 5.74 | 0.686 | 8.374 | 0.193 | 0.1103 |
| 2 | 1 | 1.33 | 25 | 24 | 73 | >99 | 0.91:1 | 14.75 | 0.658 | 22.43 | 0.215 | 0.0976 |
| 3 | 1 | 1.33 | 50 | 24 | 67 | >99 | 1:1 | 229 | 2.83 | 80.8 | 0.339 | 0.0883 |

Entry 1: clear, sticky, soft "liquid"
Entry 2: turbid, soft liquid
Entry 3: clear, sticky, hard "liquid"

Example 20—Kinetics of Polymerisation with Varying Amounts of AIBN

The polymerisations proceeded more slowly but still effectively even at low concentrations of initiator:

| | | | | | | $^1$H NMR (CDCl$_3$) | | | GPC (THF) | | | |
|---|---|---|---|---|---|---|---|---|---|---|---|---|
| Entry | Theoretical EGDMA (equiv.) | Theoretical DDT (equiv.) | Gel Formation | Reaction Time (hrs) | % AIBN | Actual Ratio of EGDMA: DDT @ t = 0 | Vinyl Conv (%) | EGDMA: DDT in final product | Mw (kg/mol) | Mn (kg/mol) | Đ | α | dn/dc |
| 1 | 1 | 1.33 | No | 24 | 1.5 | — | >99 | 1:1 | 229 | 2.83 | 80.84 | 0.339 | 0.0883 |
| 2 | 1 | 1.33 | No | 24 | 0.15 | 1:1.36 | 99 | 0.92:1 | 182.71 | 1.84 | 99.3 | 0.329 | 0.0966 |
| 3 | 1 | 1.33 | No | 24 | 0.05 | 1:1.33 | 94 | 0.97:1 | 81 | 1.72 | 46.96 | 0.319 | 0.0979 |
| 4 | 1 | 1.33 | No | 48 | 0.05 | 1:1.33 | 99 | TBC | TBC | TBC | TBC | TBC | TBC |

| | | $^1$H NMR (CDCl$_3$) | | | |
|---|---|---|---|---|---|
| Sample | Reaction Time (hr) | EGDMA + DDT System at 1.5% AIBN Vinyl Conversion (%) | EGDMA + DDT System at 0.05% AIBN Vinyl Conversion (%) | EGDMA + DDT System at 0.15% AIBN Vinyl Conversion (%) | EGDMA + DDT System at 0.05% AIBN (2) Vinyl Conversion (%) |
| 1 | 0 | 0 | 0 | 0 | 0 |
| 2 | 0.5 | 48 | 8 | — | — |
| 3 | 1 | 83 | 20 | — | — |
| 4 | 1.5 | 98 | 33 | — | — |
| 5 | 2 | >99 | 45 | — | — |
| 6 | 2.5 | >99 | 53 | — | — |
| 7 | 3 | >99 | 59 | 23 | 16 |
| 8 | 3.5 | >99 | 68 | — | — |
| 9 | 4 | >99 | 74 | — | — |
| 10 | 5 | >99 | 82 | — | — |
| 11 | 6 | >99 | 86 | 45 | 39 |
| 12 | 24 | >99 | 99 | 94 | 95 |
| 13 | 48 | N/A | N/A | N/A | 99 |

Example 21—Co-Polymerisation of EGDMA and Dibutyl Itaconate ("BioLIFT") with DDT In this example, dibutyl itaconate (a monovinyl monomer derived from itaconic acid) is incorporated.

In a typical experiment, ethylene glycol dimethacrylate (1 g, 5.05 mmol, 1 equiv.), dibutyl itaconate (0.244 g, 1.01 mmol, 0.2 equiv.), 1-Dodecanethiol (1.36 g, 6.73 mmol, 1.33 equiv.), AIBN (0.0249 g, 0.151 mmol) and ethyl acetate (2.89 mL) were added to a 10 mL round-bottomed flask and purged with nitrogen for 15 minutes. The reaction flask was heated at 70° C. and stirred for 24 hours and then cooled. The reaction mixture was concentrated by rotary evaporation, followed by dilution with THF and purified via precipitation into methanol at room temperature which afforded a white precipitate (1.98 g, 76%). A sample of the product was taken for $^1$H NMR spectroscopic analysis in CDCl$_3$ and for GPC analysis in THF.

| | | | | | | $^1$H NMR (CDCl$_3$) | | GPC (THF) | | | | |
|---|---|---|---|---|---|---|---|---|---|---|---|---|
| Entry | EGDMA (equiv.) | BioLIFT (equiv.) | DDT (equiv.) | Solvent | Reaction Time (hrs) | Vinyl Conversion (%) | EGDMA: BioLIFT: DDT in final product | Mw (kg/mol) | Mn (kg/mol) | Đ | α | dn/dc |
| 1 (128) | 1 | 0.2 | 1.33 | Ethyl Acetate | 24 | >99.9 | 1.0:1.0:0.2 | 99 | 6.1 | 16 | 0.298 | 0.1037 |
| 2 (130) | 1 | 0.1 | 1.33 | Ethyl Acetate | 24 | >99.9 | 1.0:1.0:0.1 | 94 | 2.2 | 44 | 0.305 | 0.0927 |

Example 22—Acid Functional Brancher (BDIB) Synthesis

In this example, a degradable brancher (divinyl monomer) based on itaconic acid was prepared.

Itaconic anhydride (25 g, 223 mmol, 2 equiv.), 1, 4-Butanediol (10.1 g, 112 mmol, 1 equiv.), 4-Methoxyphenol (0.025 g, 0.201 mmol) and acetone (44.3 mL) were added to a 50 mL round-bottomed flask and fitted with a condenser. The reaction flask was heated at 70° C. and stirred for 8 hours. The reaction mixture was concentrated by rotary evaporation which afforded a white precipitate (23.44 g, 67%). A sample of the product was taken for $^1$H NMR spectroscopic analysis in d$_6$-DMSO.

Example 23—Co-Polymerisation of EGDMA and BDIB with DDT

In a typical experiment, ethylene glycol dimethacrylate (1 g, 5.05 mmol, 0.5 equiv.), BDIB (1.59 g, 5.05 mmol, 0.5 equiv.), 1-Dodecanethiol (2.72 g, 13.5 mmol, 1.33 equiv.), AIBN (0.0497 g, 0.303 mmol) and ethyl acetate (5.88 mL) were added to a 25 mL round-bottomed flask and purged with nitrogen for 15 minutes. The reaction flask was heated at 70° C. and stirred for 24 hours and then cooled. The reaction mixture was concentrated by rotary evaporation and purified via trituration into petroleum ether at room temperature which afforded a white precipitate (3.72 g, 70%). A sample of the product was taken for $^1$H NMR spectroscopic analysis in CDCl$_3$ and for GPC analysis in THF.

| | DVM | | | | | $^1$H NMR (CDCl$_3$) | | GPC (THF) | | | | |
|---|---|---|---|---|---|---|---|---|---|---|---|---|
| Entry | EGDMA (equiv.) | BDIB (equiv.) | DDT (equiv.) | Gel Formation | Reaction Time (hrs) | Vinyl Conversion (%) | EGDMA: BDIB: DDT in final product | Mw (kg/mol) | Mn (kg/mol) | Đ | α | dn/dc |
| 1 (189)$^a$ | 0.4 | 0.6 | 0.5 | No | 24 | 65 | TBC | 16.3 | 3.43 | 4.74 | 0.137 | 0.0473 |
| 2 (186) | 0.4 | 0.6 | 1.33 | No | 24 | >99.9 | TBC | 15.9 | 5.01 | 3.13 | 0.175 | 0.0982 |
| 3 (181) | 0.5 | 0.5 | 1.33 | No | 24 | >99.9 | TBC | 23.2 | 6.72 | 3.45 | 0.188 | 0.1 |
| 4 (172) | 0.63 | 0.37 | 1.33 | No | 24 | 90.8 | TBC | 53.9 | 9.65 | 5.58 | 0.652 | 0.1002 |
| 5 (173) | 0.8 | 0.2 | 1.33 | No | 24 | >99.9 | TBC | 95.3 | 6.55 | 14.6 | 0.443 | 0.1029 |
| 6 (174)$^b$ | 0.87 | 0.13 | 1.33 | No | 24 | >99.9 | TBC | 89.5 | 4.36 | 20.5 | 0.267 | 0.0941 |
| 7 (101) | 1 | 0 | 1.33 | No | 24 | >99.9 | 1.0:1.0 | 229 | 2.83 | 80.8 | 0.339 | 0.0883 |

$^a$Conducted at 10 wt. % solid content.
Soluble (& foaming) at pH 7
$^b$Entry 6 is 0.72:1 (DVM; CTA)

Degradation in Water Tests were carried out on three samples to observe properties before and after 5 days in basic water.

Before (upper part of FIG. 17):

| Entry | DVM | | | GPC (THF) | | | | |
|---|---|---|---|---|---|---|---|---|
| | EGDMA (equiv.) | BDIB (equiv.) | DDT (equiv.) | Mw (kg/mol) | Mn (kg/mol) | Ð | α | dn/dc |
| 1 (172) | 0.63 | 0.37 | 1.33 | 53.9 | 9.65 | 5.58 | 0.652 | 0.1002 |
| 2 (173) | 0.8 | 0.2 | 1.33 | 95.3 | 6.55 | 14.6 | 0.443 | 0.1029 |
| 3 (174) | 0.87 | 0.13 | 1.33 | 89.5 | 4.36 | 20.5 | 0.267 | 0.0941 |

After (lower part of FIG. 17):

| Entry | DVM | | | GPC (THF) | | | | |
|---|---|---|---|---|---|---|---|---|
| | EGDMA (equiv.) | BDIB (equiv.) | DDT (equiv.) | Mw (kg/mol) | Mn (kg/mol) | Ð | α | dn/dc |
| 1 | 0.63 | 0.37 | 1.33 | 43.9 | 19.5 | 2.35 | 0.216 | 0.1046 |
| 2 | 0.8 | 0.2 | 1.33 | 17.5 | 10.2 | 1.72 | 0.247 | 0.1032 |
| 3 | 0.87 | 0.13 | 1.33 | 14.1 | 3.31 | 4.51 | 0.273 | 0.1028 |

Figure 17:
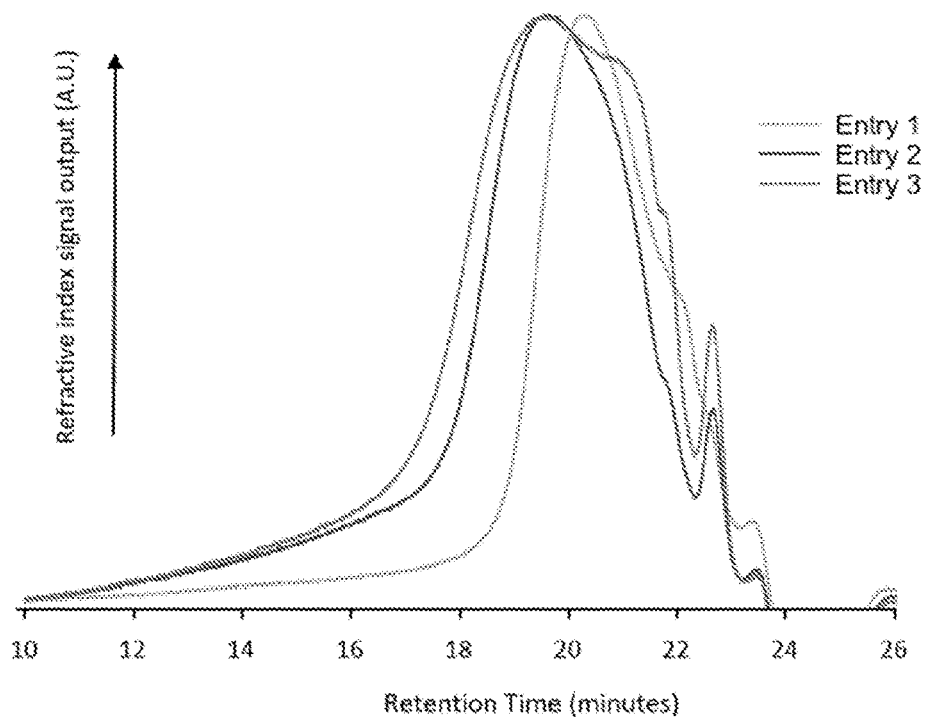
FIG. 17 shows a decrease in the relative amounts of higher molecular weight species present after degradation of a responsive product in basic water.
Figure 17:
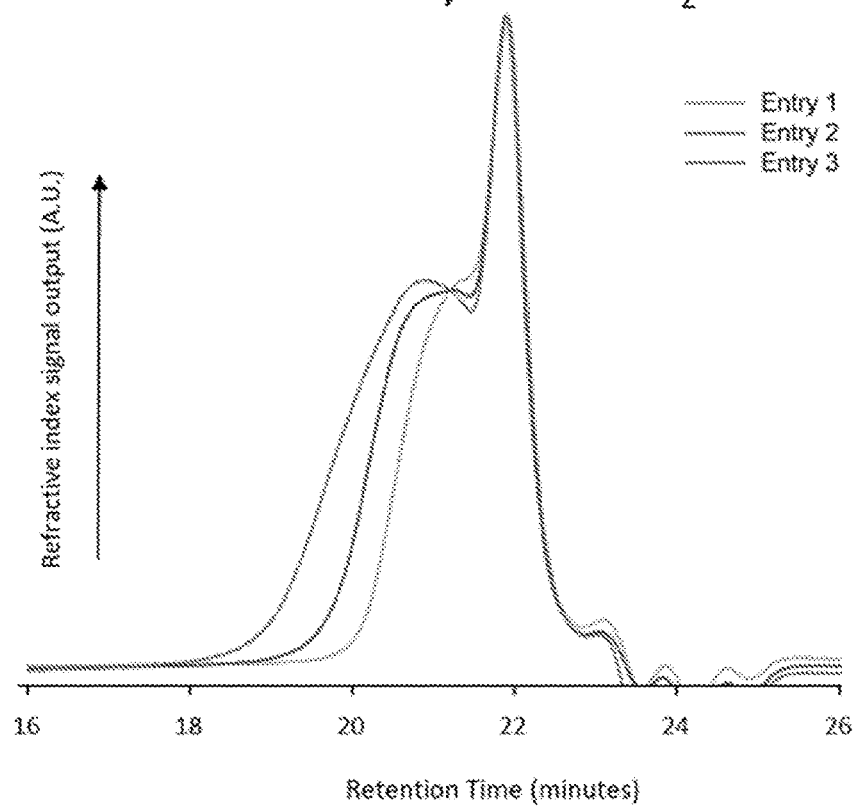

As shown in FIG. 17, a decrease in the intensity of higher molecular weight species is observed, indicating that degradation has occurred.

Mixed DVM and CTA System:

| Entry | DVM | | CTA | | Reaction Time (hrs) | Vinyl Conversion (%) | $^1$H NMR (d$_6$-DMSO) EGDMA:BDIB:TG: DDT in final product | GPC (THF) | | | | |
|---|---|---|---|---|---|---|---|---|---|---|---|---|
| | EGDMA (equiv.) | BDIB (equiv.) | 1-TG (equiv.) | DDT (equiv.) | | | | Mw (kg/mol) | Mn (kg/mol) | Ð | α | dn/dc |
| 1 (188) | 0.30 (40%) | 0.45 (60%) | 0.5 | 0.5 | 24 | 99.7 | TBC | 8.41 | 2.56 | 3.29 | 0.15 | 0.0359 |

Soluble (and foaming) at pH 5-7

Example 24—Use of Poly(Caprolactone) Dimethacrylate (PCLDMA): A Divinyl Macromonomer which is a Degradable Brancher Due to the Presence of Multiple Cleavable Ester Linkages Between the Vinyl Groups Syntheses of PCLDMA The macro-monomer PCLDMA was synthesised in two steps: firstly, the acid catalysed ring opening polymerisation (ROP) of caprolactone (CL) using a bifunctional initiator (benzene dimethanol—this specific molecule was selected due to its aromatic nature in order to have extensive characterisation of the resulting polymer via $^1$H NMR); secondly, esterification of the hydroxyl chain ends with methacryloyl chloride to yield the di-vinyl polycaprolactone (PCL) brancher, PCLDMA.

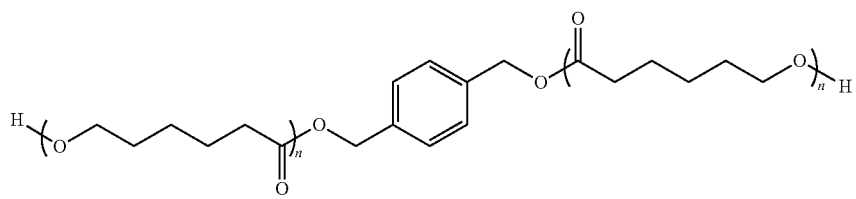

the PCLDMA macro-promonomer

Figure 18:
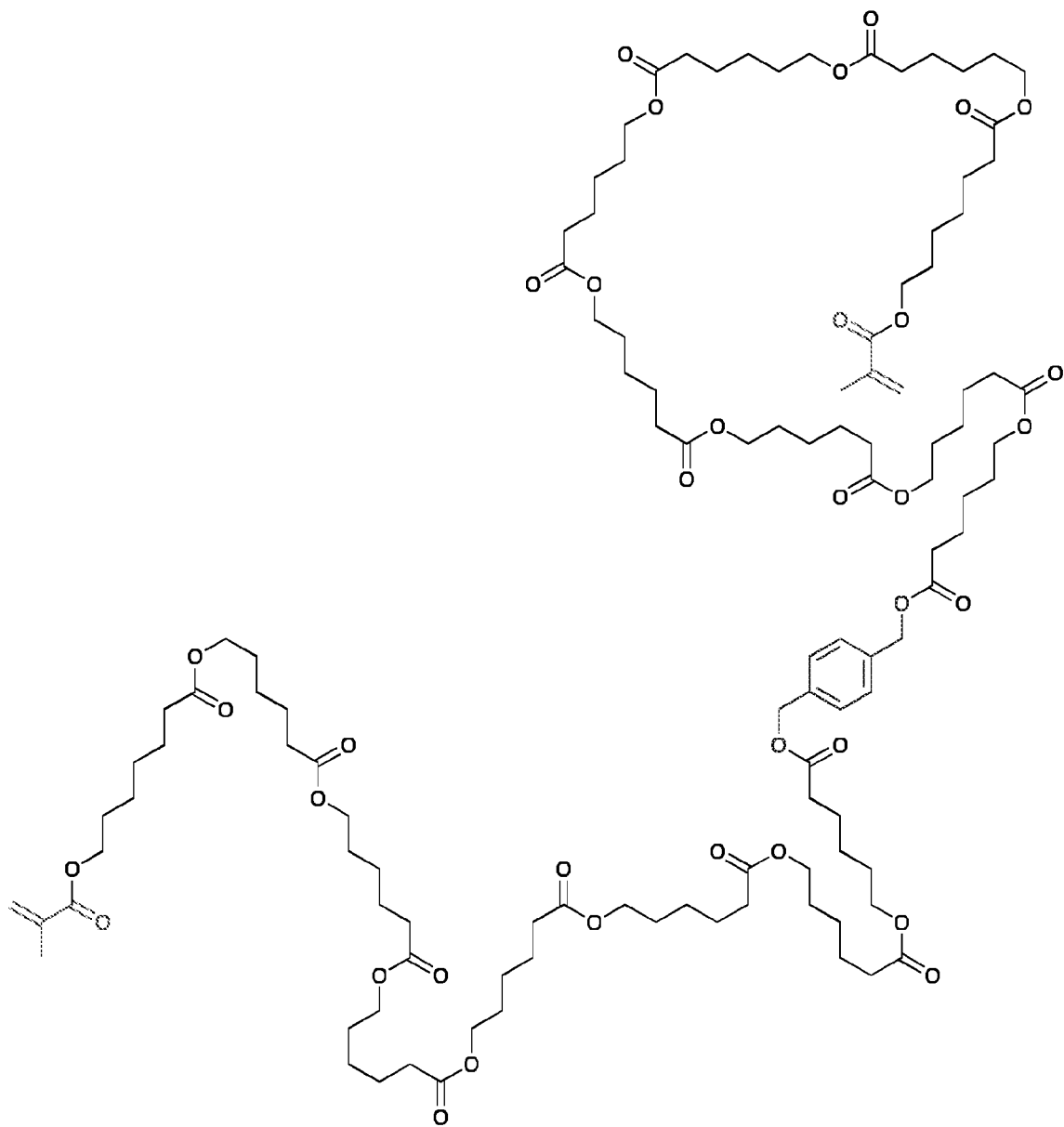
FIGS. 18 and 19 show examples of divinyl monomers which are macromonomers and contain multiple ester cleavage sites.
Figure 19:
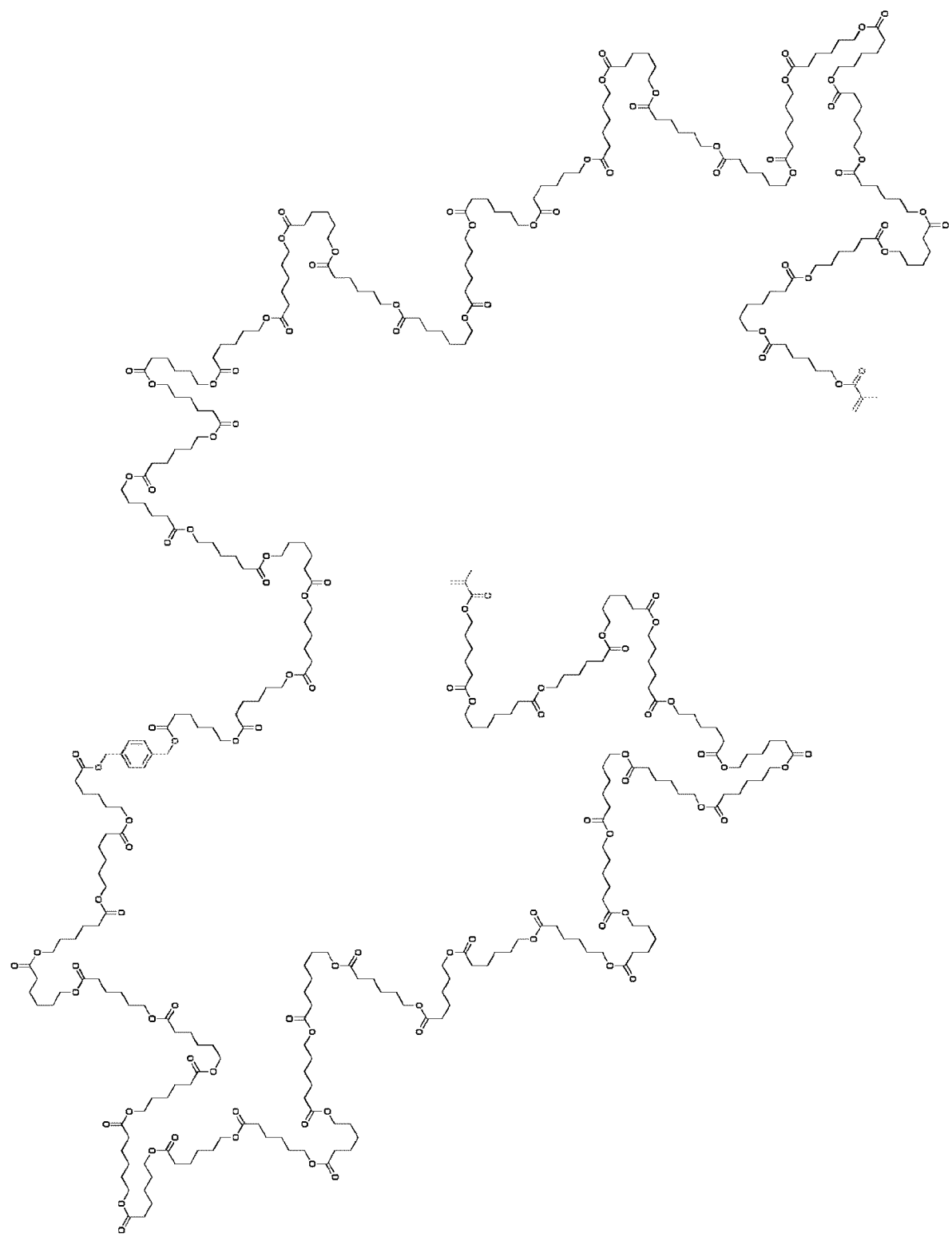

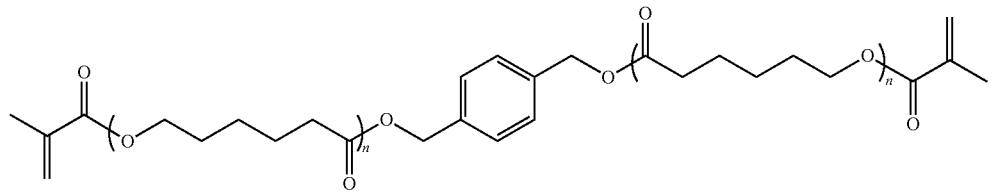

the PCLDMA macro-monomer, in which n represents the number of CL units in each part of the monomer FIGS. 18 and 19 show idealistic representations of two PCLDMA macromonomers: FIG. 18 shows PCLDMA 2k with 7 CL units either side of the bifunctional initiator; and FIG. 19 shows PCLDMA 6k with 30 CL units either side of the bifunctional initiator.

PCLDiOH, α, ω-Dthydroxy Funcllonalised Polycaprolactone

In a typical experiment targeting a $DP_n$ of 60, 1,4-benzenedimethanol (1.21 g, 8.8 mmol) and CL (60.0 g, 0.53 mol) were sealed in a dry RBF equipped with a magnetic stirrer bar. Toluene (anhydrous) (150 mL) was then injected to the sealed RBF followed by the addition of the acid catalyst MSA (0.6 mL, 9.2 mmol). The mixture was left to stir for 1.5 h at 55° C. The reaction was terminated by the addition of alumina (Brockmann, activated, basic) (5 g). The mixture was then filtered by gravity and the basic alumina collected in the filter paper washed with toluene (three washes, each 25 mL). The filtrate was rotary evaporated (70 mbar, 40° C.) to 50 mL. The mixture was then precipitated in petroleum ether (40-60° C.) (500 mL). The supernatant was poured away and the precipitate was dried in a vacuum oven at 40° C. overnight, yielding a white solid. The white solid was collected and analysed by $^1$H NMR and TD-SEC.

PCLDMA Macro-Monomer

In a typical experiment targeting a $DP_n$ of 60, PCLDiOH, $DP_n$ 60 (20.0 g; 3.0 mmol; synthesis described above) was added to a dry RBF equipped with a magnetic stirrer bar and the RBF was sealed. TEA (anhydrous) (2 mL) and THF (anhydrous) (100 mL) were added. The mixture was stirred until a clear solution formed. An excess of methacroyl chloride (0.8 mL, 8.2 mmol) was added gradually over a 20 min period with an ice bath. A white precipitate formed upon addition of methacroyl chloride. The mixture was stirred for 24 h. The mixture was then filtered under gravity, with the filter paper being washed with THF (three washes, each 20 mL). The filtrate was then passed through a column filled with alumina (Brockmann, activated, basic) (5 g). 4-Methoxyphenol was added to the solution (20 mg, 16 μmop. The solution was then rotary evaporated (250 mbar, room temperature) to 50 mL. 4-Methoxyphenol (40 mg, 32 μmop was added to cold petroleum ether (40-60° C.) (500 mL). PCLDMA was then precipitated from THF into cold petroleum ether (40-60° C.), producing a white precipitate. The supernatant was then poured away and the precipitate was dried in a vac-oven, yielding a white solid. The white solid was characterised by $^1$H NMR and TD-SEC.

PCLDMA Characterisation Data

Figure 21:
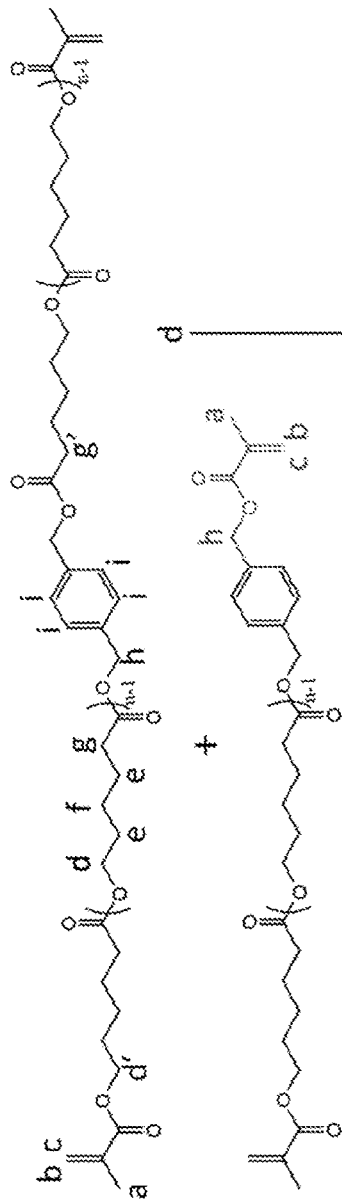
FIG. 21 shows an NMR spectrum of a mixture of degradable macromonomers.
Figure 21:
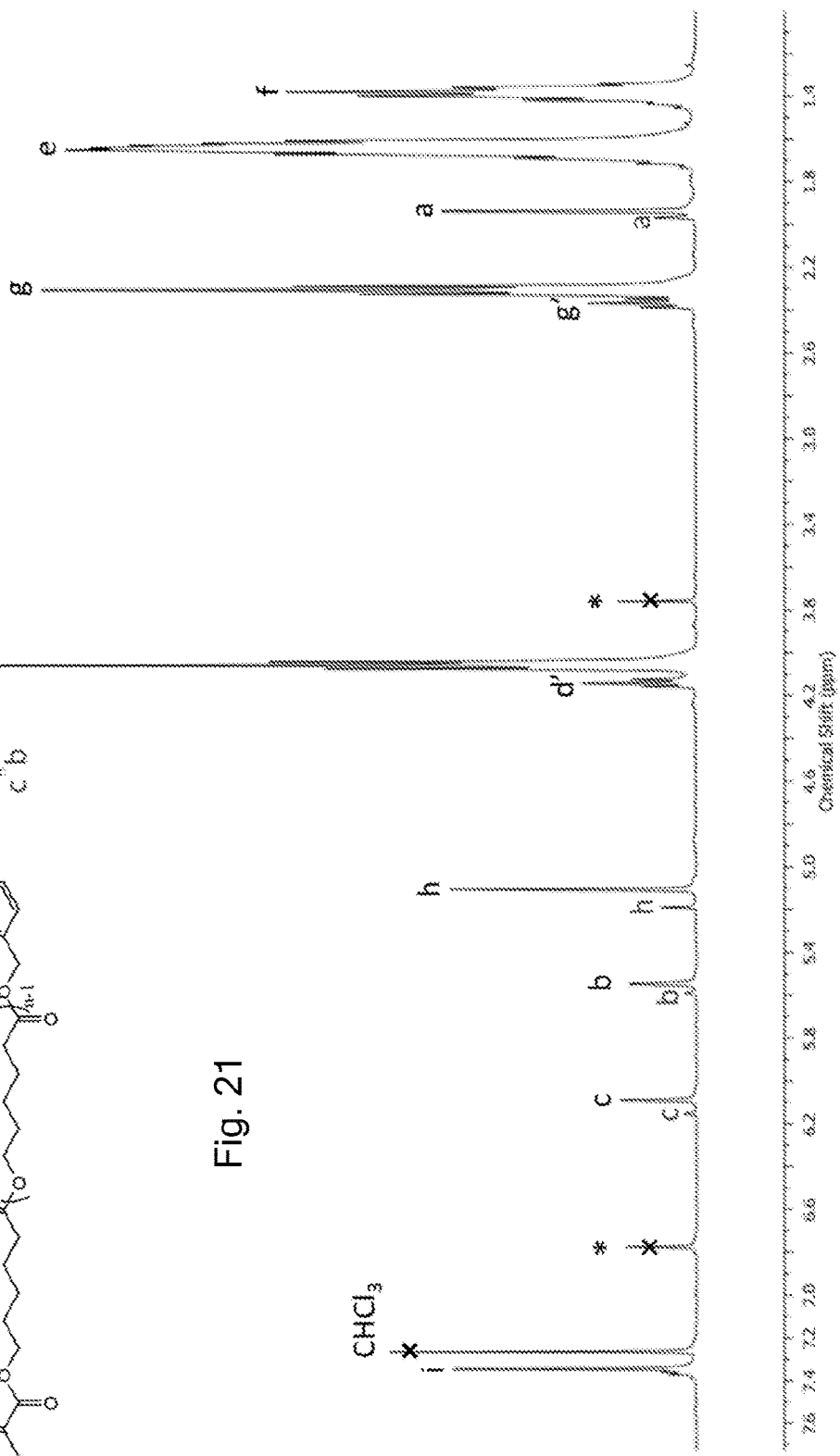

FIG. 21 shows an $^1$H NMR spectrum (CDCl$_3$; 400 MHz) of PCLDMA $DP_n$ 14 (PCLDMA 2K). The singlets at 3.75 and 6.75 ppm, indicated by asterisks (*) are from the antioxidant 4-methoxy phenol. The precipitated product is a macromonomer mixture which contains mainly compounds in which both sides of the aromatic initiator have been polymerised with caprolactone (top structure in FIG. 21), and, to a lesser extent, compounds in which only one side of the aromatic initiator has been polymerised with caprolactone (bottom structure in FIG. 1). The smaller peaks for proton types a, b, c and h are from the monomer in which only one side of the aromatic initiator has been polymerised with caprolactone. The fact that mixtures of macromonomers of this kind may be obtained is not problematic because both types of compound are suitable for vinyl polymerisation.

Results of the GPC analysis for the different $DP_n$s of the PCLDMA macro-monomers are shown in the table below which includes the $M_n$ and $DP_n$ observed by $^1$H NMR, $M_n$, $M_w$, Đ and M-H α observed by GPC.

a: Determined by $^1$H NMR of pure samples, b: Determined by GPC.

| Macro-monomer | $DP_n{}^a$ | $M_n{}^a$ (kg/mol) | $M_n{}^b$ (kg/mol) | $M_w{}^b$ (kg/mol) | Đ$^b$ | M-H · α$^b$ |
|---|---|---|---|---|---|---|
| PCLDMA 2k | 14 | 1.6 | 1.8 | 2.3 | 1.3 | 0.82 |
| PCLDMA 6k | 60 | 6.2 | 4.4 | 6.6 | 1.5 | 0.68 |

Example 25—Polymerisations of PCLDMA Macromonomers

Figure 20:
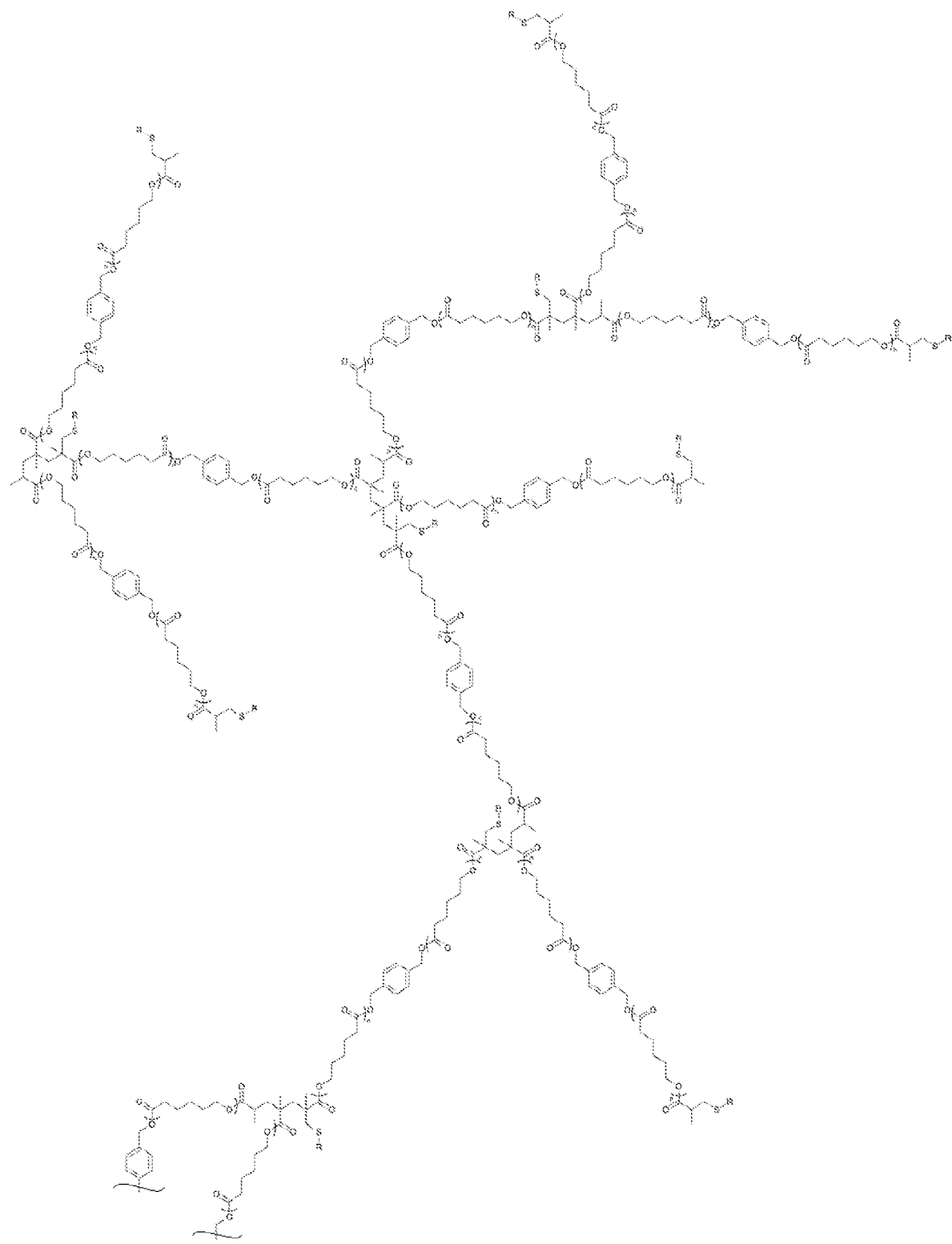
FIG. 20 shows a representation of a fragment of a degradable branched polymer which may be prepared by the polymerization of a degradable macromonomer.

FIG. 20 shows an example of a fragment of a degradable hyperbranched (HB) polymer formed by the free radical vinyl polymerisation of a PCLDMA macromonomer, using a thiol chain transfer agent (CTA), HSR.

Poly(PCLDMA) Synthesis

In a typical CTA mediated free radical polymerisation of PCLDMA $DP_n$ 60, AIBN (12 mg, 7.3 μmop, PCLDMA $DP_n$ 60 (3.0066 g, 0.48 mmol), TG (0.1026 g, 0.95 mmol) and toluene (4.9 g) were added to a dry RBF equipped with a magnetic stirrer bar. The solution was degassed via nitrogen sparge for 15 min. The solution was then heated at 70° C. for 24 h with constant stirring. An aliquot was taken in order to determine the vinyl conversion via $^1$H NMR analysis, then, the solution was cooled to room temperature and precipitated into cold petroleum ether (100 mL). The supernatant was then poured away and the precipitate collected and dried in a vacuum oven at 50° C. overnight. The polymer was characterised by TD-SEC and $^1$H NMR.

Poly(PCLDMA) Characterisation Data (NMR and GPC)

The following table shows data for poly(PCLDMA 6k) branched polymers synthesised using the macro-monomer PCLDMA 6k and chain transfer agents (CTA) dodecanethiol (DDT) and thiolglycerol (TG).

| Entry | CTA | Targeted [CTA]: [PCLDMA 6 k] ratio$^a$ | Observed [CTA]: [PCLDMA] ratio$^c$ | Conversion (%)$^b$ | $M_n{}^d$ (kg/mol) | $M_w{}^d$ (kg/mol) | Đ$^d$ | M-H · α$^d$ |
|---|---|---|---|---|---|---|---|---|
| 1 | DDT | 1.5:1 | 1.2:1 | ≥99 | 5.0 | 49.9 | 9.9 | 0.46 |
| 2 | DDT | 1.7:1 | 1.3:1 | 95 | 6.4 | 31.4 | 4.9 | 0.50 |
| 3 | TG | 1.9:1 | 1.5:1 | 95 | 7.1 | 34.9 | 4.9 | 0.50 |

$^a$Determined by $^1$H NMR of crude samples at t = 0.

$^b$Determined by $^1$H NMR of crude samples at t = $t_f$ = end of the reactions.

$^c$Determine by $^1$H NMR of purified samples.

$^d$Determined by TD-SEC.

Figure 22:
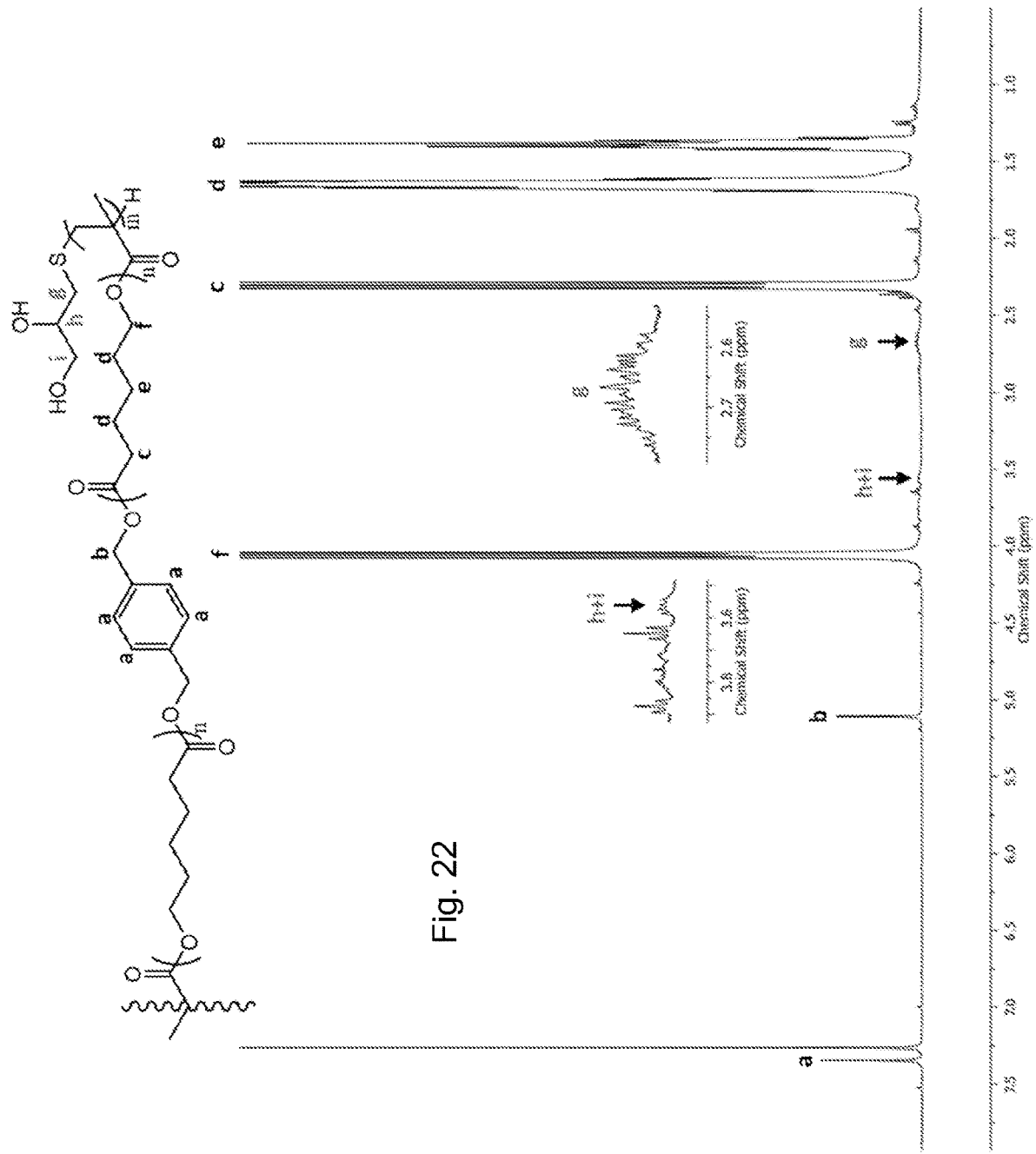
FIG. 22 shows an NMR spectrum of a degradable branched polymer.

FIG. 22 shows a $^1$H NMR spectrum (CDCl$_3$; 400 MHz) of poly(PCLDMA 6k) with thiolglycerol (TG) as the CTA (entry 3 in the table above).

Figure 23:
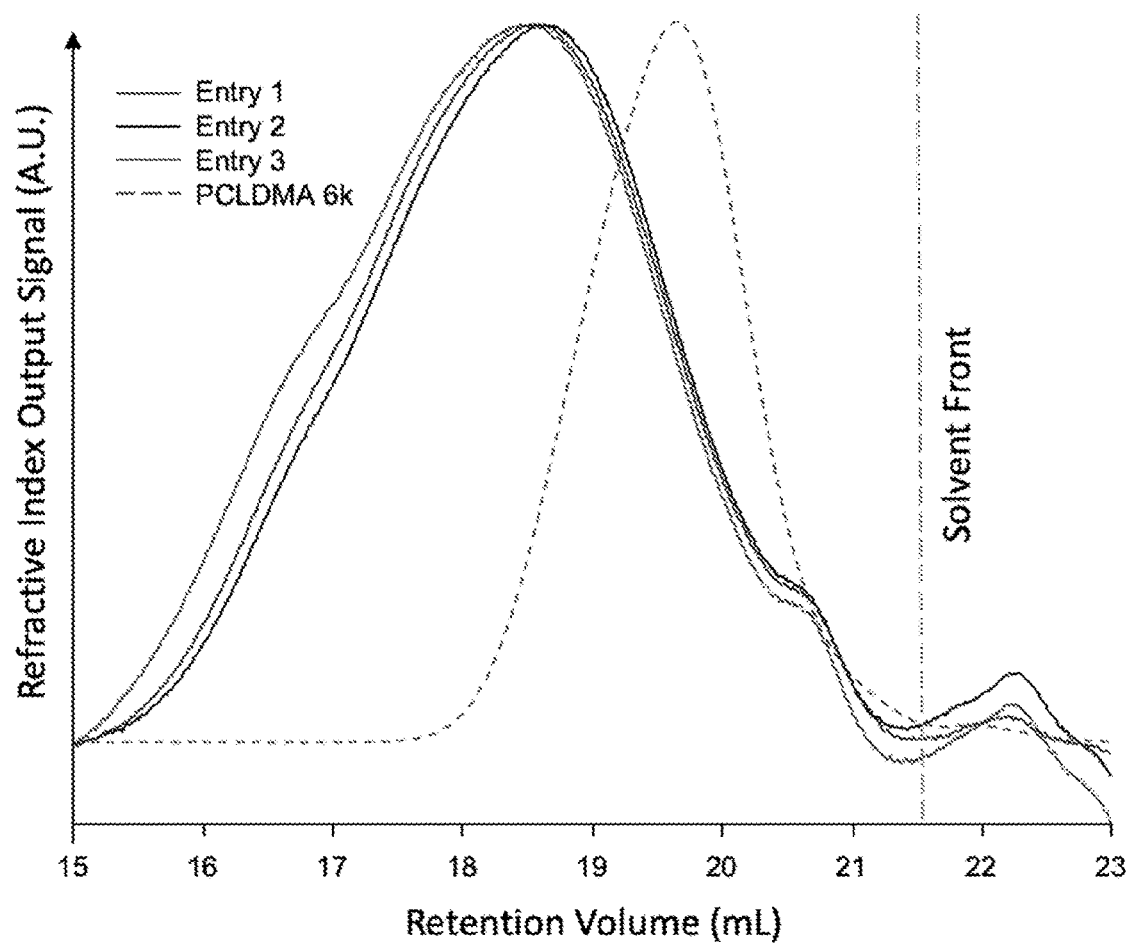
FIG. 23 shows GPC traces of degradable branched polymers and a degradable macromonomer precursor.

FIG. 23 shows GPC traces of the poly(PCLDMA 6k) and the PCLDMA 6k macro-monomer.

Example 26—Degradation Studies Carried Out on Degradable Branched Polymers [Poly(PCLDMA)] and Also on Precursors Thereof The degradation study used a control of commercially available PCL ($M_n$=80 kg mol$^{-1}$) in lipase solution to ensure the enzyme solution was active.

In preliminary experiments, degradation studies were performed on the macro-monomers prior to the CTA mediated free radical (FR) polymerisation step. The results of the degradation studies for the macro-monomers (entries 2 and 3 in the table below) showed that there was a significant amount of degradation in each case, with PCLDMA 2k and PCLDMA 6k showing almost complete degradation after 10 days. The percentage mass loss of the macro-monomers was comparable to the linear PCL (80 kg mol$^{-1}$) control sample (entry 1 in the table below) which showed complete degradation after 10 days. The results from the degradation study provided proof of concept that the macro-monomers synthesised were degradable.

Samples of the different poly(PCLDMA) materials were placed in pre-weighed vials containing a solution of lipase (*pseudomonas* cepacian) in a buffered phosphate saline solution (pH 7.2) with sodium azide (0.02 wt %) at 37° C. with constant agitation for 10 days. The clear homogeneous aqueous phase was then carefully removed from the vials ensuring all solids were kept inside. The vials and solids were then washed with deionised water and the aqueous phase removal procedure was repeated. The vials and their content were then placed in a vacuum oven at 50° C. for 24 hours and the mass loss was assessed by weight difference.

The following table shows results of the degradation study of the macro-monomers and polymers of PCLDMA 2k and PCLDMA 6k, and the PCL (80 kg mol$^{-1}$) control sample. The table contains the CTA, $M_w$, initial mass of the film, the mass lost through degradation and the percentage mass lost with the error based on the equipment which was ±1 mg.

a: Determined by GPC

| Entry | Sample | $M_w{}^a$ (kg mol$^{-1}$) | CTA | Initial Mass (mg) | Mass Loss (mg) | Percentage Mass Loss (% ± % error) |
|---|---|---|---|---|---|---|
| 1 | Control | 80.0 | — | 30.3 | 30.5 | 101 ± 1 |
| 2 | PCLDMA 2k | 2.3 | — | 31.9 | 30.8 | 97 ± 3 |
| 3 | PCLDMA 6k | 6.6 | — | 57.7 | 55.4 | 96 ± 2 |
| 4 | Poly(PCLCMA 2k) | 37.8 | DDT | 27.2 | 15.1 | 56 ± 3 |
| 5 | Poly(PCLCMA 2k) | 12.6 | DDT | 23.6 | 16.8 | 71 ± 4 |
| 6 | Poly(PCLCMA 6k) | 49.9 | DDT | 64.0 | 22.9 | 36 ± 1 |
| 7 | Poly(PCLCMA 6k) | 31.4 | DDT | 35.0 | 15.7 | 45 ± 2 |
| 8 | Poly(PCLCMA 6k) | 34.9 | TG | 66.1 | 32.6 | 49 ± 1 |

The results of the degradation study of poly(PCLDMA) (entries 4-8) show that the hyperbranched (HB) polymers synthesised from PCLDMA 2k and PCLDMA 6k were degradable by lipase. However, the mass lost after the 10 days in our standard conditions for the poly(PCLDMA)s were significantly less than that of the macro-monomers or the linear PCL (80 kg mol$^{-1}$) control sample, which had a mass loss of 30.8±1 mg for PCLDMA 2k, 55.4±1 mg for PCLDMA 6k and 30.5±1 mg for the control sample. This lower mass loss is perhaps due to lipase being more active at points where the chain mobility is greater and in a HB polymer the chains are densely packed, reducing the mobility of the polymer chains and hence the accessibility of the enzyme to the ester bonds.

Comparing the results of poly(PCLDMA 2k) (entries 4 and 5), there is a slight increase in the mass lost going from entry 4 to entry 5. This increase in mass loss may be due to the molecular weight of the polymer decreasing from entry 4 to entry 5. This may because, as the molecular weight of the HB polymer increases, the amount of branching may increase. It is believed that the accessibility of the lipase to the ester bonds would be reduced by this branching, hence yielding lower levels of degradation when compared to lower molecular weight HB polymers.

Comparing the results of poly(PCLDMA 6k) (entries 6-8), there is a significant decrease in the mass lost going from entry 6 to entry 7. This result differs from the results of the polymers synthesised from PCLDMA 2k. As the mass lost over 10 days decreases with the molecular weight of the poly(PCLDMA 6k). Without wishing to be bound by theory, for the lower molecular weight poly(PCLDMA 6k), the chains may organise themselves when the film is made, providing some crystalline sections. In contrast the higher molecular weight poly(PCLDMA 6k) may be more amorphous due to the higher amount of branching preventing the organisation of the PCL chains. These amorphous PCL chains may be more accessible for the lipase and hence may result in an increase in the observed degradation of the HB polymer. Comparing entries 7 and 8, there is a significant increase in the mass loss of poly(PCLDMA 6k) which have similar molecular weight. This could be explained by the hydrophilicity of TG. The hydrophilic TG in entry 8 may lead to the chain ends of the polymer extending out into the aqueous phase and hence making the chain ends more accessible to the lipase, while also increasing the surface area of the polymer. In contrast the hydrophobic DDT in entry 7 may lead to the chain ends contracting away from the aqueous phase, making the chain ends less accessible to the lipase while also reducing the surface area of the polymer. Furthermore, when degraded, TG will produce a soluble degradation product and will contribute to the mass loss. However, DDT is insoluble which will produce an insoluble degradation product which will not contribute to the mass loss and hence, will reduce the observed mass lost due to degradation by comparison.

Two main conclusions can be drawn from the degradation studies as described above.

Firstly, although the extent of degradation varied, for all entries in the table above significant degradation occurred such that the polymer products were all effectively broken down. It should be noted that these experiments relate to a specific set of conditions for a limited (ten day) time period: under industrially relevant or commercially relevant conditions, for various different time periods, the degradation may be significantly greater.

Secondly, the exact behaviour and properties of the polymers can be tailored, in a controllable way, by the choice of monomers, CTAs, polymerisation conditions and other variables. The present invention therefore allows considerable control and consequent benefits in preparing useful polymers.

Whilst the degradation is exemplified herein with reference to lipases, the products are also degradable under other conditions, for example using other kinds of enzymes (e.g. cutinases) and other conditions in which ester cleavage occurs.

Breakdown of the polymers by cleavage at the cleavable sites (e.g. esters) may occur under enzymatic or non-enzymatic conditions, for example by hydrolysis under natural or environmental conditions, or under various chemical conditions wherein the nature of the conditions (e.g. pH conditions) may be varied according to the requirements.

Example 27—Further Types of Poly(Caprolactone) Dimethacrylate (PCLDMA) Macromonomer The PCLDMA macromonomers described above contain multiple ester linkages grown from a benzene dimethanol initiator.

Other macromonomers may be used, including those using different diols (including commercially available diols) as initiators. The following example starts from bifunctional caprolactone and accordingly the initiator residue does not contain any aryl groups.

PCLDMA Synthesis

In a typical experiment, 150 g of PCL-diol (commercially available, Merck; Mn≈1250 g/mol; 0.12 mol; 1 equivalent) were dissolved in anhydrous DCM (200 mL) in a 1 L round bottom flask. Anhydrous TEA (45 mL; 0.3 mol; 2.5 equivalents) was added, under nitrogen flow, to the solution and the flask was placed in an ice bath. Methacryloyl chloride (30 mL; 0.3 mol; 2.5 equivalents) was then added dropwise over 20 minutes with a syringe under nitrogen flow. Once the addition was complete, the nitrogen flow was turned off, the ice bath removed and the flask left to stir at room temperature for ca. 12 hours. The flask was left under nitrogen atmosphere but open to atmospheric pressure via an oil bubbler in order to prevent any possible pressure built-up.

The solution was then filtered and washed 3 times with distilled water via liquid/liquid extraction. The organic phase was dried with $Na_2SO_4$, filtered and then concentrated with a rotary evaporator. The PCLDMA solution in DCM was precipitated into cold petroleum ether containing a small amount of 4-methyloxy phenol anti-oxidant. The precipitate ($PCLDMA_{1250}$ macro-monomer) was collected, pre-dried via trituration under compressed air and finally dried under vacuum at room temperature for ca. 6 hours.

The PCLDMA macro-monomer was then characterised by TD-SEC and $^1$H NMR.

PCL-diol was also commercially available with a molecular weight Mn≈2000 g/mol. The macro-monomer $PCLDMA_{2000}$ was synthesised in a similar manner to the experiment described above using PCL-diol Mn≈2000 g/mol.

Example 28—Copolymerisation of Degradable Divinyl Monomer (PCLDMA) with Monovinyl Monomer which can be Functionalised (Glycidyl Methacrylate)

As exemplified above, PCLDMA monomers can be homopolymerized.

Alternatively they can be copolymerised with other monomers. One reason for doing this is to incorporate certain types of functionality which can be reacted further, e.g. cured.

In the following example PCLDMA (prepared as above starting from PCL diol) was copolymerised with glycidyl methacrylate (GlyMA), an epoxide-containing monovinyl monomer.

Poly(PCLDMA-Co-GlyMA) Synthesis

In a typical experiment, 1.1579 g of DDT (0.78 mmol; 1 equivalent), 1 g of PCLDMA (Mn≈2000 g/mol; 0.47 mmol; 0.6 equivalent), 0.06655 g of GlyMA (0.47 mmol; 0.6 equivalent), 3.5 mg of AIBN (0.027 equivalent) and 1.36 mL of ethyl acetate were placed in a round bottom flask. The solution was degassed via nitrogen sparge for 15 minutes and then placed in a heated mantle at 70° C. for 24 hours. The solution was then cool down to room temperature and precipitated in cold petroleum ether. The precipitate -Poly (PCLDMA-co-GlyMA)- was collected and dry under vacuum at 40° C. for ca. 12 hours. The product was characterised by TD-SEC and $^1$H NMR.

| Entry | CTA (mole eq.) | DVM (mole eq.) | Monomer (mole eq.) | $^1$H NMR Vinyl conversion | Triple detection SEC Mw (Kg/mol) | Mn (Kg/mol) | Đ | MH a |
|---|---|---|---|---|---|---|---|---|
| 1 | DDT (1) | $PCLDMA_{1250}$ (0.6) | GlyMA (0.6) | >99% | 17.6 | 3.8 | 4.67 | 0.397 |
| 2 | DDT (1) | $PCLDMA_{2000}$ (0.6) | GlyMA (0.6) | >99% | 340.4 | 70.2 | 4.85 | 0.395 |
| 3 | DDT (1) | $PCLDMA_{2000}$ (0.6) | GlyMA (0.35) | >99% | 221.3 | 69.8 | 3.17 | 0.303 |

Example 29—Curing of Poly(PCLDMA-Co-GlyMA)

Figure 24:
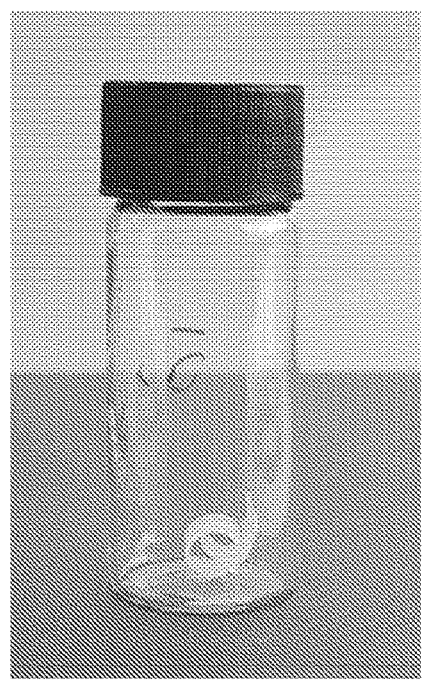
FIG. 24 shows a photograph of a cured product of a copolymer prepared from a degradable divinyl monomer and an epoxy-containing monovinyl monomer.

In a typical experiment, poly(PCLDMA-co-GlyMA) was dissolved in a sebacic acid/THF solution with different epoxy/acid composition (typically ½ or ¹/₁₀). After stirring for ca. 2 hours, the homogeneous solution was concentrated, placed on a glass slide, left to dry until all THF was evaporated and finally cured at 150° C. for ca. 2.5 hours. The resulting materials were insoluble in common organic solvents. FIG. 24 shows one of the insoluble cured caprolactone dimethacrylate polymer products.

Acids other than sebacic acid may be used, for example other multifunctional carboxylic acids (di-acids, tri-acids, tetra-acids etc.).

Example 30—Degradation Study of Cured Poly(PCLDMA-Co-GlyMA)

Samples of the cured materials were collected from the glass slides and placed in pre-weighed vials containing a solution of lipase (*pseudomonas* cepacian) in a buffered phosphate saline solution (pH 7.2) with sodium azide (0.02 wt %) at 37° C. with constant agitation for 10 days. The clear homogeneous aqueous phase was then carefully removed from the vials ensuring all solids were kept inside. The vials and solids were then washed with deionised water and the aqueous phase removal procedure was repeated. The vials and their content were then placed in a vacuum oven at 50° C. for 24 hours and the mass loss was assessed by weight difference. The results of the degradation study are gathered in the table below.

tionality may also be prepared and used to make degradable branched polymers. The following example relates to polycaprolactone trimethacrylate (PCLTMA) macromonomers.

PCLTMA Synthesis

In a typical experiment, 20 g of PCL-triol (commercially available, Merck; Mn ca 300 g/mol; 0.0667 mol; 1 equivalent) were dissolved in anhydrous DCM (100 mL) in a 1 L round bottom flask. Anhydrous TEA (33 mL; 0.233 mol; 3.5 equivalents) was added, under nitrogen flow, to the solution and the flask was placed in an ice bath. Methacryloyl chloride (23 mL; 0.233 mol; 3.5 equivalents) was then added dropwise over 20 minutes with a syringe under nitrogen flow. Once the addition was complete, the nitrogen flow was turned off, the ice bath removed and the flask left to stir at room temperature for ca. 12 hours. The flask was left under nitrogen atmosphere but open to atmospheric pressure via an oil bubbler in order to prevent any possible pressure built-up.

The solution was then filtered and washed 3 times with distilled water via liquid/liquid extraction. The organic phase was dried with $Na_2SO_4$, filtered and then concentrated with a rotary evaporator to yield polycaprolactone trimethacrylate (PCLTMA). The PCLTMA solution in DCM was precipitated into cold petroleum ether containing a small amount of 4-methyloxy phenol anti-oxidant. The precipitate (PCLTMA macro-monomer) was collected, pre-dried via trituration under compressed air and finally dried under vacuum at room temperature for ca. 6 hours.

The invention claimed is:

1. A method of preparing a degradable branched polymer comprising:

| | | | | 10 days in Lipase solution | | | |
|---|---|---|---|---|---|---|---|
| Entry | Poly(PCLDMA$_{2000}$) molecular weight Mw (kg/mol) @ epoxy/acid ratio | Weight of empty vial (g) | Weight of polymer (g) | Weight of vial and polymer @ t = 0 (g) | Total weight after 24 hours in the vac oven (g) | Weight of polymer left in the vial (g) | Weight of polymer degraded (g) | % loss of polymer |
| 1 | 221.3 @ ½ | 10.4979 | 0.0281 | 10.526 | 10.5121 | 0.0142 | 0.0139 | 49.5 |
| 2 | 221.3 @ 1/10 | 10.7044 | 0.0387 | 10.7431 | 10.7248 | 0.0204 | 0.0183 | 47.3 |
| 3 | 340.4 @ 1/10 | 10.4318 | 0.0352 | 10.467 | 10.4536 | 0.0218 | 0.01344 | 38.1 |

Thus it can be seen that the present invention can be used not only to make materials (e.g. ester-based materials) which are degradable, but also (when for example functionality is introduced to permit curing) to make such materials in the form of insoluble resins.

In many contexts the present invention is useful as it allows the preparation of soluble processable materials, but in other contexts insoluble resins are useful, and therefore it is beneficial that the present invention allows both possibilities.

One skilled in the art will therefore recognize that the present invention applies to both thermoplastic materials and thermoset materials. Thus, the polymer of the first aspect of the present invention may be a thermoplastic polymer, and polymers when further reacted e.g. cured may be thermoset polymers.

Example 31—Degradable Trivinyl Monomers

Analogous to PCLDMA methodology exemplified above, degradable monovinyl monomers of tri- and higher funcfree radical polymerisation of one or more multivinyl monomers in the presence of one or more chain transfer agents and a source of radicals,
wherein the extent of propagation is controlled relative to the extent of chain transfer to prevent gelation of the polymer, and
wherein the multivinyl monomer comprises a cleavable group between two vinyl groups.

2. The method of claim 1 wherein the multivinyl monomer is a divinyl monomer.

3. A method of preparing a degradable branched polymer comprising:
free radical polymerisation of one or more multivinyl monomers in the presence of one or more chain transfer agents and a source of radicals,
wherein propagation is controlled relative to chain transfer to achieve a polymer having a multiplicity of vinyl polymer chain segments wherein the average vinyl polymer chain contains between 1 and 3 multivinyl monomer residues, and
wherein the multivinyl monomer comprises a cleavable group between two vinyl groups.

4. The method of claim 1 wherein said cleavable group is an ester.

5. The method of claim 1 wherein the multivinyl monomer comprises multiple cleavable sites between the polymerizable vinyl groups.

6. The method of claim 5 wherein the number of said cleavable sites is 5 or more.

7. The method of claim 5 wherein the cleavable sites are ester linkages.

8. The method of claim 1 wherein said multivinyl monomer is, or is derived from, itaconic acid.

9. The method of claim 8 wherein said multivinyl monomer comprises the following structure:

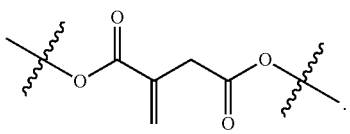 [SMILES: *OC(=O)CC(=C)C(=O)O*]

10. The method of claim 1 wherein during free radical polymerisation the conversion of double bond functionality to saturated carbon-carbon bonds in the polymer is 80% or more.

11. The method of claim 1 wherein at least 1 equivalent of chain transfer agent is used relative to multivinyl monomer.

12. The method of claim 1 further comprising the incorporation of one or more monovinyl monomers.

13. The method of claim 1 wherein the multivinyl monomer is a multimethacrylate, multiacrylate or multiacrylamide.

14. The method of claim 1 wherein the chain transfer agent is a thiol.

15. The method of claim 1 wherein a monomer is incorporated which has epoxide functionality.

16. The method of claim 1 wherein a monomer is incorporated which has tertiary amine functionality.

17. A branched polymer obtained by the method of claim 1.

18. A degradable branched polymer product comprising one or more multivinyl monomer residues and chain transfer residues, comprising on average between 0.9 and 3.3 chain transfer residues per multivinyl monomer residue, wherein branches between vinyl polymer chains comprise a cleavable group.

19. The degradable branched polymer product of claim 18 wherein the multivinyl monomer residues are divinyl monomer residues, comprising on average between 0.9 and 1.1 chain transfer residues per divinyl monomer residue.

20. The degradable branched polymer product of claim 18, wherein the multivinyl monomer residues comprise less than 20 mol % unreacted double bond functionality.

21. The degradable branched polymer product of claim 18, further comprising monovinyl monomer residues.

22. The degradable branched polymer of claim 18, wherein the branched polymer product comprises a multiplicity of vinyl polymer chain segments having an average length of between 1 and 3 multivinyl monomer residues.

23. The product of claim 18 wherein said cleavable group is an ester.

24. The product of claim 18 wherein the branches between vinyl polymer chains comprise multiple cleavable sites per branch.

25. The product of claim 24 wherein the number of said cleavable sites is 5 or more.

26. The product of claim 24 wherein the cleavable sites are ester linkages.

27. The product of claim 18 wherein the multivinyl monomer residue is, or is derived from, itaconic acid.

28. The product of claim 27 wherein the multivinyl monomer residue comprises the following structure:

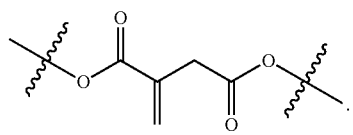 [SMILES: *OC(=O)CC(=C)C(=O)O*]

29. The product of claim 18 wherein the multivinyl monomer residue is a residue of a multimethacrylate, multiacrylate or multiacrylamide.

30. The product of claim 18 wherein the chain transfer agent residue is a thiol residue.

31. The product of claim 18 comprising a monomer residue which has epoxide functionality.

32. The product of claim 18 comprising a monomer residue which has tertiary amine functionality.

* * * * *